(12) United States Patent
Zhang et al.

(10) Patent No.: US 11,546,061 B2
(45) Date of Patent: *Jan. 3, 2023

(54) FIBER COMMUNICATION SYSTEMS AND METHODS

(71) Applicant: CABLE TELEVISION LABORATORIES, INC., Louisville, CO (US)

(72) Inventors: Junwen Zhang, Broomfield, CO (US); Zhensheng Jia, Superior, CO (US); Luis Alberto Campos, Superior, CO (US); Haipeng Zhang, Broomfield, CO (US); Mu Xu, Broomfield, CO (US); Jing Wang, Broomfield, CO (US); Curtis Dean Knittle, Superior, CO (US); Chuang Zhou, Greenwood Village, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/195,215

(22) Filed: Mar. 8, 2021

(65) Prior Publication Data

US 2021/0194591 A1    Jun. 24, 2021

Related U.S. Application Data

(63) Continuation of application No. 16/711,293, filed on Dec. 11, 2019, now Pat. No. 10,944,478, which is a
(Continued)

(51) Int. Cl.
*H04B 10/04* (2006.01)
*H04B 10/50* (2013.01)
*H04J 14/06* (2006.01)
(Continued)

(52) U.S. Cl.
CPC ......... *H04B 10/504* (2013.01); *H04B 10/502* (2013.01); *H04B 10/505* (2013.01);
(Continued)

(58) Field of Classification Search
CPC ................ H04B 10/504; H04B 10/532; H04B 10/516; H04B 10/27; H04B 10/548;
(Continued)

(56) References Cited

U.S. PATENT DOCUMENTS 4,635,246 A * 1/1987 Taylor ................... H01S 5/4006
372/18
5,347,525 A * 9/1994 Faris ...................... H04B 10/50
372/18

(Continued)

*Primary Examiner* — Hanh Phan
(74) *Attorney, Agent, or Firm* — Armstrong Teasdale LLP

(57) ABSTRACT

An injection locked transmitter for an optical communication network includes a master seed laser source input substantially confined to a single longitudinal mode, an input data stream, and a laser injected modulator including at least one slave laser having a resonator frequency that is injection locked to a frequency of the single longitudinal mode of the master seed laser source. The laser injected modulator is configured to receive the master seed laser source input and the input data stream, and output a laser modulated data stream.

20 Claims, 43 Drawing Sheets

Related U.S. Application Data continuation-in-part of application No. 16/460,964, filed on Jul. 2, 2019, now Pat. No. 10,623,104, which is a continuation-in-part of application No. 16/408,285, filed on May 9, 2019, now Pat. No. 11,115,126, which is a continuation-in-part of application No. 15/861,303, filed on Jan. 3, 2018, now Pat. No. 10,447,404, which is a continuation of application No. 15/283,632, filed on Oct. 3, 2016, now Pat. No. 9,912,409.

(60) Provisional application No. 62/785,016, filed on Dec. 26, 2018, provisional application No. 62/744,498, filed on Oct. 11, 2018, provisional application No. 62/693,035, filed on Jul. 2, 2018, provisional application No. 62/678,110, filed on May 30, 2018, provisional application No. 62/671,270, filed on May 14, 2018, provisional application No. 62/669,035, filed on May 9, 2018, provisional application No. 62/321,211, filed on Apr. 12, 2016.

(51) Int. Cl.
*H04J 14/04* (2006.01)
*H04B 10/63* (2013.01)
*H04B 10/64* (2013.01)
*H04B 10/532* (2013.01)

(52) U.S. Cl.
CPC ......... *H04B 10/506* (2013.01); *H04B 10/532* (2013.01); *H04B 10/63* (2013.01); *H04B 10/64* (2013.01); *H04J 14/04* (2013.01); *H04J 14/06* (2013.01)

(58) Field of Classification Search
CPC ..... H04B 10/505; H04B 10/502; H04J 14/02; H04J 14/04; H04J 14/06
USPC .... 398/66, 67, 68, 69, 70, 71, 72, 135, 136, 398/79, 100, 158, 159, 65, 152, 183, 184, 398/188
See application file for complete search history.

(56) References Cited

U.S. PATENT DOCUMENTS

| | | | | |
|---|---|---|---|---|
| 8,494,366 | B2* | 7/2013 | Kim | H04J 14/0282 398/67 |
| 10,944,478 | B2* | 3/2021 | Zhang | H04B 10/532 |
| 2006/0008202 | A1* | 1/2006 | Shin | H04J 14/02 385/24 |
| 2010/0178057 | A1* | 7/2010 | Shieh | H04L 27/2637 398/79 |
| 2012/0087666 | A1* | 4/2012 | Kwon | H04J 14/0221 398/79 |
| 2014/0016938 | A1* | 1/2014 | Sandstrom | H04B 10/506 398/72 |
| 2014/0140694 | A1* | 5/2014 | Zhou | H04J 14/02 398/44 |
| 2014/0314108 | A1* | 10/2014 | Anandarajah | H01S 5/065 372/20 |
| 2015/0249504 | A1* | 9/2015 | Slavik | H04B 10/504 398/183 |

* cited by examiner

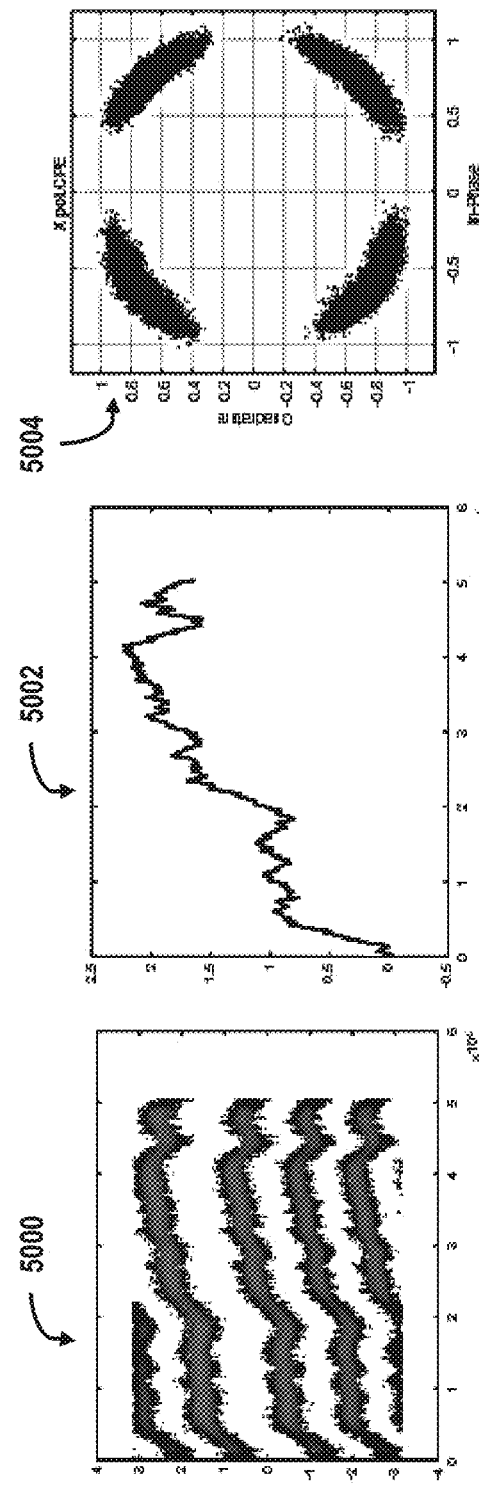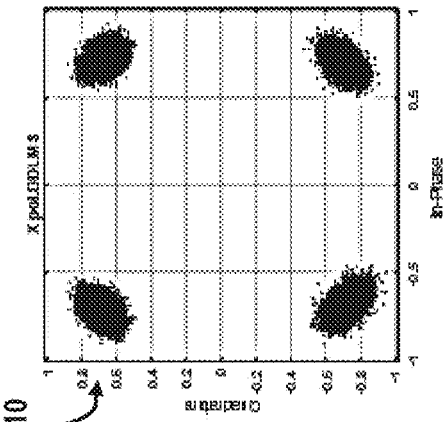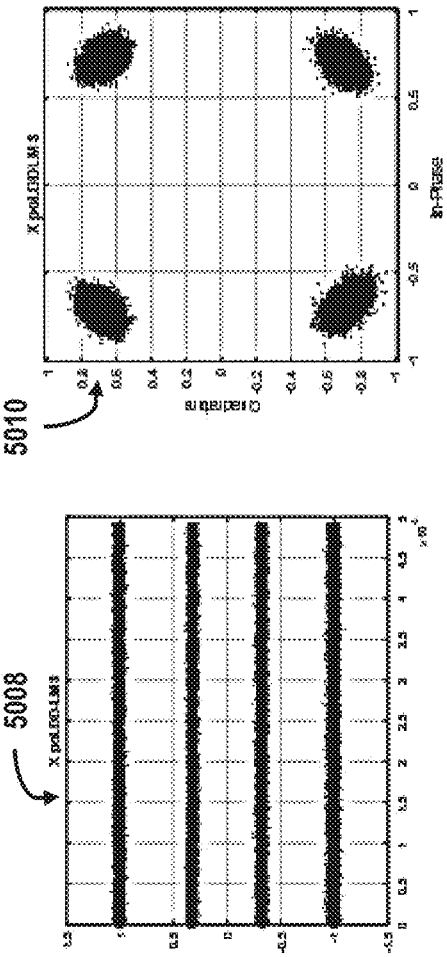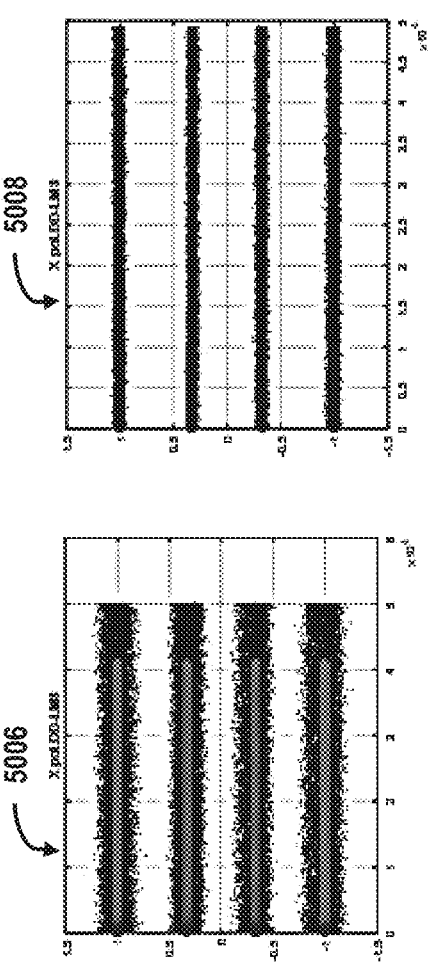

FIBER COMMUNICATION SYSTEMS AND METHODS

CROSS REFERENCE TO RELATED APPLICATIONS

This application is a continuation of U.S. application Ser. No. 16/711,293, filed on Dec. 11, 2019. U.S. application Ser. No. 16/711,293 is a continuation in part of U.S. application Ser. No. 16/460,964, filed on Jul. 2, 2019, now U.S. Pat. No. 10,623,104, issued Apr. 14, 2020. U.S. application Ser. No. 16/460,964 is a continuation in part of U.S. application Ser. No. 16/408,285, filed on May 9, 2019. U.S. application Ser. No. 16/408,285 is a continuation in part of U.S. application Ser. No. 15/861,303, filed on Jan. 3, 2018, now U.S. Pat. No. 10,447,404, issued Oct. 15, 2019. U.S. application Ser. No. 15/861,303 is a continuation of U.S. application Ser. No. 15/283,632, filed on Oct. 3, 2016, now U.S. Pat. No. 9,912,409, issued Mar. 6, 2018. U.S. application Ser. No. 15/283,632 further claims the benefit of and priority to U.S. Provisional Patent Application Ser. No. 62/321,211, filed Apr. 12, 2016. U.S. application Ser. No. 16/408,285 further claims the benefit of and priority to U.S. Provisional Patent Application Ser. No. 62/669,035, filed May 9, 2018, to U.S. Provisional Patent Application Ser. No. 62/671,270, filed May 14, 2018, and to U.S. Provisional Patent Application Ser. No. 62/678,110, filed May 30, 2018. U.S. application Ser. No. 16/460,964 further claims the benefit of and priority to U.S. Provisional Patent Application Ser. No. 62/693,035, filed Jul. 2, 2018. The present application further claims the benefit of and priority to U.S. Provisional Patent Application Ser. No. 62/744,498, filed Oct. 11, 2018, and to U.S. Provisional Patent Application Ser. No. 62/785,016, filed Dec. 26, 2018. All of these applications are incorporated herein by reference in their entireties.

BACKGROUND

The field of the disclosure relates generally to fiber communication networks, and more particularly, to optical networks utilizing wavelength division multiplexing.

Telecommunications networks include an access network through which end user subscribers connect to a service provider. Bandwidth requirements for delivering high-speed data and video services through the access network are rapidly increasing to meet growing consumer demands. At present, data delivery over the access network is growing by gigabits (Gb)/second for residential subscribers, and by multi-Gb/s for business subscribers. Present access networks are based on passive optical network (PON) access technologies, which have become the dominant system architecture to meet the growing high capacity demand from end users.

Gigabit PON and Ethernet PON architectures are conventionally known, and presently provide about 2.5 Gb/s data rates for downstream transmission and 1.25 Gb/s for upstream transmission (half of the downstream rate). 10 Gb/s PON (XG-PON or IEEE 10 G-EPON) has begun to be implemented for high-bandwidth applications, and a 40 Gb/s PON scheme, which is based on time and wavelength division multiplexing (TWDM and WDM) has recently been standardized. A growing need therefore exists to develop higher/faster data rates per-subscriber to meet future bandwidth demand, and also increase the coverage for services and applications, but while also minimizing the capital expenditures (CAPEX) and operational expenditures (OPEX) necessary to deliver higher capacity and performance access networks.

One known solution to increase the capacity of a PON is the use of WDM technology to send a dedicated wavelength signal to end users. Current detection scheme WDM technology, however, is limited by its low receiver sensitivity, and also by the few options available to upgrade and scale the technology, particularly with regard to use in conjunction with the lower-quality legacy fiber environment. The legacy fiber environment requires operators to squeeze more capacity out of the existing fiber infrastructure to avoid costs associated with having to retrench new fiber installment. Conventional access networks typically include six fibers per node, servicing as many as 500 end users, such as home subscribers. Conventional nodes cannot be split further and do not typically contain spare (unused) fibers, and thus there is a need to utilize the limited fiber availability in a more efficient and cost-effective manner.

Coherent technology has been proposed as one solution to increase both receiver sensitivity and overall capacity for WDM-PON optical access networks, in both brown and green field deployments. Coherent technology offers superior receiver sensitivity and extended power budget, and high frequency selectivity that provides closely-spaced dense or ultra-dense WDM without the need for narrow band optical filters. Moreover, a multi-dimensional recovered signal experienced by coherent technology provides additional benefits to compensate for linear transmission impairments such as chromatic dispersion (CD) and polarization-mode dispersion (PMD), and to efficiently utilize spectral resources to benefit future network upgrades through the use of multi-level advanced modulation formats. Long distance transmission using coherent technology, however, requires elaborate post-processing, including signal equalizations and carrier recovery, to adjust for impairments experienced along the transmission pathway, thereby presenting significant challenges by significantly increasing system complexity.

Coherent technology in longhaul optical systems typically requires significant use of high quality discrete photonic and electronic components, such as digital-to-analog converters (DAC), analog-to-digital converters (ADC), and digital signal processing (DSP) circuitry such as an application-specific integrated circuit (ASIC) utilizing CMOS technology, to compensate for noise, frequency drift, and other factors affecting the transmitted channel signals over the long distance optical transmission. Coherent pluggable modules for metro solution have gone through C Form-factor pluggable (CFP) to CFP2 and future CFP4 via multi-source agreement (MSA) standardization to reduce their footprint, to lower costs, and also to lower power dissipation. However, these modules still require significant engineering complexity, expense, size, and power to operate, and therefore have not been efficient or practical to implement in access applications.

Furthermore, according to Nielsen's Law, if current trends continue, high-end end users are expected to require as much as 10 Gb/s by 2023, and 100 Gb/s by 2029. For the new and upcoming generations of communication systems performing under these requirements, the data speed will also need to be matched for upstream communications. However, conventional PONs seeking to approach the 100 Gb/s aggregating data rate suffer from several limitations, due to the reliance on traditional direct detection techniques, that render 100 Gb/s technically and economically infeasible for these PONs. The conventional direct detection PONs, for example, are known to have poor receiver sensitivity, to experience power fading due to chromatic dispersion at high symbol rates and long transmission distances, and to utilize bandwidth- and power-inefficient modulation. Besides frequency selectivity and linear detection, Coherent for PONs demonstrates superior receiver sensitivity, which can be translated to extend reach and split ratio.

In the downlink of conventional PONs, the complexity limits on the transceiver in an optical line terminal (OLT) at the headend, central office, and/or hub are less stringent than the limits placed on a receiver in an optical network unit (ONU), since the cost of the OLT transceiver, which sends and receives data to and from multiple ONUs, is shared by all end users supported in the respective network. In contrast, the cost of each ONU is born solely by the respective end user. Accordingly, lower costs and lower complexities will more significantly impact the ONU than the OLT. For this reason, the complexity and high cost of conventional coherent transceivers has been limited to point to point (P2P) applications, but prevented from implementation in point to multipoint (P2MP) PON applications. That is, despite the significant advantages offered by digital coherent technology, the complexity and high cost of conventional coherent transceivers has not been economically feasible for individual ONUs at the home location of each subscriber end-user.

P2P and P2MP applications differ in that they P2P connection provides a link between one transmitter and one receiver, whereas a P2MP application provides a link between one transmitter and multiple receivers. Accordingly, in the coherent paradigm, only two coherent transceivers may be needed in a P2P link, whereas the number of coherent transceivers needed in the P2MP link (i.e., one coherent transceiver for each ONU) may be significant (as many as 500, in the example above).

Therefore, the laser source is of critical importance for the realization of such coherent optical transmission systems. That is, one type of laser may not simply be substituted for another type without significantly affecting the network. Additionally, the frequency and phase noise of the laser will also significantly affect the performance of conventional optical coherent transceivers, and impairments therefrom have to be mitigated by carrier-phase recovery (CPR) techniques, since frequency and phase noise are directly related to each other, and are closely related to the linewidth of the laser.

Furthermore, the modulation speed and transmission distance of the network also will strongly depend on the spectral linewidth of the laser. That is, narrower linewidths are required for higher modulation speeds (data rates) and longer distance transmissions. Some conventional coherent transceivers use an external cavity laser (ECL). From the performance perspective, ECLs have demonstrated superior performance capabilities for coherent systems, sufficient for present long haul and metro distance sensitivity requirements. However, within the access environment, ECLs are considered prohibitively expensive if deployed at each ONU at an end user's home location. In contrast, Fabry-Perot laser diodes (FP-LD) and weak-resonant-cavity laser diode (WRC-FPLD) based transmitters are considerably less expensive than the costly externally tunable lasers such as ECLs or distributed feedback (DFB)/distributed Bragg reflector (DBR) lasers. However, use of these relatively lower-cost, simpler FP lasers is limited by transmission bandwidth and capacity, particularly in direct-detection systems, and is not applicable for coherent systems in the conventional use form.

BRIEF SUMMARY

In one aspect, an injection locked transmitter for an optical communication network includes a master seed laser source input substantially confined to a single longitudinal mode, an input data stream, and a laser injected modulator including at least one slave laser having a resonator frequency that is injection locked to a frequency of the single longitudinal mode of the master seed laser source. The laser injected modulator is configured to receive the master seed laser source input and the input data stream, and output a laser modulated data stream.

In another aspect, an optical network communication system includes, an input signal source, an optical frequency comb generator configured to receive the input signal source and output a plurality of phase synchronized coherent tone pairs. Each of the plurality of phase synchronized coherent tone pairs includes a first unmodulated signal and a second unmodulated signal. The system further include a first transmitter configured to receive the first unmodulated signal of a selected one of the plurality of phase synchronized coherent tone pairs as a seed source and to output a first modulated data stream, and a first receiver configured to receive the first modulated data stream from the first transmitter and receive the second unmodulated signal of the selected one of the plurality of phase synchronized coherent tone pairs as a local oscillator source.

In yet another aspect, an optical network communication system includes an optical hub including an optical frequency comb generator configured to output at least one phase synchronized coherent tone pair having a first unmodulated signal and a second unmodulated signal, and a downstream transmitter configured to receive the first unmodulated signal as a seed source and to output a downstream modulated data stream. The system further includes a fiber node and an end user including a downstream receiver configured to receive the downstream modulated data stream from the downstream transmitter and receive the second unmodulated signal as a local oscillator source.

In a still further aspect, a method of optical network processing includes steps of generating at least one pair of first and second unmodulated phase synchronized coherent tones, transmitting the first unmodulated phase synchronized coherent tone to a first transmitter as a seed signal, adhering downstream data, in the first transmitter, to the first unmodulated phase synchronized coherent tone to generate a first modulated data stream signal, optically multiplexing the first modulated data stream signal and the second unmodulated phase synchronized coherent tone together within a hub optical multiplexer, and communicating the multiplexed first modulated data stream signal and the second unmodulated phase synchronized coherent tone to a first receiver, by way of fiber optics, for downstream heterodyne detection.

In an aspect, an optical communication network includes an optical hub. The optical hub includes at least one master laser source and at least one hub transceiver configured to transmit a downstream signal of the at least one master laser source. The downstream signal includes a plurality of spaced wavelength channels. The network further includes an optical transport medium configured to carry the downstream signal from the optical hub, and a plurality of distributed modem devices operably coupled to the optical transport medium. The modem is (i) configured to receive at least one channel of the plurality of spaced wavelength channels, and (ii) including at least one child laser source injection locked to the master laser source.

In an embodiment, an optical injection locking based coherent optical transmitter is provided for a coherent optical communications network. The coherent optical transmitter includes a master laser source configured to provide a low linewidth frequency channel as a master laser signal, and a coherent optical injection locking (COIL) subsystem. The COIL subsystem includes (i) a first slave laser configured for COIL with a master frequency of the master laser signal, (ii) an optical circulator configured to inject the master laser signal into a cavity of the first slave laser, and (iii) a full-field modulator configured to output a first modulated optical signal based on an output of the first slave laser routed through the optical circulator.

In an embodiment, an optical communication network includes an optical hub, a receiver, and an optical transport medium. The optical hub includes a master laser source and a plurality of full-field coherent optical transmitters disposed proximate the optical hub. Each full-field transmitter of the plurality of full-field coherent optical transmitters (i) is configured to transmit a downstream coherent optical signal using a center frequency of a master signal from the master laser source, and (ii) includes a first slave laser injection locked to the center frequency of the master signal. The optical transport medium operably connects the plurality of full-field coherent optical transmitters to the receiver.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein:

FIGS. 50A-F are graphical illustrations depicting signal results of receiver-side digital signal processing.

Figure 1:
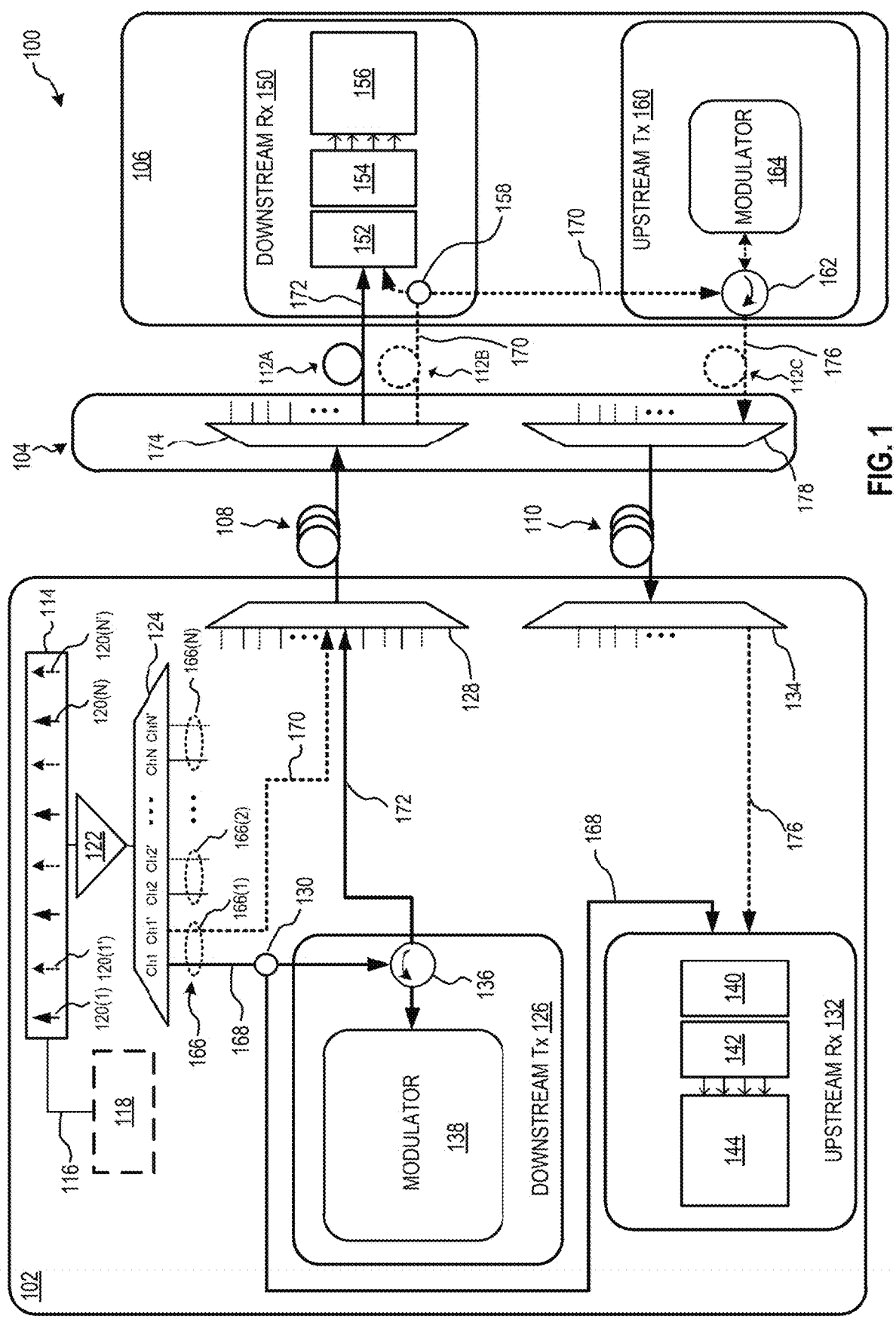
FIG. 1 is a schematic illustration of an exemplary fiber communication system in accordance with an exemplary embodiment of the present disclosure.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable nonvolatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As used herein, "modem termination system" (MTS) refers to a termination unit including one or more of an Optical Network Terminal (ONT), an optical line termination (OLT), a network termination unit, a satellite termination unit, a cable modem termination system (CMTS), and/or other termination systems which may be individually or collectively referred to as an MTS.

As used herein, "modem" refers to a modem device, including one or more a cable modem (CM), a satellite modem, an optical network unit (ONU), a DSL unit, etc., which may be individually or collectively referred to as modems.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

FIG. 1 is a schematic illustration of an exemplary fiber communication system 100 in accordance with an exemplary embodiment of the present disclosure. System 100 includes an optical hub 102, a fiber node 104, and an end user 106. Optical hub 102 is, for example, a central office, a communications hub, or an optical line terminal (OLT). In the embodiment shown, fiber node 104 is illustrated for use with a passive optical network (PON). End user 106 is a downstream termination unit, which can represent, for example, a customer device, customer premises (e.g., an apartment building), a business user, or an optical network unit (ONU). In an exemplary embodiment, system 100 utilizes a coherent Dense Wavelength Division Multiplexing (DWDM) PON architecture.

Optical hub 102 communicates with fiber node 104 by way of downstream fiber 108. Optionally, where upstream communication is desired along system 100, optical hub 102 further connects with fiber node 104 by way of upstream fiber 110. In operation, downstream fiber 108 and upstream fiber 110 are typically 30 km or shorter. However, according to the embodiments presented herein, greater lengths are contemplated, such as between 100 km and 1000 km. In an exemplary embodiment, fiber node 104 connects with end user 106 by way of fiber optics 112. Alternatively, fiber node 104 and end user 106 may be integrated as a single device, such as a virtualized cable modem termination system (vCMTS), which may be located at a customer premises. Where fiber node 104 and end user 106 are separate devices, fiber optics 112 typically spans a distance of approximately 5000 feet or less.

Optical hub 102 includes an optical frequency comb generator 114, which is configured to receive a high quality source signal 116 from an external laser 118 and thereby generate multiple coherent tones 120(1), 120(1'), ... 120(N), 120(N'). Optical frequency comb generator 114 utilizes, for example, a mode-locked laser, a gain-switched laser, or electro-optic modulation, and is constructed such that multiple coherent tones 120 are generated as simultaneous low-linewidth wavelength channels of known and controllable spacing. This advantageous aspect of the upstream input signal into system 100 allows a simplified architecture throughout the entire downstream portion of system 100, as described further below.

Generated coherent tones 120 are fed into an amplifier 122, and the amplified signal therefrom is input into a first hub optical demultiplexer 124. In an exemplary embodiment, amplifier 122 is an erbium-doped fiber amplifier (EDFA). Optical hub 102 further includes a downstream transmitter 126 and a hub optical multiplexer 128. In an embodiment, optical hub 102 optionally includes a hub optical splitter 130, an upstream receiver 132, and a second hub optical demultiplexer 134.

Downstream transmitter 126 includes a downstream optical circulator 136 and a downstream modulator 138. In an exemplary embodiment, downstream modulator 138 is an injection locked laser modulator. Upstream receiver 132 includes an upstream integrated coherent receiver (ICR) 140, an upstream analog to digital converter (ADC) 142, and an upstream digital signal processor (DSP) 144. In the exemplary embodiment, fiber node 104 includes a node optical demultiplexer 146. In an alternative embodiment, where upstream transmission is desired, fiber node 104 further includes a node optical multiplexer 148. In the exemplary embodiment, node optical demultiplexer 146 and node optical multiplexer 148 are passive devices.

End user 106 further includes a downstream receiver 150. In an exemplary embodiment, downstream receiver 150 has a similar architecture to upstream receiver 132, and includes a downstream ICR 152, a downstream ADC 154, and a downstream DSP 156. For upstream transmission, end user 106 optionally includes end user optical splitter 158, which may be located within downstream receiver 150 or separately, and an upstream transmitter 160. In an exemplary embodiment, upstream transmitter 160 has a similar architecture to downstream transmitter 126, and includes an upstream optical circulator 162, and an upstream modulator 164.

In operation, system 100 utilizes optical frequency comb generator 114 and amplifier 122 convert the input high quality source signal 116 into multiple coherent tones 120 (e.g., 32 tones, 64 tones, etc.), which are then input to first hub optical demultiplexer 124. In an exemplary embodiment, high quality source signal 116 is of sufficient amplitude and a narrow bandwidth such that a selected longitudinal mode of signal 116 is transmitted into optical frequency comb generator 114 without adjacent longitudinal modes, which are suppressed prior to processing by comb generator 114. First hub optical demultiplexer 124 then outputs a plurality of phase synchronized coherent tone pairs 166(1), 166(2), ... 166(N). That is, the generated coherent frequency tones 120 are amplified by amplifier 122 to enhance optical power, and then demultiplexed into multiple separate individual phased synchronized coherent tone source pairs 166. For simplicity of discussion, the following description pertains only to coherent tone pair 166(1) corresponding to the synchronized pair signal for the first channel output, which includes a first unmodulated signal 168 for Ch1 and a second unmodulated signal 170 for Ch1', and their routing through system 100.

With source signal 116 of a high quality, narrow band, and substantially within a single longitudinal mode, coherent tone pair 166(1), including first unmodulated signal 168 (Ch1) and second unmodulated signal 170 (Ch1'), is output as a high quality, narrowband signal, which then serves as both a source of seed and local oscillator (LO) signals for both downstream and upstream transmission and reception directions of system 100. That is, by an exemplary configuration, the architecture of optical frequency comb generator 114 advantageously produces high quality continuous wave (CW) signals. Specifically, first unmodulated signal 168 (Ch1) may function as a downstream seed and upstream LO throughout system 100, while second unmodulated signal 170 (Ch1') concurrently may function as an upstream seed and downstream LO for system 100.

According to the exemplary embodiment, within optical hub 102, first unmodulated signal 168 (Ch1) is divided by hub optical splitter 130 and is separately input to both downstream transmitter 126 and upstream receiver 132 as a "pure" signal, and i.e., substantially low amplitude, narrow bandwidth continuous wave does not include adhered data. First unmodulated signal 168 (Ch1) thus becomes a seed signal for downstream transmitter 126 and an LO signal for upstream receiver 132. In an exemplary embodiment, within downstream transmitter 126, first unmodulated signal 168 (Ch1) passes through downstream optical circulator 136 into downstream modulator 138, in which one or more laser diodes (not shown in FIG. 1, described below with respect to FIGS. 2-5) are excited, and adhere data (also not shown in FIG. 1, described below with respect to FIGS. 2-5) to the signal that then exits downstream optical circulator 136 as downstream modulated data stream 172 (Ch1).

In an exemplary embodiment, downstream optical circulator 136 is within downstream transmitter 126. Alternatively, downstream optical circulator 136 may be physically located separately from downstream transmitter 126, or else within the confines of downstream modulator 138. Downstream modulated data stream 172 (Ch1) is then combined in hub optical multiplexer 128 with the plurality of modulated/unmodulated data stream pairs from other channels (not shown) and transmitted over downstream fiber 108, to a node optical demultiplexer 174 in fiber node 104, which then separates the different channel stream pairs for transmission to different respective end users 106. At end user 106, because the data stream pair 170, 172 entering downstream receiver 150 is phase synchronized, digital signal processing at downstream DSP 156 is greatly simplified, as described below with respect to FIG. 7.

Where upstream reception is optionally sought at optical hub 102, second unmodulated signal 170 (Ch1') is divided, within end user 106, by end user optical splitter 158 and is separately input to both downstream receiver 150 and upstream transmitter 160 as a "pure" unmodulated signal for Ch1'. In this alternative embodiment, second unmodulated signal 170 (Ch1') thus functions a seed signal for upstream transmitter 160 and a "pseudo LO signal" for downstream receiver 150 for the coherent detection of Ch1. For purposes of this discussion, second unmodulated signal 170 (Ch1') is referred to as a "pseudo LO signal" because it uses an LO signal from a remote source (output from first hub optical demultiplexer 124), and is not required to produce an LO signal locally at end user 106. This particular configuration further significantly reduces cost and complexity of the architecture of the system 100 by the reduction of necessary electronic components.

For upstream transmission, in an exemplary embodiment, a similar coherent detection scheme is implemented for upstream transmitter 160 as is utilized for downstream transmitter 126. That is, second unmodulated signal 170 (Ch1') is input to upstream optical circulator 162 and modulated by upstream modulator 164 to adhere symmetric or asymmetric data (not shown, described below with respect to FIG. 6) utilizing one or more slave lasers (also not shown, described below with respect to FIG. 6), and then output as an upstream modulated data stream 176 (Ch1'), which is then combined with similar modulated data streams from other channels (not shown) by a node multiplexer 178 in fiber node 104. Second unmodulated signal 170 (Ch1') is then transmitted upstream over upstream fiber 110, separated from other channel signals by second hub optical demultiplexer 134, an input to upstream receiver 132, for simplified digital signal processing similar to the process described above with respect to downstream receiver 150.

By this exemplary configuration, multiple upstream channels from different end users 106 can be multiplexed at fiber node 104 (or a remote node) and sent back to optical hub 102. Thus, within optical hub 102, the same coherent detection scheme may be used at upstream receiver 132 as is used with downstream receiver 150, except that upstream receiver 132 utilizes first unmodulated signal 168 (Ch1) as the LO and upstream modulated data stream 176 (Ch1') to carry data, whereas downstream receiver 150 utilizes the data stream pair (Ch1, Ch1') in reverse. That is, downstream receiver 150 utilizes second unmodulated signal 170 (Ch1') as the LO and downstream modulated data stream 172 (Ch1) to carry data.

Implementation of the embodiments described herein are useful for migrating hybrid fiber-coaxial (HFC) architectures towards other types of fiber architectures, as well as deeper fiber architectures. Typical HFC architectures tend to have very few fiber strands available from fiber node to hub (e.g. fibers 108, 110), but many fiber strands could be deployed to cover the shorter distances that are typical from legacy HFC nodes to end users (e.g., fiber optics 112). In the exemplary embodiments described herein, two fibers (i.e., fibers 108, 110) are illustrated between optical hub 102 and fiber node 104, which can be a legacy HFC fiber node. That is, one fiber (i.e., downstream fiber 108) is utilized for downstream signal and upstream seed/downstream LO, and another fiber (i.e., upstream fiber 110) is utilized for upstream signal. Additionally, three fibers (i.e., fiber optics 112A-C) are illustrated for each end user from fiber node 104 (e.g., legacy HFC fiber node) to end user 106. By utilization of the advantageous configurations herein, fiber deeper or all-fiber migration schemes can utilize an HFC fiber node as an optical fiber distribution node, thereby greatly minimizing the need for fiber retrenching from an HFC node to an optical hub.

The architecture described herein, by avoiding the need for conventional compensation hardware, can therefore be structured as a significantly less expensive and more compact physical device than conventional devices. This novel and advantageous system and subsystem arrangement allows for multi-wavelength emission with simplicity, reliability, and low cost. Implementation of optical frequency comb generator 114, with high quality input source signal 116, further allows simultaneous control of multiple sources that are not realized by conventional discrete lasers. According to the embodiments herein, channel spacing, for example, may be 25 GHz, 12.5 GHz, or 6.25 GHz, based on available signal bandwidth occupancy.

The embodiments described herein realize still further advantages by utilizing a comb generator (i.e., optical frequency comb generator 114) that maintains a constant wavelength spacing, thereby avoiding optical beat interference (OBI) that may be prevalent in cases with simultaneous transmissions over a single fiber. In the exemplary embodiment illustrated in FIG. 1, fiber node 104 is shown as a passive system, and is thus expected to maintain a higher reliability than other migration approaches. Nevertheless, one of ordinary skill in the art, after reading and comprehending present application, will understand how the embodiments disclosed herein may also be adapted to a remote PHY solution, or to a remote CMTS that is included in the fiber node.

As illustrated and described herein, system 100 may utilize an architecture of coherent DWDM-PON incorporate novel solutions to meet the unique requirements of access environment, but with cost-efficient structures not seen in conventional hardware systems. Optical frequency comb generator 114 produces a plurality of simultaneous narrow width wavelength channels with controlled spacing, thereby allowing simplified tuning of the entire wavelength comb. This centralized comb light source in optical hub 102 therefore provides master seeding sources and LO signals for both downstream and upstream directions in heterodyne detection configurations in order to reuse the optical sources throughout the entirety of system 100. This advantageous configuration realizes significant cost savings and reduction in hardware complexity over intradyne detection schemes in long-haul systems, for example.

Figure 2:
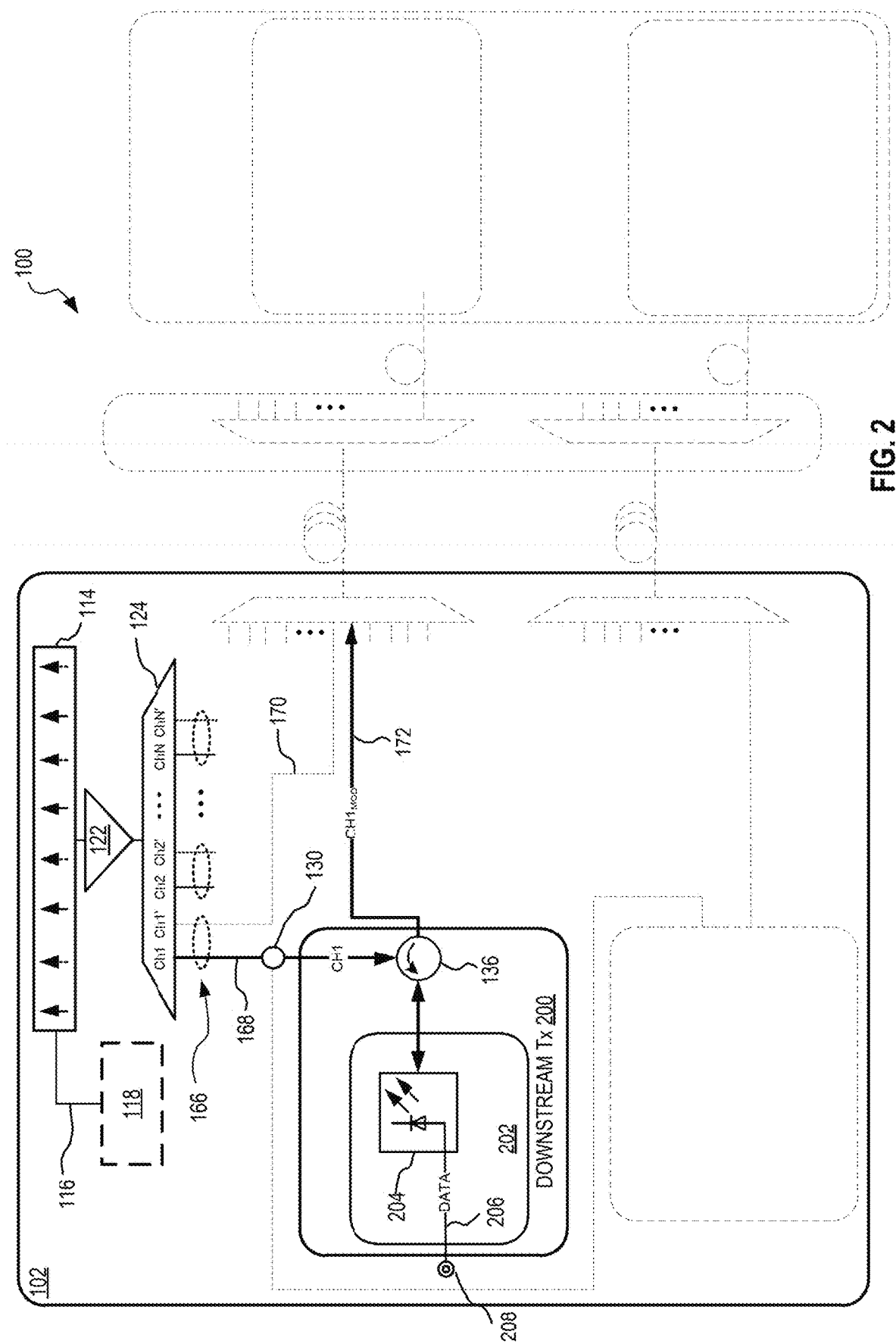
FIG. 2 is a schematic illustration depicting an exemplary transmitter that can be utilized with the fiber communication system depicted in FIG. 1.

FIG. 2 is a schematic illustration depicting an exemplary downstream transmitter 200 that can be utilized with fiber communication system 100, depicted in FIG. 1. Downstream transmitter 200 includes downstream optical circulator 136 (see FIG. 1, above) in two-way communication with a laser injected modulator 202, which includes a laser diode 204, which receives data 206 from an external data source 208. In an alternative embodiment, downstream transmitter 200 may include two separate fiber receivers (not shown), which would substitute, and eliminate the need, for downstream optical circulator 136 in the structural configuration shown.

In operation, downstream transmitter 200 performs the same general functions as downstream transmitter 126 (FIG. 1, described above). Laser injected modulator 202 utilizes laser diode 204 as a "slave laser." That is, laser diode 204 is injection locked by external laser 118, which functions as a single frequency or longitudinal mode master, or seed, laser to keep the frequency of a resonator mode of laser diode 204 close enough to the frequency of the master laser (i.e., laser 118) to allow for frequency locking. The principle of downstream transmitter 200 is also referred to as "laser cloning," where a single high quality master laser (i.e., laser 118) transmits a narrow bandwidth, low noise signal (i.e., source signal 116), and a relatively inexpensive slave laser (e.g., laser diode 204) can be used throughout system 100 to transmit data modulated signals, such as downstream modulated data stream 172 (Ch1). In an exemplary embodiment, laser diode 204 is a Fabry Perot laser diode (FP LD), or a vertical-cavity surface-emitting laser (VCSEL), in comparison with the considerably more expensive distributed feedback laser diodes (DFB LD) that are conventionally used. In an alternative embodiment, laser diode 204 is an LED, which can perform as a sufficient slave laser source according to the embodiments herein due to the utilization of the high quality source signal 116 that is consistently utilized throughout system 100.

More specifically, first unmodulated signal 168 (Ch1) exiting hub optical splitter 130 is input to downstream optical circulator 136, which then excites laser diode 204, that is, laser diode 204 emits light at a specified modulation rate. Laser injected modulator 202 adheres data 206 to the excited Ch1 signal, and the resultant modulated Ch1 signal with adhered data is output from downstream optical circulator 136 as downstream modulated data stream 172 (Ch1). According to this exemplary embodiment, first unmodulated signal 168 (Ch1) is input to downstream transmitter 126 as an unmodulated, low amplitude, narrow bandwidth, low noise "pure" source, and is modulated by laser diode 204, which is a high amplitude, wide bandwidth device, and resultant downstream modulated data stream 172 (Ch1) is a high amplitude, narrow bandwidth, low noise "pure" signal that can be transmitted throughout system 100 without the need for further conventional compensation means (hardware and programming). Suppression of adjacent longitudinal modes from laser diode 204, for example, is not necessary because of the exciting source signal (i.e., signal 168) is of such high quality and narrow bandwidth that output downstream modulated data stream 172 (Ch1) is substantially amplified only within the narrow bandwidth of external laser 118. In the exemplary embodiment illustrated in FIG. 2, laser injected modulator 202 implements direct modulation.

Optical injection locking as described herein thus improves upon the performance of the relatively less expensive, multi-longitudinal slave laser source (i.e., laser diode 204) in terms of spectral bandwidth and noise properties. With respect to heterodyne coherent detection, incoming signals (upstream or downstream) can be combined with the LO or pseudo-LO and brought to an intermediate frequency (IF) for electronic processing. According to this exemplary configuration, part of the LO/pseudo-LO optical power can also be employed as the master/seed laser for the reverse transmission direction, at both optical hub 102, and at end user 106 (described below with respect to FIG. 6), and thus a fully coherent system having a master seed and LO delivery from an optical hub can be achieved in a relatively cost-effective manner comparison with conventional systems.

Figure 3:
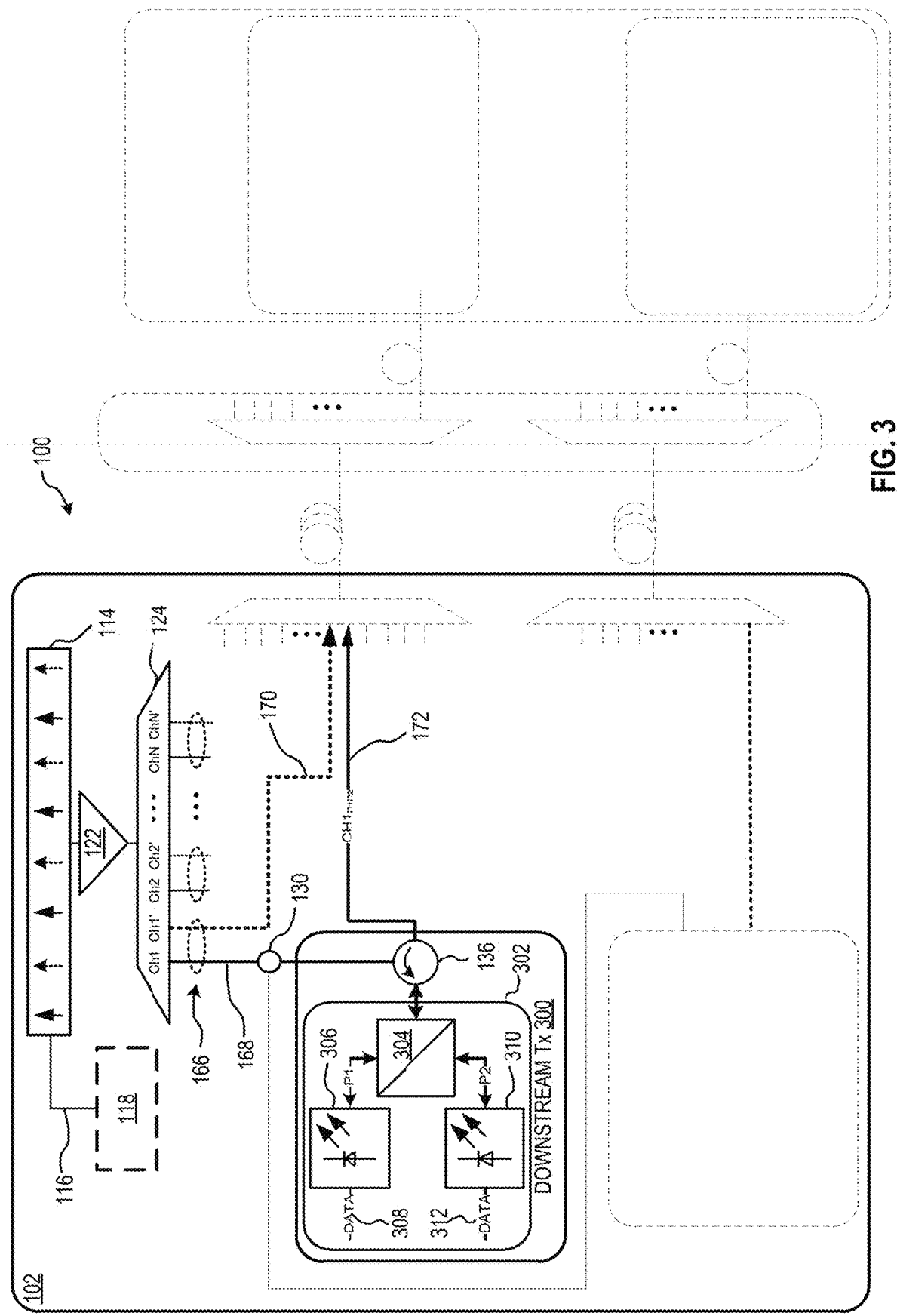
FIG. 3 is a schematic illustration depicting an alternative transmitter that can be utilized with the fiber communication system depicted in FIG. 1.

FIG. 3 is a schematic illustration depicting an alternative downstream transmitter 300 that can be utilized with fiber communication system 100, depicted in FIG. 1. Downstream transmitter 300 is similar to downstream transmitter 200 (FIG. 2), including the implementation of direct modulation, except that downstream transmitter 300 alternatively utilizes polarization division multiplexing to modulate the Ch1 signal into downstream modulated data stream 172 (Ch1).

Downstream transmitter 300 includes downstream optical circulator 136 (see FIG. 1, above) in two-way communication with a laser injected modulator 302, which includes a polarization beam splitter (PBS)/polarization beam combiner (PBC) 304, which can be a single device. Laser injected modulator 302 further includes a first laser diode 306 configured to receive first data 308 from an external data source (not shown in FIG. 3), and a second laser diode 310 configured to receive second data 312 from the same, or different, external data source.

In operation, downstream transmitter 300 is similar to downstream transmitter 200 with respect to the implementation of direct modulation, and master/slave laser injection locking. Downstream transmitter 300 though, alternatively implements dual-polarization from the splitter portion of PBS/PBC 304, which splits first unmodulated signal 168 (Ch1) into its x-polarization component P1 and y-polarization component P2, which separately excite first laser diode 306 and second laser diode 310, respectively. Similar to downstream transmitter 200 (FIG. 2), in downstream transmitter 300, first unmodulated signal 168 (Ch1) exiting hub optical splitter 130 is input to downstream optical circulator 136, the separate polarization components of which then excite laser diodes 306, 310, respectively, at the specified modulation rate. Laser injected modulator 302 adheres data first and second data 308, 312 to the respective excited polarization components of the Ch1 signal, which are combined by the combiner portion of PBS/PBC 304. The resultant modulated Ch1 signal with adhered data is output from downstream optical circulator 136 as downstream modulated data stream 172 (Ch1).

In an exemplary embodiment, the polarized light components received by first and second laser diodes 306, 310 are orthogonal (90 degrees and/or noninteractive). That is, first laser diode 306 and second laser diode 310 are optimized as slave lasers to lock onto the same wavelength as external laser 118 (master), but with perpendicular polarization directions. By this configuration, large data packets (e.g., first data 308 and second data 312) can be split and simultaneously sent along separate pathways before recombination as downstream modulated data stream 172 (Ch1). Alternatively, first data 308 and second data 312 may come from two (or more) separate unrelated sources. The orthogonal split prevents data interference between the polarized signal components. However, one of ordinary skill in the art will appreciate that, according to the embodiment of FIG. 3, first unmodulated signal 168 (Ch1) can also be polarized at 60 degrees, utilizing similar principles of amplitude and phase, as well as wavelength division. First unmodulated signal 168 (Ch1) can alternatively be multiplexed according to a spiral or vortex polarization, or orbital angular momentum. Additionally, whereas the illustrated embodiment features polarization multiplexing, space division multiplexing and mode division multiplexing may be also alternatively implemented.

According to this exemplary embodiment, master continuous wave signal for Ch1, namely, first unmodulated signal 168, is received from optical frequency comb generator 114 and is split to be used, in the first part, as the LO for upstream receiver 132, and in the second part, to synchronize two slave lasers (i.e., first laser diode 306 and second laser diode 310) by the respective x-polarization and y-polarization light portions such that both slave lasers oscillate according to the wavelength of the master laser (i.e., external laser 118). Data (i.e., first data 308 and second data 312) is directly modulated onto the two slave lasers, respectively. This injection locking technique thus further allows for frequency modulation (FM) noise spectrum control from the master laser to the slave laser, and is further able to realize significant improvements in FM noise/phase jitter suppression and emission linewidth reduction.

As described herein, utilization of optical injection with a dual-polarization optical transmitter (i.e., downstream transmitter 300) by direct modulation may advantageously implement relatively lower-cost lasers to perform the functions of conventional lasers that are considerably more costly. According to this configuration of a dual-polarization optical transmitter by direct modulation of semiconductor laser together with coherent detection, the present embodiments are particular useful for short-reach applications in terms of its lower cost and architectural compactness. Similar advantages may be realized for long reach applications.

Figure 4:
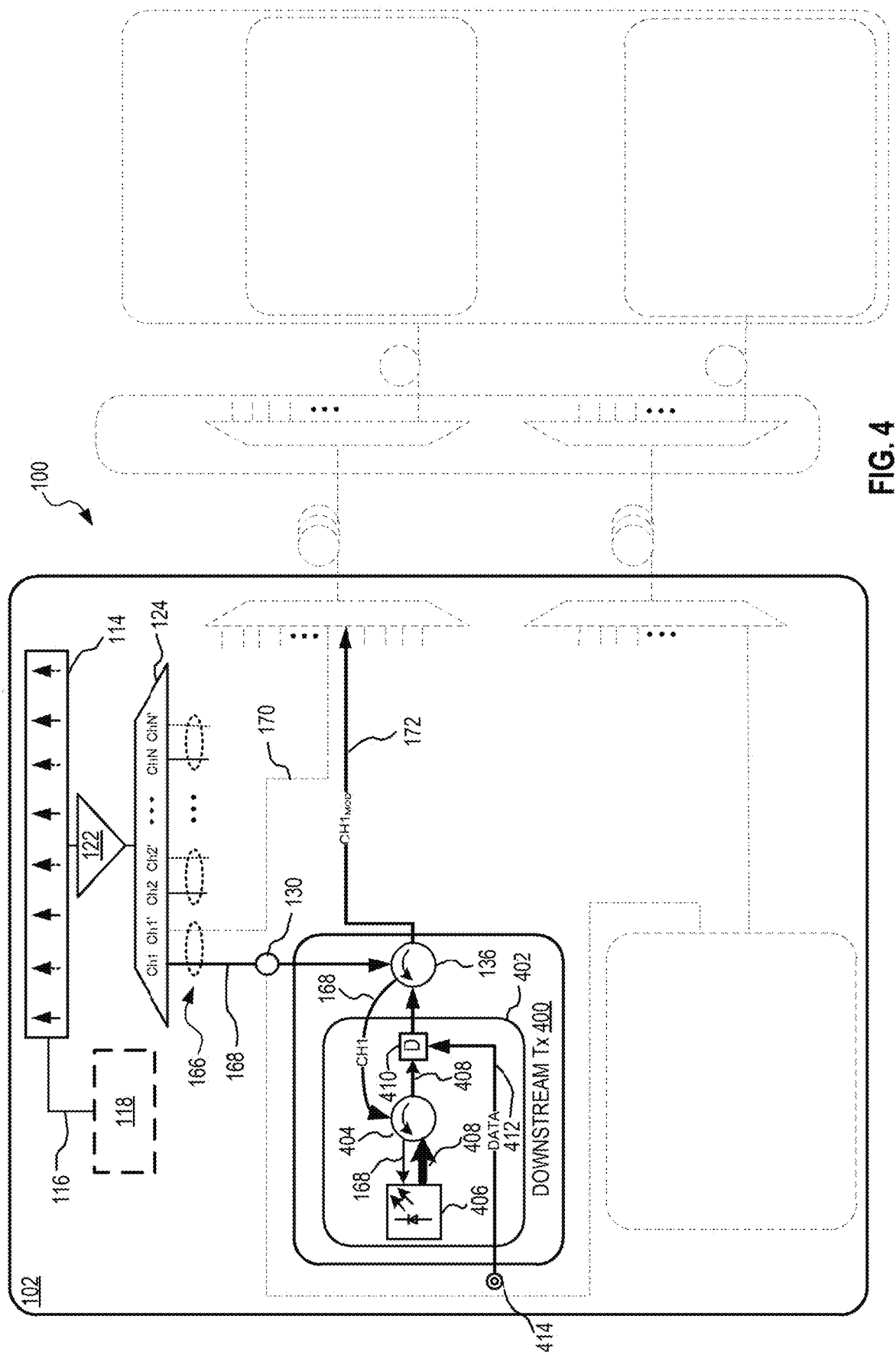
FIG. 4 is a schematic illustration depicting an alternative transmitter that can be utilized with the fiber communication system depicted in FIG. 1.

FIG. 4 is a schematic illustration depicting an alternative downstream transmitter 400 that can be utilized with fiber communication system 100, depicted in FIG. 1. Downstream transmitter 400 is similar to downstream transmitter 200 (FIG. 2), except that downstream transmitter 400 alternatively implements external modulation, as opposed to direct modulation, to modulate the Ch1 signal into downstream modulated data stream 172 (Ch1). Downstream transmitter 400 includes downstream optical circulator 136 (see FIG. 1, above) and a laser injected modulator 402. Downstream optical circulator 136 is in one-way direct communication with a separate external optical circulator 404 that may be contained within laser injected modulator 402 or separate. Laser injected modulator 402 further includes a laser diode 406, which receives the low amplitude, narrow bandwidth, first unmodulated signal 168 (Ch1) and emits an excited, high amplitude, narrow bandwidth, optical signal 408 back to external optical circulator 404. Laser injected modulator 402 still further includes an external modulating element 410, which receives data 412 from an external data source 414, and adheres data 412 with optical signal 408 to be unidirectionally received back by downstream optical circulator 136 and output as downstream modulated data stream 172 (Ch1).

In this exemplary embodiment, downstream transmitter 400 performs the same general functions as downstream transmitter 126 (FIG. 1, described above), but uses external modulation as the injection locking mechanism to lock laser diode 406 to the wavelength of the master laser source (e.g., external laser 118). To implement external modulation, this embodiment regulates optical signal flow through mostly unidirectional optical circulators (i.e., downstream optical circulator 136, external optical circulator 404). External modulating element 410 may optionally include a demultiplexing filter (not shown) as an integral component, or separately along the signal path of downstream modulated data stream 172 (Ch1) prior to input by downstream receiver 150. In an exemplary embodiment, external modulating element 410 is a monitor photodiode, and injection locking is performed through a rear laser facet.

Figure 5:
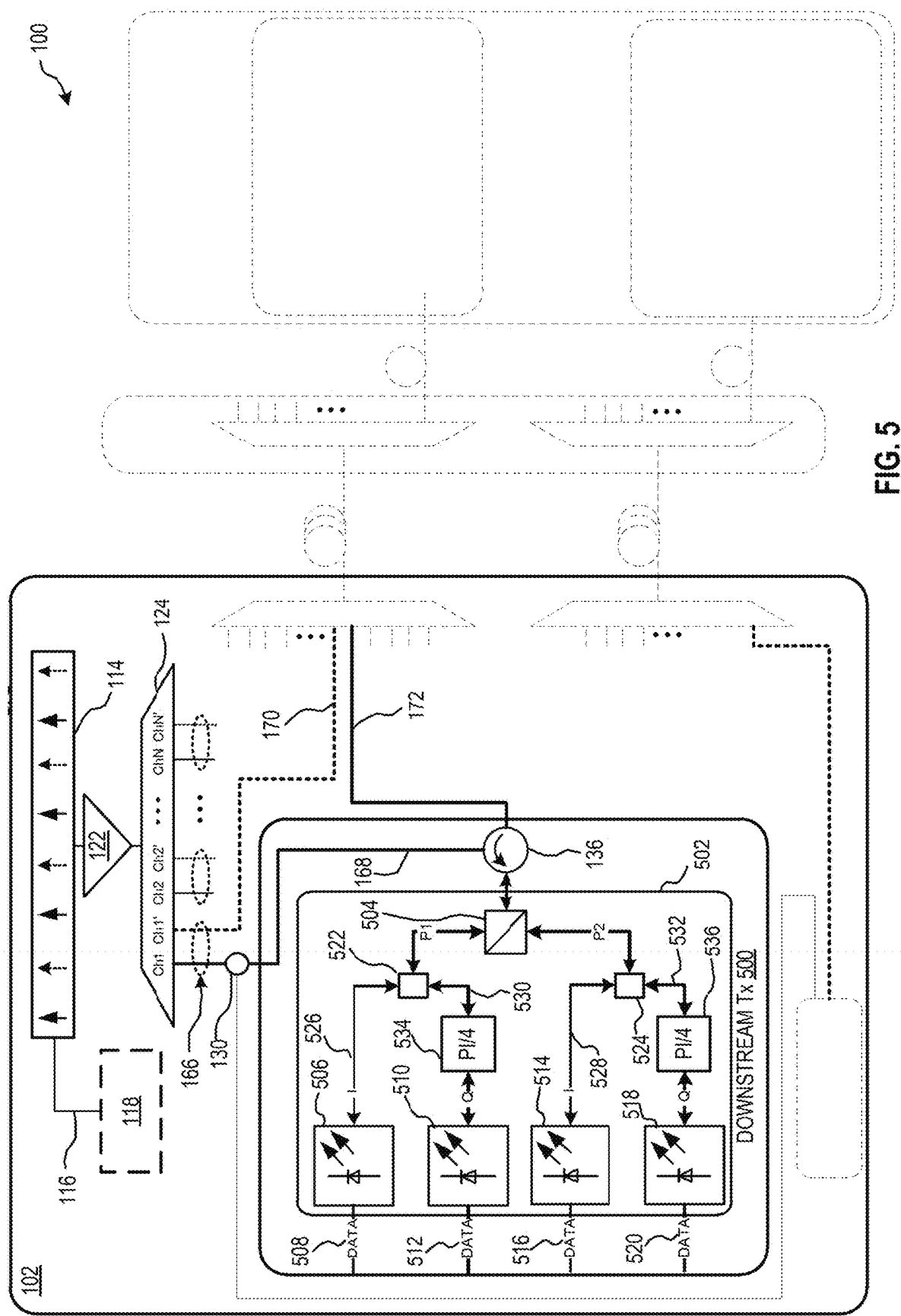
FIG. 5 is a schematic illustration depicting an alternative transmitter that can be utilized with the fiber communication system depicted in FIG. 1.

FIG. 5 is a schematic illustration depicting an alternative downstream 500 transmitter that can be utilized with fiber communication system 100, depicted in FIG. 1. Downstream transmitter 500 is similar to downstream transmitter 300 (FIG. 3), including the implementation of direct modulation and polarization division multiplexing, except that downstream transmitter 500 further implements quadrature amplitude modulation (QAM) to modulate the Ch1 signal into downstream modulated data stream 172 (Ch1). That is, further external modulating elements may be utilized per polarization branch (FIG. 2, above) to generate QAM signals.

Downstream transmitter 500 includes downstream optical circulator 136 (see FIG. 1, above) in two-way communication with a laser injected modulator 502, which includes a PBS/PBC 504, which can be a single device or two separate devices. Additionally, all of the components of laser injected modulator 502 may themselves be separate devices, or alternatively all contained within a single photonic chip. Laser injected modulator 502 further includes a first laser diode 506 configured to receive first data 508 from an external data source (not shown in FIG. 5), a second laser diode 510 configured to receive second data 512 from the same, or different, external data source, a third laser diode 514 configured to receive third data 516 from the same/different, external data source, and a fourth laser diode 518 configured to receive fourth data 520 from the same/different external data source.

In operation, downstream transmitter 500 implements dual-polarization from the splitter portion of PBS/PBC 504, which splits first unmodulated signal 168 (Ch1) into its x-polarization component (P1) and y-polarization component (P2). Each polarization component P1, P2 is then input to first non-polarized optical splitter/combiner 522 and second non-polarized optical splitter/combiner 524, respectively. First and second optical splitters/combiners 522, 524 each then further split their respective polarization components P1, P2 into their I-signals 526, 528, respectively, and also into their Q-signals 530, 532, respectively. Generated I-signals 526, 528 then directly excite laser diodes 506, 514, respectively. Before directly communicating with laser diodes 510, 518, respectively, generated Q-signals 530, 532 first pass through first and second quadrature phase shift elements 534, 536, respectively, each of which shifts the Q-signal by 45 degrees in each direction, such that the respective Q-signal is offset by 90 degrees from its respective I-signal when recombined at splitters/combiners 522, 524.

The resultant modulated Ch1 signal, with adhered data, is output from downstream optical circulator 136 of downstream transmitter 500 as downstream modulated data stream 172 (Ch1), and as a polarized, multiplexed QAM signal. According to this exemplary embodiment, utilization of a photonic integrated circuit allows for directly modulated polarization of a multiplexed coherent system, but at significantly lower cost hardware configurations than could be realized by conventional architectures. In an exemplary embodiment, laser diodes 506, 510, 514, 516 are PAM-4 modulated laser diodes capable of generating 16-QAM polarization multiplexed signals.

Figure 6:
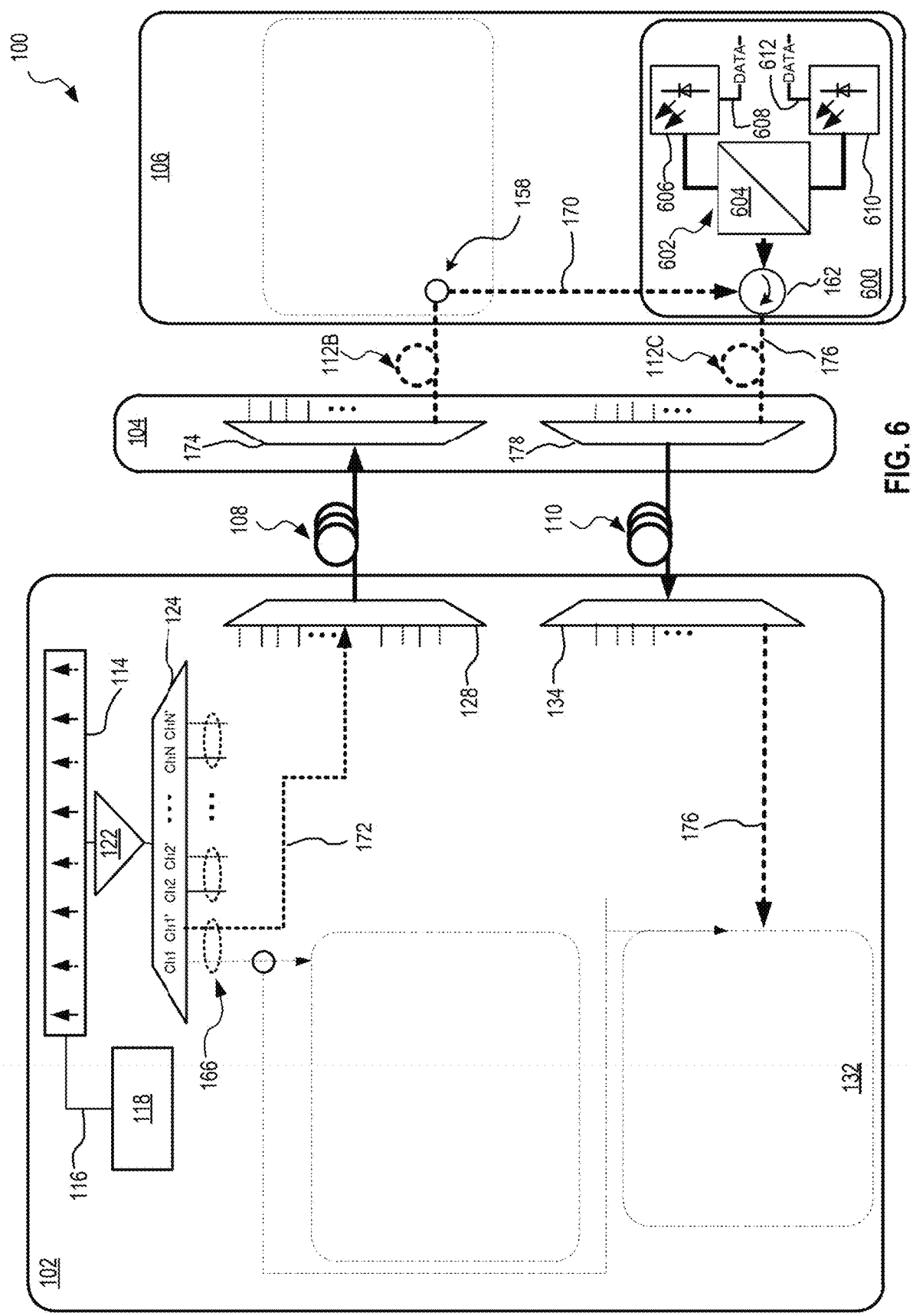
FIG. 6 is a schematic illustration depicting an exemplary upstream connection that can be utilized with the fiber communication system depicted in FIG. 1.

FIG. 6 is a schematic illustration depicting an exemplary upstream transmitter 600 that can be utilized with the fiber communication system 100, depicted in FIG. 1. In the embodiment illustrated in FIG. 6, upstream transmitter 600 is similar to downstream transmitter 300 (FIG. 3) in structure and function. Specifically, upstream transmitter 600 includes upstream optical circulator 162 (see FIG. 1, above) in two-way communication with a laser injected modulator 602 (not separately illustrated in FIG. 6), which includes a PBS/PBC 604, which can be a single device or separate devices. Laser injected modulator 602 further includes a first laser diode 606 configured to receive first data 608 from an external data source (not shown in FIG. 6), and a second laser diode 610 configured to receive second data 612 from the same, or different, external data source. Similar to the embodiments of FIGS. 2-5, above, downstream transmitter 600 may also eliminate for upstream optical circulator 162 by the utilization of at least two separate fiber receivers (not shown).

Upstream transmitter 600 is thus nearly identical to downstream transmitter 300 (FIG. 3), except that upstream transmitter 600 utilizes second unmodulated signal 170 (Ch1') as the end user seed source, in laser injected modulator 602, to combine or adhere with data (e.g., first data 608, second data 612) to generate upstream modulated data stream 176 (Ch1') to carry upstream data signals to an upstream receiver (e.g., upstream receiver 132). In operation, first laser diode 606 and second laser diode 610 also function as slave lasers by injection locking to the master signal from external laser 118. That is, symmetric or asymmetric data for Ch1' (e.g., first data 608, second data 612) is modulated onto the two slave lasers (i.e., first laser diode 606 and second laser diode 610) with polarization multiplexing, much the same as the process implemented with respect to downstream transmitter 300 (FIG. 3) in optical hub 102.

In this example, upstream transmitter 600 is illustrated to substantially mimic the architecture of downstream transmitter 300 (FIG. 3). Alternatively, upstream transmitter 600 could equivalently mimic the architecture of one or more of downstream transmitters 200 (FIG. 2), 400 (FIG. 4), or 500 (FIG. 5) without departing from the scope of the present disclosure. Furthermore, upstream transmitter 600 can conform to any of the embodiments disclosed by FIGS. 2-5, irrespective of the specific architecture of the particular downstream transmitter utilized within optical hub 102. By utilization of high-quality, narrow bandwidth, low noise external laser source 118, the master/slave laser relationship carries through the entirety of system 100, and the plurality of end users 106 that receive modulated/unmodulated signal pairs (which may be 32, 64, 128, or as many as 256 from a single fiber line pair, e.g., downstream fiber 108 and upstream fiber 110).

The significant cost savings according to the present embodiments are thus best realized when considering that as many as 512 downstream transmitters (e.g., downstream transmitter 126, FIG. 1) and upstream transmitters (e.g., upstream transmitter 160, FIG. 1) may be necessary to fully implement all available chattel pairs from a single optical hub 102. The present embodiments implement a significantly lower cost and less complex hardware architecture to utilize the benefits accruing from implementation of high-quality external laser 118, without having to add expensive single longitudinal mode laser diodes, or other compensation hardware necessary to suppress adjacent longitudinal modes from inexpensive lasers or the noise components produced thereby.

Figure 7:
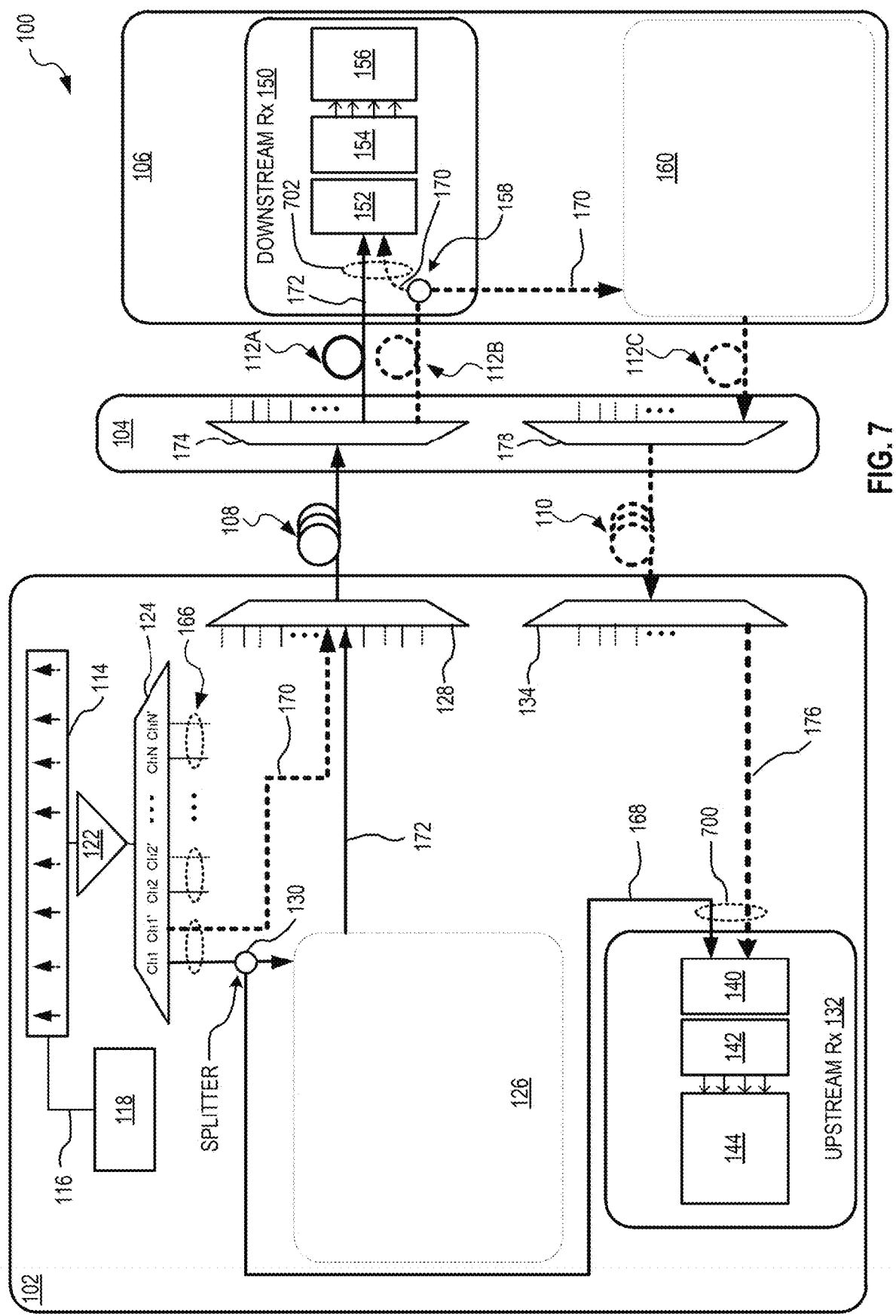
FIG. 7 is a schematic illustration depicting an exemplary processing architecture implemented with the fiber communication system depicted in FIG. 1.

FIG. 7 is a schematic illustration depicting an exemplary processing architecture which can be implemented for upstream receiver 132, downstream receiver 150, and fiber communication system 100, depicted in FIG. 1. The respective architectures of upstream receiver 132 and downstream receiver 150 are similar with respect to form and function (described above with respect to FIG. 1), except that upstream receiver 132 receives a first data stream pair 700 for Ch1, Ch1', in reverse of a second data stream pair 702, which is received by downstream receiver 150. In other words, as described above, first data stream pair 700 includes first unmodulated signal 168 (Ch1) as the LO and upstream modulated data stream 176 (Ch1') to carry data, whereas second data stream pair 702 includes unmodulated signal 170 (Ch1') as the LO and downstream modulated data stream 172 (Ch1) to carry data.

First and second data stream pairs 700, 702 the multiplexed phase synchronized pairs modulated/unmodulated of optical signals that are converted into analog electrical signals by ICR 140 and ICR 152, respectively. The respective analog signals are then converted into digital domain by ADC 142 and ADC 154, for digital signal processing by DSP 144 and DSP 156. In an exemplary embodiment, digital signal processing may be performed by a CMOS ASIC employing very large quantities of gate arrays. A conventional CMOS ASIC, for example, can utilize as many as 70 million gates to process incoming digitized data streams. In the conventional systems, modulated data streams for Ch1 and Ch1' are processed independently, which requires significant resources to estimate frequency offset, drift, and digital down conversion compensation factors (e.g., $e^{-j\omega t}$, where $\omega$ represents the frequency difference between first unmodulated signal 168 and upstream modulated data stream 176, and $\omega$ is held constant for coherent tone pair 166, as extended throughout system 100).

According to the exemplary embodiments disclosed herein, on the other hand, the modulated and unmodulated signals from Ch1 and Ch1' are phase synchronized together such that the difference between $\omega$ of the signal pair is always known, and phase synchronized to maintain a constant relationship. In contrast, conventional systems are required to constantly estimate the carrier phase to compensate for factors such as draft which requires considerable processing resources, as discussed above. According to the present embodiments though, since Ch1 and Ch1' are synchronized together as first and second data stream pairs 700, 702, the offset ω between the pairs 700, 702 need not be estimated, since it may be instead easily derived by a simplified subtraction process in DSP 144 and DSP 156 because the signal pairs will drift together by the same amount in a constant relationship. By this advantageous configuration and process, digital signal processing by a CMOS ASIC can be performed utilizing as few as one million gates, thereby greatly improving the processing speed of the respective DSP, and/or reducing the number of physical chips required to perform the processing (or similarly increasing the amount of separate processing that may be performed by the same chip). At present, implementation of the embodiments described herein may improve downstream and upstream data transmission speeds by as much as 5000 times faster than conventional systems.

Figure 8:
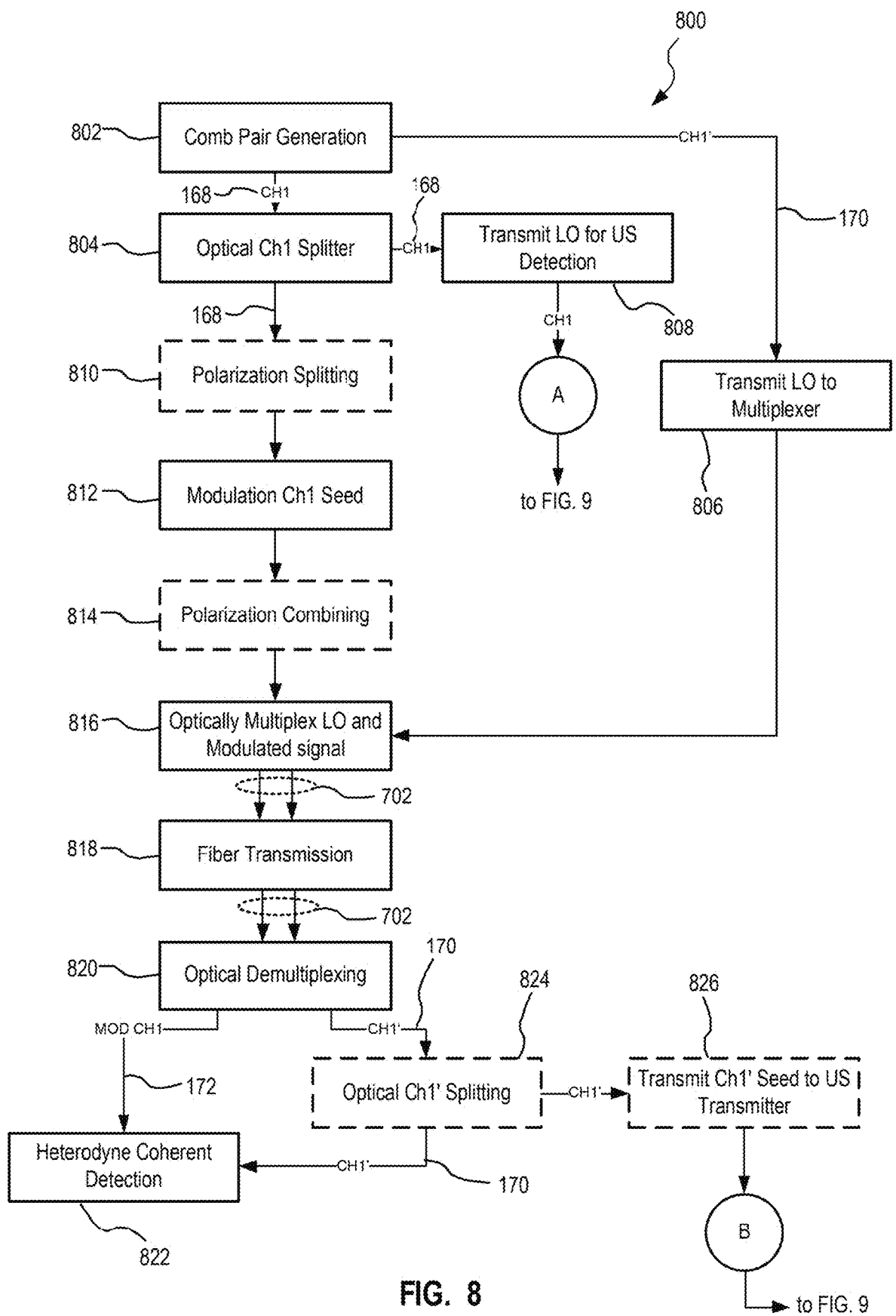
FIG. 8 is a flow chart diagram of an exemplary downstream optical network process.

FIG. 8 is a flow chart diagram of an exemplary downstream optical network process 800 that can be implemented with fiber communication system 100, depicted in FIG. 1. Process 800 begins at step 802. In step 802, coherent tone pairs 166 are generated and output by optical frequency comb generator 114, amplifier 122, and first hub optical demultiplexer 124. Similar to the discussion above, for simplification purposes, the following discussion addresses specific coherent tone pair 166(1) for Ch1, Ch1'. Coherent tone pair 166 includes first unmodulated signal 168 (Ch1) and second unmodulated signal 170 (Ch1'). Once coherent tone pair 166 is generated, process 800 proceeds from step 802 to steps 804 and 806, which may be performed together or simultaneously.

In step 804, first unmodulated signal 168 (Ch1) is input to an optical splitter, e.g., optical splitter 130, FIG. 1. In step 806, second unmodulated signal 170 (Ch1') is transmitted to a multiplexer, e.g., hub optical multiplexer 128, FIG. 1. Referring back to step 804, first unmodulated signal 168 (Ch1) is split to function both as an LO for upstream detection, and as a seed for downstream data transmission. For upstream detection, step 804 proceeds to step 808, where first unmodulated signal 168 (Ch1) is received by an upstream receiver, i.e., upstream receiver 132, FIG. 1. For downstream data transmission, step 804 separately and simultaneously proceeds to step 810.

Step 810 is an optional step, where polarization division multiplexing is desired. In step 810, first unmodulated signal 168 (Ch1) is split into its x-component and y-component parts P1, P2, respectively (e.g., by PBS/PBC 304, FIG. 3 or PBS/PBC 504, FIG. 5) for separate direct or external modulation. Where polarization division multiplexing is not utilized, process 800 skips step 810, and instead proceeds directly from step 804 to step 812. In step 812, first unmodulated signal 168 (Ch1), or its polarized components if optional step 810 is implemented, is modulated by direct (e.g., FIGS. 2, 3, 5) or external (e.g., FIG. 4) modulation. Process 800 then proceeds from step 812 to step 814. Step 814 is an optional step, which is implemented if optional step 810 is also implemented for polarization division multiplexing. In step 814, the x-component and y-component parts P1, P2 are recombined (e.g., by PBS/PBC 304, FIG. 3 or PBS/PBC 504, FIG. 5) for output as downstream modulated data stream 172 (Ch1). Where polarization division multiplexing was not utilized, process 800 skips step 814, and instead proceeds directly from step 812 to step 816.

In step 816, second unmodulated signal 170 (Ch1') and downstream modulated data stream 172 (Ch1) are optically multiplexed, i.e., by hub optical multiplexer 128, FIG. 1, as a phase synchronized data stream pair (e.g., second data stream pair 702, FIG. 7). Process 800 then proceeds from step 816 to step 818, where the phase synchronized data stream pair is transmitted over an optical fiber, i.e., downstream fiber 108, FIG. 1. Process 800 then proceeds from step 818 to step 820, where the synchronized data stream pair is optically demultiplexed, e.g., by node optical demultiplexer 174 in fiber node 104. Process 800 then proceeds from step 820 to step 822, where both components of the demultiplexed data stream pair (e.g., second unmodulated signal 170 (Ch1') and downstream modulated data stream 172 (Ch1)) are received by a downstream receiver (e.g., downstream receiver 150, FIG. 1) for heterodyne coherent detection.

Where an end user (e.g., end user 106) further includes upstream transmission capability, process 800 further includes optional steps 824 and 826. In step 824, and prior to downstream reception in step 822, second unmodulated signal 170 (Ch1') is optically split (e.g., by end user optical splitter 158, FIG. 1), and additionally transmitted, in step 826, to an upstream transmitter of the end user (e.g., upstream transmitter 160, FIG. 1) as a seed signal for a modulator (e.g., modulator 164, FIG. 1) for upstream data transmission, as explained further below with respect to FIG. 9.

Figure 9:
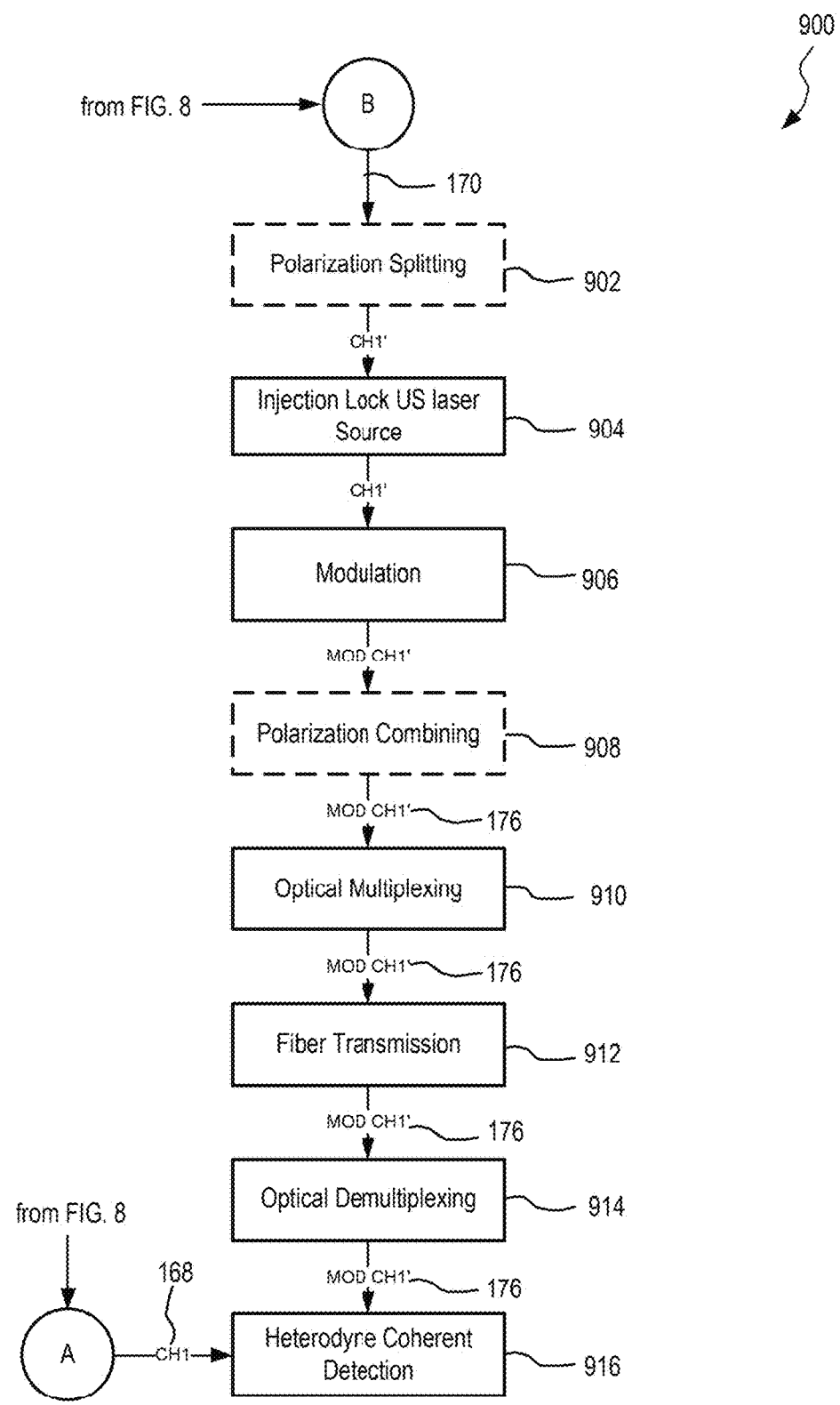
FIG. 9 is a flow chart diagram of an exemplary upstream optical network process that can be implemented with the downstream process depicted in FIG. 8.

FIG. 9 is a flow chart diagram of an exemplary upstream optical network process 900 that can be optionally implemented with fiber communication system 100, depicted in FIG. 1. Process 900 begins at optional step 902. In step 902, where polarization division multiplexing is utilized in the upstream transmitter (e.g., upstream transmitter 160, FIG. 1), second unmodulated signal 170 (Ch1') (from step 826, FIG. 8) is split into its x-component and y-component parts (e.g., by PBS/PBC 604, FIG. 6) for separate direct or external modulation. Where polarization division multiplexing is not utilized, step 902 is skipped, and process 900 instead begins at step 904.

In step 904, second unmodulated signal 170 (Ch1'), or its polarized components if optional step 902 is implemented, is injection locked to the master source laser (e.g., external laser 118, FIG. 1), as described above with respect to FIGS. 1 and 6. Step 904 then proceeds to step 906, where injection locked signal is modulated by direct or external modulation. Process 900 then proceeds from step 906 to step 908. Step 908 is an optional step, which is implemented if optional step 902 is also implemented for polarization division multiplexing. In step 908, the x-component and y-component parts of the excited Ch1' signal are recombined (e.g., by PBS/PBC 604, FIG. 6) for output as upstream modulated data stream 176 (Ch1'). Where polarization division multiplexing was not utilized, process 900 skips step 908, and instead proceeds directly from step 906 to step 910.

In step 910, upstream modulated data stream 176 (Ch1') is optically multiplexed, i.e., by node optical multiplexer 178, FIG. 1, with other upstream data stream signals (not shown). Process 900 then proceeds from step 910 to step 912, where upstream modulated data stream 176 (Ch1') is transmitted over an optical fiber, i.e., upstream fiber 110, FIG. 1. Process 900 then proceeds from step 912 to step 914, where upstream modulated data stream 176 (Ch1') is optically demultiplexed, e.g., by second hub optical demultiplexer 134, which separates the selected data stream from the other upstream data stream signals, for transmission to a particular upstream receiver tuned to receive the modulated data stream. Process 900 then proceeds from step 914 to step 916, where both components (e.g., first unmodulated signal 168 (Ch1), FIG. 8, and upstream modulated data stream 176 (Ch1')) of the upstream data stream pair, e.g., first data stream pair 700, FIG. 7, are received by an upstream receiver (e.g., upstream receiver and 32, FIG. 1) for heterodyne coherent detection.

As illustrated in the exemplary embodiment, a difference between upstream and downstream signal transmission is that an entire synchronized modulated/unmodulated channel pair (e.g., second data stream pair 702, FIG. 7) can be transmitted in the downstream direction, whereas, in the upstream direction, only a data modulated signal (e.g., upstream modulated data stream 176 (Ch1')) to be transmitted over the upstream fiber connection, i.e., upstream fiber 110. An advantage of the present configuration is that the LO for upstream coherent detection (e.g., at upstream receiver 132, FIG. 1) comes directly from the split signal, i.e., first unmodulated signal 168 (Ch1) generated from optical frequency comb generator 114 within optical hub 102, after separation by first hub optical demultiplexer 124, as depicted in FIG. 1. Conventional systems typically require LO generation at each stage of the respective system. According to the present disclosure, on the other hand, relatively inexpensive slave lasers can be implemented throughout the system architecture for modulation and polarization multiplexing in both optical hub 102 and end user 106 components, without requiring an additional LO source at the end user.

According to the present disclosure, utilization of dual-polarization optical transmitters, and by direct modulation of semiconductor lasers with coherent detection, is particularly beneficial for not only longhaul applications, but also for shortreach applications to reduce the cost of electronic hardware, while also rendering the overall network system architecture more compact. The present systems and methods further solve the conventional problem of synchronizing two laser sources over a long period of time. Utilization of the phase synchronized data stream pairs and slave lasers herein allows continual synchronization of the various laser sources throughout the system during its entire operation. These solutions can be implemented within coherent DWDM-PON system architectures for access networks in a cost-efficient manner.

Utilization of the high quality optical comb source at the front end of the system thus further allows a plurality of simultaneous narrow bandwidth wavelength channels to be generated with easily controlled spacing, and therefore also simplified tuning of the entire wavelength comb. This centralized comb light source in the optical hub provides master seeding sources and LO signals that can be reused throughout the system, and for both downstream and upstream transmission. The implementation of optical injection, as described herein, further improves the performance of low-cost multi-longitudinal slave laser sources in terms of spectral bandwidth and noise properties. Access networks according to the present systems and methods thus achieve more efficient transmission of wavelengths through optical fibers, thereby increasing the capacity of transmitted data, but at lower power, increased sensitivity, lower hardware cost, and a reduction in dispersion, DSP compensation, and error correction.

Injection Locking Systems and Methods

As described above, the innovative access network architectures of the present embodiments that implement coherent optics technology form the foundation of achieving transport speeds of 100 G and beyond in the access network paradigm. The coherent modulation schemes described above advantageously enable an access network to drive down cost and complexity due to the spectral efficiency of coherent optics technology, as well as the management simplicity of the present systems and methods.

In a typical access network, much of the cost per bit of the network is fixed (e.g., by the fiber, line systems, facilities, management system, etc.), and largely independent of the data rate. Thus, the cost per bit in the access network will be most significantly lowered by achieving a higher data rate. In a practical implementation of the embodiments described above, the present inventors have already achieved a single-direction capacity of over 8,000 Gb/s on a single fiber, which represents approximately 5,000 times the capacity of access networks employing analog optics technology. This capacity is projected to increase to approximately 25,000 Gb/s per fiber within the next year, 50,000 Gb/s within the following few years, and greater within the next decade. However, the bulk of the capacity improvements has been primarily directed toward P2P configurations; conventional direct detection techniques have not been designed to reach residential end users in their homes.

The following systems and methods describe further improvements to the novel coherent PON (CPON) embodiments, described above, that implement injection locking technology from a master laser source. In exemplary embodiments, the present injection locking techniques may be implemented with respect to a master laser source generating a plurality of distinct coherent CW signals, or with respect to a master laser source generating a plurality of phase synchronized coherent tone pairs for each wavelength (e.g., phased synchronized coherent tone source pairs 166, FIG. 1).

In an exemplary embodiment, a novel CPON architecture implements optical injection locking technology that results in a significant reduction to the structural cost and operational complexity of an ONU. In some embodiments, homodyne detection techniques are implemented at the ONU utilizing downlink signals for both a master laser and a local oscillator. In other embodiments, heterodyne detection techniques are implemented at the ONU using remote delivery for the master laser and the local oscillator. According to these innovative the methods, the present CPON configurations advantageously overcome the significant limitations of the conventional direct detection systems described above.

Figure 10:
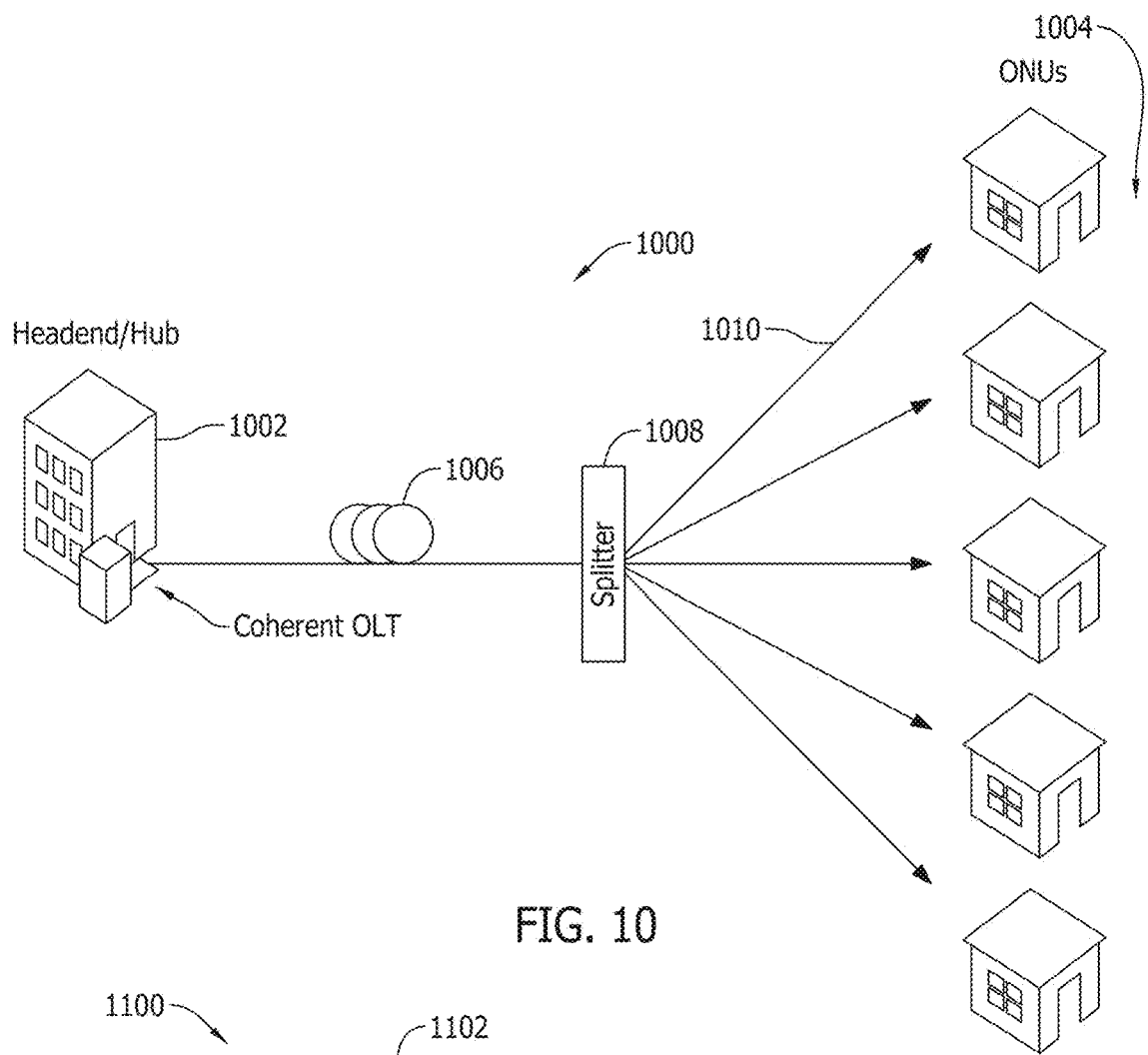
FIG. 10 is a schematic illustration of a point to multipoint coherent passive optical network.

FIG. 10 is a schematic illustration of a P2MP CPON 1000. In an exemplary embodiment, P2MP CPON 1000 includes a headend/hub 1002 in operable communicative coupling with a plurality of end users 1004 over a transport medium 1006. In this example, headend/hub 1002 may represent a central office, and may additionally include at least one coherent OLT as the MTS thereof. In a similar manner, one or more of end users 1004 may represent a residential home subscriber, and may include a separate ONU as the modem thereof at each respective residential location. Additionally in this example, transport medium 1006 may be an optical fiber having a length of 80 km, and configured to transport data at a 120 Gb/s capacity.

In an embodiment, CPON 1000 may be a coherent optical network configured to transmit a downstream coherent optical signal over transport medium 1006, from headend/hub 1002 to a splitter 1008, which splits the downstream coherent optical signal into a plurality of optical wavelengths, for further transport, over a plurality of short fibers 1010, to respective ONUs of end users 1004. In this example, the OLT of headend/hub 1002 may include at least one downstream coherent optical transmitter (not separately shown), and each ONU of an end-user 1004 may include a counterpart downstream coherent optical receiver. In an embodiment, splitter 1008 may represent one or more of an optical combiner, an optical splitter, a wavelength multiplexer, a wavelength demultiplexer, an optical coupler, and/or combinations thereof.

In a practical implementation of P2MP CPON 1000, the present inventors have successfully demonstrated a 120 Gb/s capacity, shared among 512 subscriber end users 1004, per wavelength over 80 km of fiber 1006. The present embodiments therefore realize significant improvements to the downstream portion of the CPON solution, thereby providing a technically feasible approach for both an extended reach, and also an ultra-high split ratio, for beyond the target 100 G data rate capacity.

More particularly, the downstream solutions described herein have been successfully proven to advantageously increase the downstream capacity reach and split ratio, and for both conventional communication networks as well as emerging full duplex coherent optical systems (i.e., simultaneous bidirectional communication over the same fiber and same wavelength through coherent optics technology). The present systems and methods further advantageously enable full utilization of a novel coherent upstream burst transceiver, as well as all of the coherent optics injection locking techniques described herein, both individually and in combination, while also providing for use of a significantly low-cost laser at the customer premises of an end user. The novel coherent upstream burst transceiver is the subject of different application, whereas the following embodiments focus in greater detail on customer premises equipment, such as the ONU, which represents one of the most cost-sensitive portions of the network. As described further below, the systems and methods herein advantageously enable the use of significantly less expensive lasers that simplify the coherent transceiver configuration, which results in an ultra-low cost coherent transceiver that is relatively affordable for implementation at each subscriber residential home location, in comparison with conventional direct detection communication systems.

Figure 11:
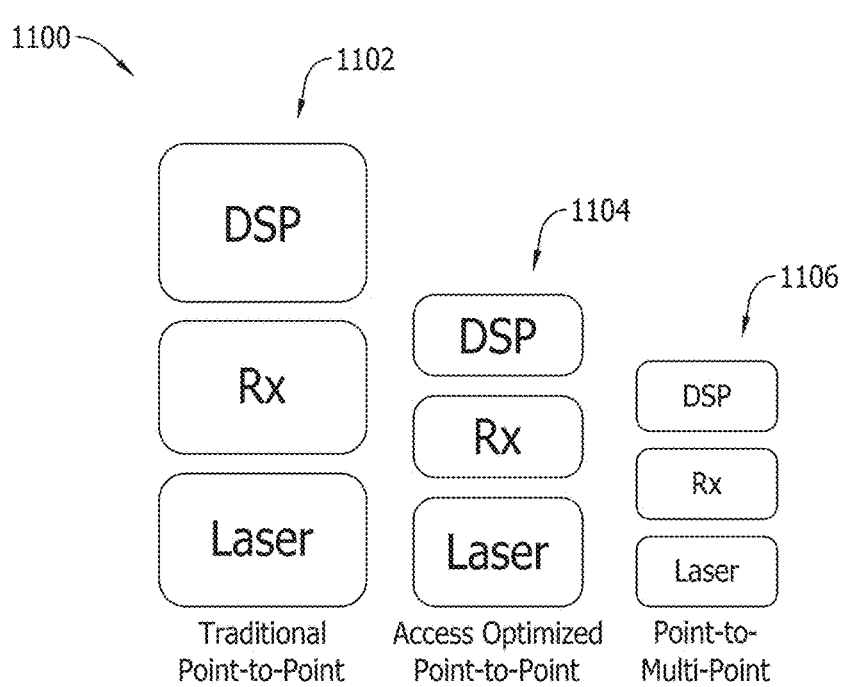
FIG. 11 depicts a comparative distribution between the present embodiments and conventional systems with respect to relative cost and complexity of structural components and algorithms.

FIG. 11 depicts a comparative distribution 1100 between the present embodiments and conventional systems with respect to relative cost and complexity of structural components and algorithms. More specifically, although not specifically shown to scale, comparative distribution 1100 illustrates the relative cost and complexity of the various DSP, receiver (RX), and laser hardware/software between a conventional P2P PON system 1102, and optimized access P2P PON system 1104, and a P2MP CPON system 1106 (e.g., P2MP CPON 1000, FIG. 10). In an exemplary embodiment, comparative distribution 1100 represents the relative cost and complexity improvements with respect to conventional long haul and metro transceivers, in particular with respect to minimization of DSP complexity, and simplification and cost reduction of the receiver.

Nevertheless, reduction of the cost and complexity of the laser source has been a significant challenge to conventional solutions. As described above, high-quality laser sources are known, but are too expensive to be practically implemented at the location of each end user in a coherent P2MP network. The following embodiments thus demonstrate an innovative solution for inexpensively providing a high-quality, less complex, laser source at each downstream receiver/upstream transmitter of an end user (e.g., the ONU).

Figure 12A:
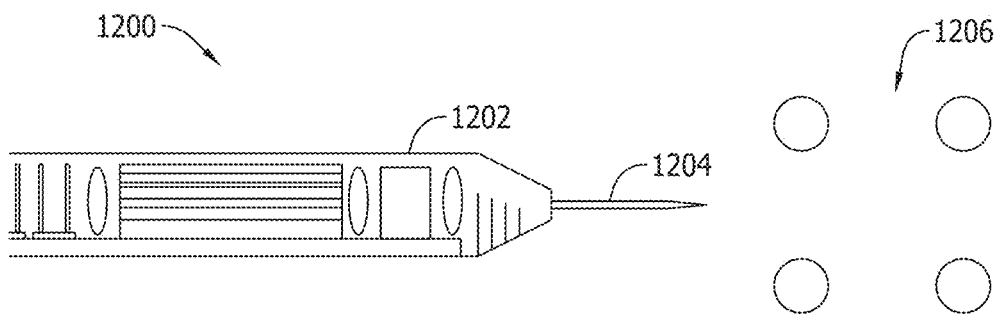
FIG. 12A depicts an exemplary use case of an external cavity laser source.

FIG. 12A depicts an exemplary use case of an ECL laser source 1200. In an embodiment, ECL laser source 1200 includes an ECL laser 1202 configured to generate an optical source output beam 1204 having a narrow linewidth, and exhibiting a distribution pattern 1206 having relatively low noise. In this example, ECL laser 1202 may be a conventional, high-quality ECL laser having a very narrow linewidth and significantly low noise output, i.e., in comparison with known lower-quality lasers having wide linewidths and more noise. The quality of laser sources is an important factor in the implementation of coherent optical transmission systems. However, as described above, high-quality lasers, such as ECL laser 1202, are prohibitively expensive for home-based solutions. At present, a conventional ECL laser cost approximately $1500 US.

Figure 12B:
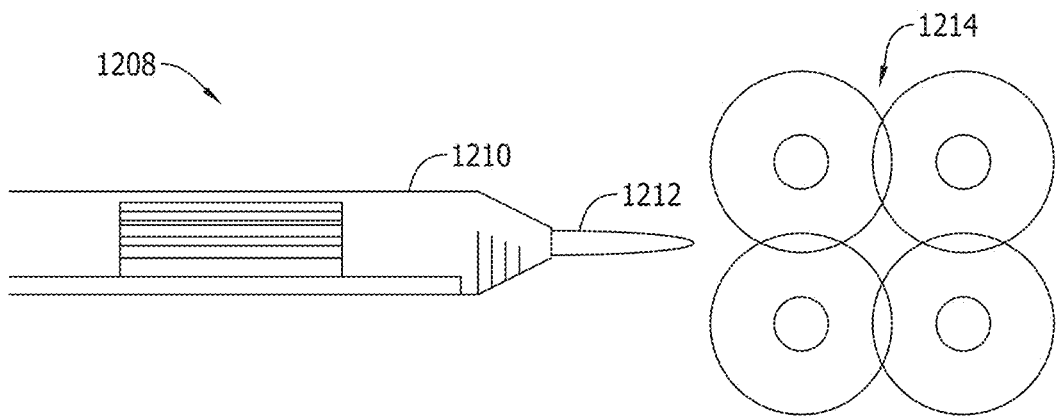
FIG. 12B depicts an exemplary use case of a Fabry-Perot laser source.

FIG. 12B depicts an exemplary use case of a FP laser source 1208. More particularly, in an embodiment, FP laser source 1208 includes an FP laser 1210 configured to generate an optical source output beam 1212 having a significantly wider linewidth and a distribution pattern 1214 exhibiting significantly more noise (i.e., in comparison with output beam 1204 of ECL laser 1202, FIG. 12A). As described above, the relatively low-cost FP lasers are significantly more affordable and less complex than the high-quality laser sources required for present coherent optics implementations. Prior to the prevalence of coherent optics technology, FP lasers were commonly used in upstream transmissions of HFC deployments, but have not been applicable to present-day coherent optical systems. According to the present systems and methods though, these previously inapplicable low-cost laser sources are effectively transformed into significantly higher-performing lasers, but without significantly increasing the cost of such implementations beyond where the deployment is economically infeasible for home use. This solution is described further below with respect to FIG. 12C.

Figure 12C:
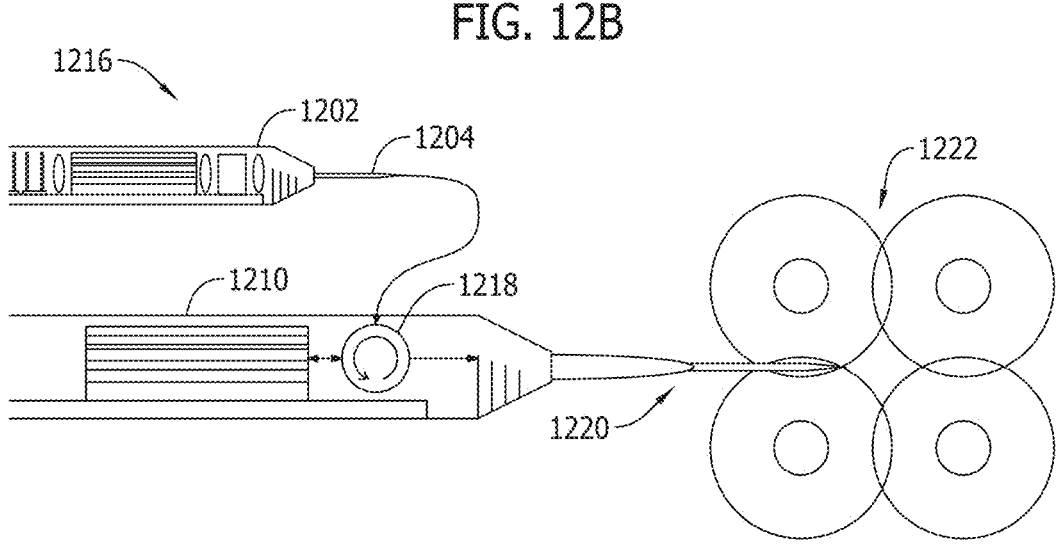
FIG. 12C depicts an exemplary hybrid system for injection locking the external cavity laser source depicted in FIG. 12A into the Fabry-Perot laser source depicted in FIG. 12B.

FIG. 12C depicts an exemplary hybrid system 1216 for injection locking ECL laser source 1200, FIG. 12A, into FP laser source 1208, FIG. 12B. More specifically, in an exemplary embodiment, hybrid system 1216 employs a novel coherent optical injection locking (COIL) technique to effectively "clone" the expensive, high quality, high performance of a single laser source (e.g., ECL laser source 1200) onto a plurality of relatively very basic and simpler lasers (e.g., FP laser source 1208). An exemplary operation of the injection locking process, high-quality laser 1202 (relatively expensive) generates high-quality optical source 1204, which is injected into FP laser 1210 through an optical circulator 1218. Through this optical injection process, the optical characteristics of the expensive ECL laser 1202 transfers to and output optical source 1220 of the considerably less expensive FP laser 1210. Output optical source 1220 this includes the frequency and linewidth of optical source 1204, which may then be readily utilized from an apparently "noisy" distribution pattern 1222, as important factors for the coherent system utilizing this COIL technique.

According to the hybrid solution depicted in FIG. 12C, the cost of the cloned optical source is effectively reduced (i.e., in comparison with the high-quality optical source being cloned) by approximately 200 times. In the exemplary embodiment, high-quality laser 1202 remains at the hub location (e.g., headend/hub 1002, FIG. 10), and this remote signal may then be shared/transmitted to many customer premise locations where a cloned laser source is deployed (described further below with respect to FIG. 13). Through this injection locking technique, each low-cost laser 1210 behaves like expensive laser 1202, but only one expensive laser 1202 is needed to implement this COIL technique for many low-cost lasers 1210 in a single P2MP network.

Accordingly, utilizing this COIL technique, the cost of expensive laser 1202 may be shared among and buying the many end users. In this example, in the case of 512 end users for a single expensive (i.e., approximately $1500 US) laser 1202, the expense of deploying an individual low-cost laser 1210 for each end user is approximately $40 US per residential home location implementing COIL. This cloning technique therefore represents a drastic cost saving solution over the deployment of an individual high-quality laser 1202 at each home location (i.e., not utilizing this COIL technique). In this example, the total cost of providing a coherent laser source at each individual home location includes the individual cost of cloned FP laser 1210, together with a the respective shared portion of the costs of parent laser 1202 and optical circulator 1218. The cost-per-home utilizing this COIL technique is thus in the approximate range of conventional direct detection PON systems. Accordingly, through the present systems and methods, coherent technology that is presently available to P2P network business users, may be affordably provided to residential subscribers in a P2MP network. An exemplary merger of such P2P and P2MP services is illustrated further below with respect to FIG. 13.

Figure 13:
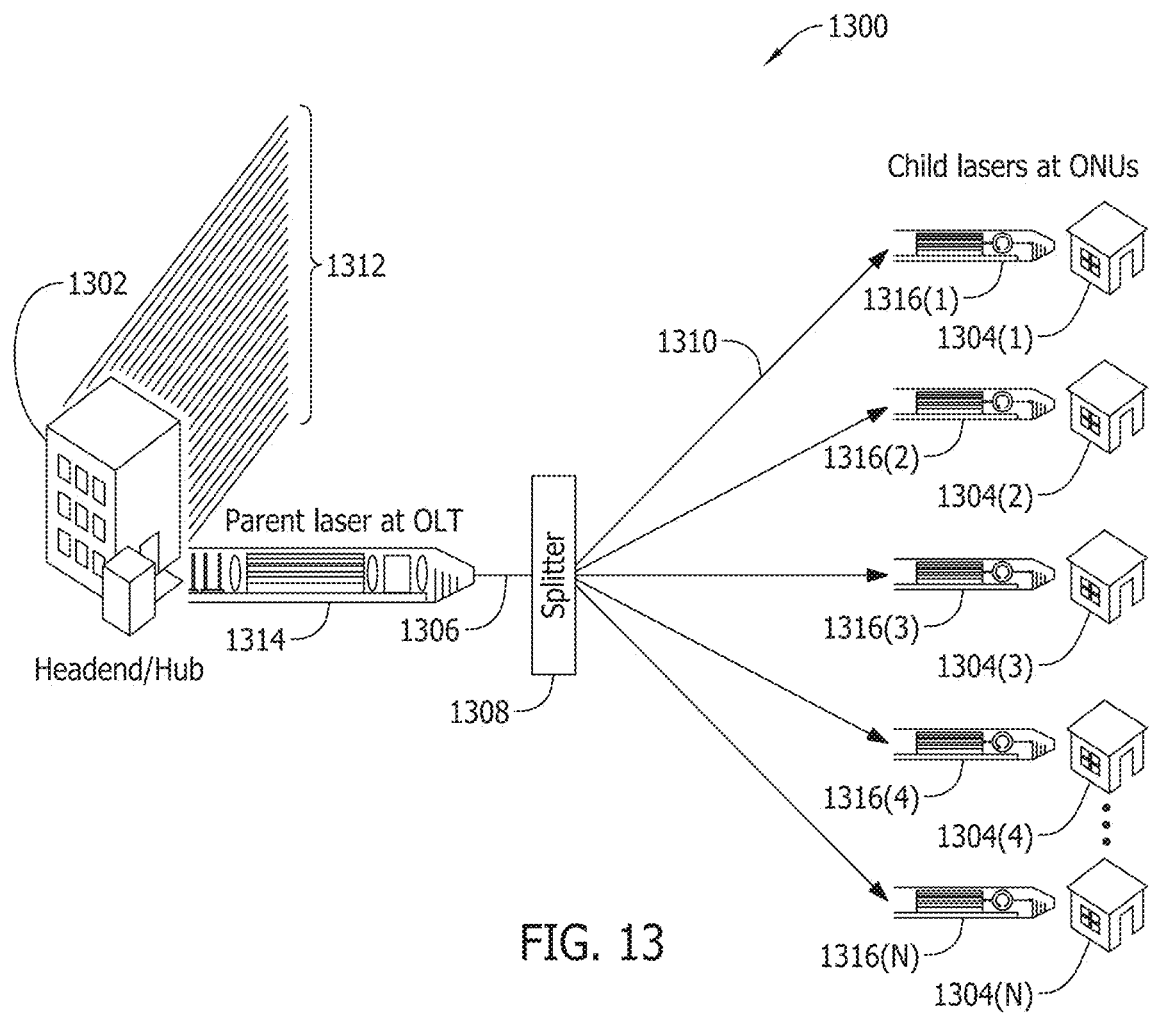
FIG. 13 is a schematic illustration of an injection locked point to multipoint coherent passive optical network.

FIG. 13 is a schematic illustration of an injection locked P2MP CPON 1300. P2MP CPON 1300 is similar in several aspects to P2MP CPON 1000, FIG. 10, and similarly-labeled elements thereof may be generally considered to have a substantially similar structure and or function. For example, similar to P2MP CPON 1000, P2MP CPON 1300 includes a headend/hub 1302 in operable communication with a plurality of end users 1304 over a transport medium/long fiber 1306, which connects to a splitter 1308 that splits the downstream coherent optical signal into a plurality of optical wavelengths for transport to respective ONUs of end users 1304 over a plurality of short fibers 1310.

Different though, from P2MP CPON 1000, in an exemplary embodiment, P2MP CPON 1300 is further configured such that a plurality of P2P fibers 1312 are communicatively coupled with headend/hub 1302 which includes at least one parent laser source 1314 at an MTS (e.g., the OLT) thereof. Accordingly, each end user 1304 further includes at least one child laser source 1316 at a modem (e.g., the ONU) thereof, and configured for injection locking with parent laser source 1314 according to the COIL techniques described above. According to this exemplary P2MP configuration, 100 G coherent optical technology services, which have been heretofore only financially within the reach of P2P business subscribers, may now be provided to residential homes at a greatly reduced price that is competitive with conventional direct detection PON schemes.

As illustrated in FIG. 13, the cloning techniques of the present injection locking approach not only improves the P2MP paradigm, where a single source (e.g., headend/hub 1302) is transmitted to multiple destinations (e.g., end users 1304), but also provides a unique capability to the reverse case, namely, multiple sources (e.g., P2P fibers 1312) to a single destination (e.g., headend/hub 1302). Accordingly, in the near term, the injection locking technology of the present systems and methods it is further capable of reducing by at least 20 percent the cost of a P2P coherent link to a node in the Distributed Access paradigm. Thus, the overall cost of coherent optics deployment is significantly reduced throughout the several access paradigms, but without sacrificing delivery speed.

Further implementations of the present injection locking systems and methods are described further below with respect to FIGS. 14-24, and more specifically with respect to operation at a downlink coherent optical transceiver. In the following embodiments, the downlink coherent optical transceiver is described, for ease of explanation, to be an ONU. Nevertheless, the person of ordinary skill in the art will appreciate that the innovative techniques of the present embodiments are applicable to other receivers, transceivers, and/or modems, and are further applicable to uplink coherent optical transceiver configurations, as also described above.

Figure 14:
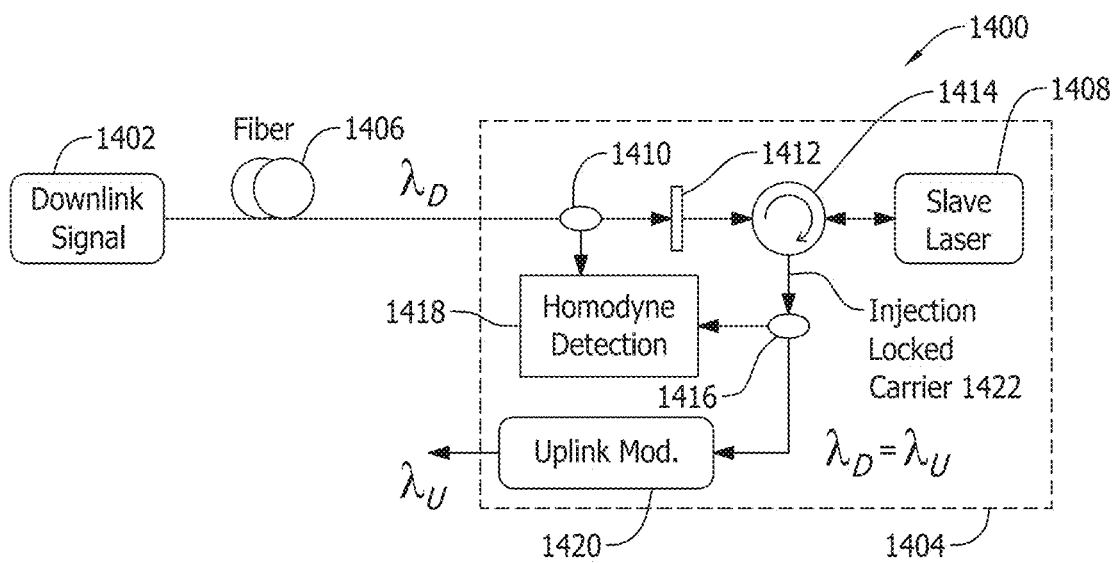
FIG. 14 is a schematic illustration of an exemplary passive optical network system implementing homodyne detection.

FIG. 14 is a schematic illustration of an exemplary PON system 1400 implementing homodyne detection. In an exemplary embodiment, system 1400 represents a CPON configured to implement COIL-based homodyne detection, and includes a downlink signal 1402 from a high quality parent/master laser source, which is transmitted as a downstream coherent wavelength $\lambda_D$ to an ONU 1404 over an optical fiber 1406. In an embodiment, ONU 1404 includes a slave laser 1408 and one or more of a first splitter 1410, and optical filter 1412, an optical circulator 1414, a second splitter 1416, a homodyne detection unit 1418, and an uplink modulator 1420 configured to output a modulated wavelength $\lambda_U$. In an exemplary embodiment, system 1400 may be implemented at the end user location of one or more of the respective systems described above, and downstream coherent wavelength $\lambda_D$ serves as downlink signal 1402 for both the master source and the LO.

In exemplary operation of system 1400, for the downlink, the received signal $\lambda_D$ is split by first splitter 1410 (e.g., a 3-dB optical coupler) with one arm thereof fed directly to homodyne detection unit 1418 (i.e., the downlink coherent receiver), and the other arm filtered first through optical filter 1412 (e.g., a narrow optical filter) and then injected, through optical circulator 1414 (e.g., a 3-port optical circulator), into the low-cost laser source of slave laser 1408. In the exemplary embodiment, optical filter 1412 is configured such that master laser power is sufficiently balanced with the narrow width of striped signal bandwidth.

After injection locking with slave laser 1408, the newly injected signal of a resultant injection locked carrier signal 1422 is split by second splitter 1416 (e.g., a 3-dB splitter), with one arm thereof returned to homodyne detection unit/ receiver 1418 as the LO with phase noise and carrier frequency offset removed. According to this configuration, homodyne detection unit 1418 is advantageously capable of achieving carrier recovery in the optical domain without any delay. The other arm from second splitter 1416 is sent to uplink modulator 1422 become the uplink optical source of upstream modulated wavelength $\lambda_U$, which may be communicated upstream by way of a full duplex coherent optical connection schemes using an optical circulator (e.g., FIGS. 15-16, below), or realized by a dedicated separate, second fiber (e.g., FIG. 17, below).

In an embodiment, in the case of asymmetrical modulation, the upstream transmission may employ an intensity modulation scheme, such as a non-return to zero on-off keying (NRZ-OOK) format, instead of the coherent modulation scheme implemented for the downstream transmission. According to the advantageous configuration of system 1400, only one relatively low-cost slave laser (e.g., an FP laser source) need be employed at each ONU 1404 to realize the effective performance of the high-cost master laser (e.g., an ECL laser source). In the exemplary embodiment, no carrier recovery is then needed in the relevant DSP flow either.

Figure 15:
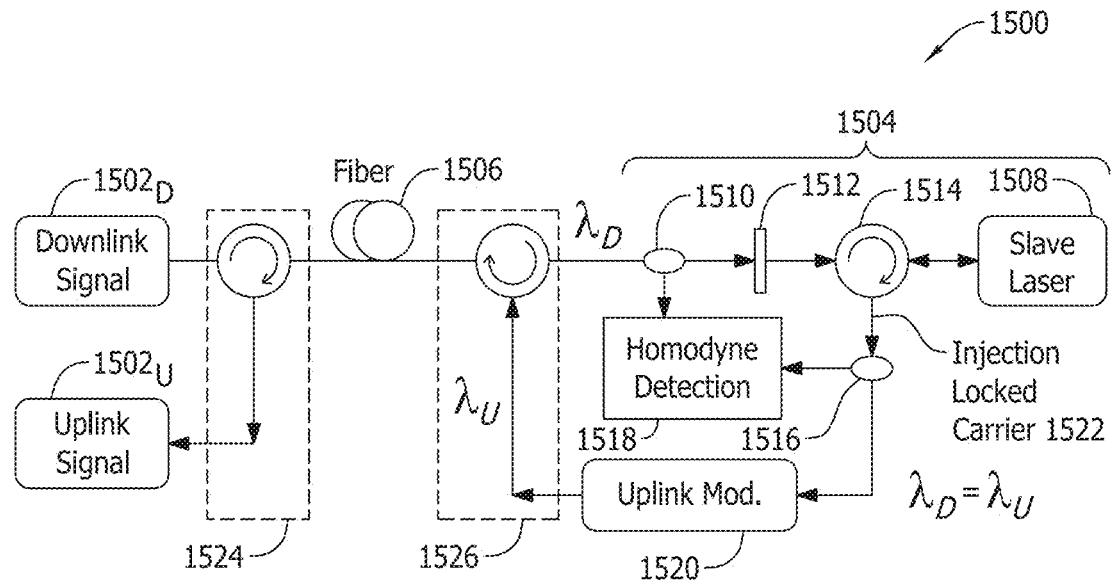
FIG. 15 is a schematic illustration of an exemplary passive optical network system implementing homodyne detection in a full duplex operation.

FIG. 15 is a schematic illustration of an exemplary PON system 1500 implementing homodyne detection in a full duplex operation. In an exemplary embodiment, system 1500 represents a CPON configured to implement COIL-based homodyne detection, in a substantially similar manner to system 1400, FIG. 14, and includes a downlink signal $1502_D$ from a high quality parent/master laser source, which is transmitted as a downstream coherent wavelength $\lambda_D$ to an ONU 1504 over an optical fiber 1506. In an embodiment, ONU 1504 includes a slave laser 1508 and one or more of a first splitter 1510, an optical filter 1512, an ONU optical circulator 1514, a second splitter 1516, a homodyne detection unit/receiver 1518, and an uplink modulator 1520 configured to output a modulated upstream wavelength $\lambda_U$ from an injection locked carrier signal 1522. In an exemplary embodiment, system 1500 may be implemented at the end user location one or more of the respective systems described above, and downstream coherent wavelength $\lambda_D$ again may serve as downlink signal $1502_D$ for both the master source and the LO.

In exemplary operation, system 1500 performs similarly to system 1400 with respect to the reception and processing of downlink signal $1502_D$ by ONU 1504. Different though, from the embodiment depicted in FIG. 14, system 1500 further includes a hub optical circulator 1524 disposed at the end of fiber 1506 that couples with the headend/hub (not shown in FIG. 15), and an end user optical circulator 1526 disposed at the other end of fiber 1506 that couples with ONU 1504.

In an exemplary embodiment, both of hub optical circulator 1524 and end user optical circulator 1526 are 3-port optical circulators respectively disposed on either side of the uplink and the downlink. In further exemplary operation, at the hub location, downlink signal $1502_D$ by is transmitted from port 1 to port 2 of hub optical circulator 1524, and an uplink signal $1502_U$ is transmitted from port 2 to port 3 of hub optical circulator 1524. Similarly, at the end point location of ONU 1504, downlink signal $1502_D$ by is transmitted from port 2 to port 3 of end point optical circulator 1526, and the modulated uplink signal $1502_U$ is transmitted from port 1 to port 2 of end point optical circulator 1526.

In the exemplary embodiment of system 1500, to achieve the full benefit of the bidirectional full duplex scheme, coherent modulation is also implemented for the upstream transmission. The bidirectional coherent signals provide significantly higher optical signal to noise ratio (OSNR) sensitivity, and also higher tolerance to the impairments from spontaneous Rayleigh backscattering, in comparison with non-coherent, intensity-modulated systems. Additionally, according to the configuration of system 1500, the threshold of the stimulated Brillouin scattering (SBS) nonlinear effect is much higher because of the nature of phase-modulated signals on the reduction of optical carrier power and the increase of effective linewidth.

Figure 16:
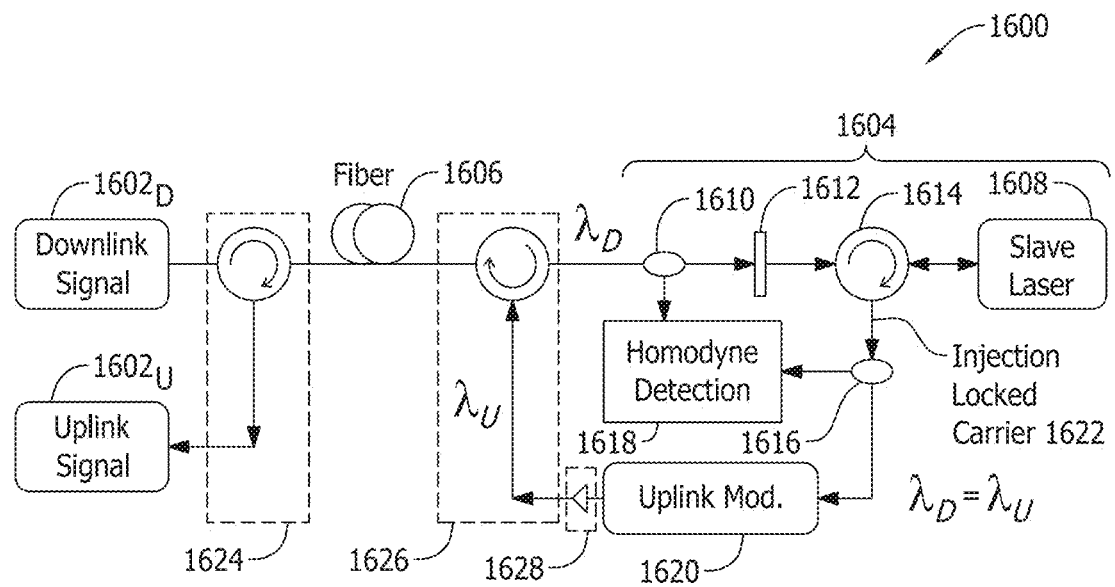
FIG. 16 is a schematic illustration of an exemplary passive optical network system implementing homodyne detection in a full duplex operation.

FIG. 16 is a schematic illustration of an exemplary PON system 1600 implementing homodyne detection in a full duplex operation. In an exemplary embodiment, system 1600 represents a CPON configured to implement COIL-based homodyne detection, in a substantially similar manner to system 1500, FIG. 15, and similarly includes a downlink signal $1602_D$ from a high quality parent/master laser source, transmitted as a downstream coherent wavelength $\lambda_D$, to an ONU 1604 over an optical fiber 1606, and further includes a slave laser 1608, a first splitter 1610, an optical filter 1612, an ONU optical circulator 1614, a second splitter 1616, a homodyne detection unit/receiver 1618, an uplink modulator 1620 configured to output a modulated upstream wavelength $\lambda_U$ from an injection locked carrier signal 1622, a hub optical circulator 1624 disposed at the end of fiber 1606 that couples with the headend/hub (not shown in FIG. 16), and an end user optical circulator 1626 disposed at the other end of fiber 1606 that couples with ONU 1604.

Different from system 1500 though, system 1600 further includes a semiconductor optical amplifier (SOA) 1628 disposed at the location of ONU 1604. In the exemplary embodiment, SOA 1628 is disposed along the path of modulated upstream wavelength $\lambda_U$ between uplink modulator 1620 and end user optical circulator 1626. In an embodiment, SOA may have a similar structure to an FP laser diode (e.g., slave laser 1608), but will not function as a laser source. Although SOAs generally have higher noise than an EDFA, the low noise output achieved by cloning slave laser 1608 to perform as the master laser enables system 1600 to implement SOA 1628 in place of a traditional EDFA because noise is much less of a factor in this particular COIL-based full duplex bidirectional coherent system.

Figure 17:
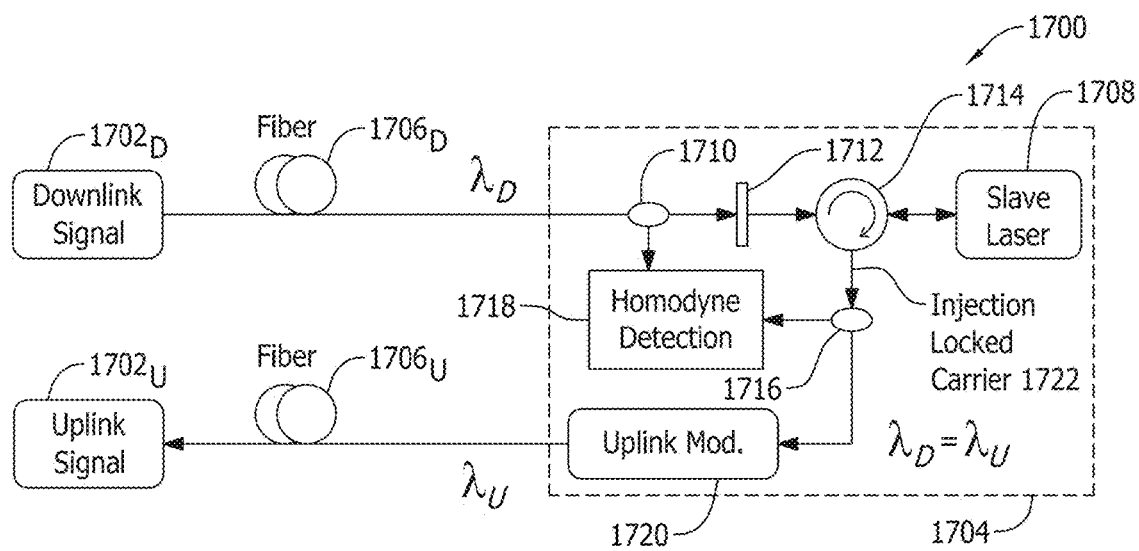
FIG. 17 is a schematic illustration of an exemplary dual-fiber passive optical network system implementing homodyne detection.

FIG. 17 is a schematic illustration of an exemplary dual-fiber PON system 1700 implementing homodyne detection. In an exemplary embodiment, system 1700 represents a CPON configured to implement COIL-based homodyne detection, in a substantially similar manner to system 1400, FIG. 14, and similarly includes a downlink signal $1702_D$ from a high quality parent/master laser source, which is transmitted as a downstream coherent wavelength $\lambda_D$ to an ONU 1704 over a dedicated downstream optical fiber $1706_D$. ONU 1704 includes a slave laser 1708, a first splitter 1710, an optical filter 1712, an optical circulator 1714, a second splitter 1716, a homodyne detection unit/receiver 1718, and an uplink modulator 1720 configured to output a modulated upstream wavelength $\lambda_U$ from an injection locked carrier signal 1722.

In exemplary operation, system 1700 performs similarly to system 1400 with respect to the reception and processing of downlink signal $1702_D$ by ONU 1704, and downstream coherent wavelength $\lambda_D$ again may serve as downlink signal $1702_D$ for both the master source and the LO. In this example, different from the embodiment depicted in FIG. 14, system 1700 further includes a dedicated upstream optical fiber $1706_U$ for optical transport of modulated upstream wavelength $\lambda_U$ (e.g., in a non-full duplex operation).

Figure 18:
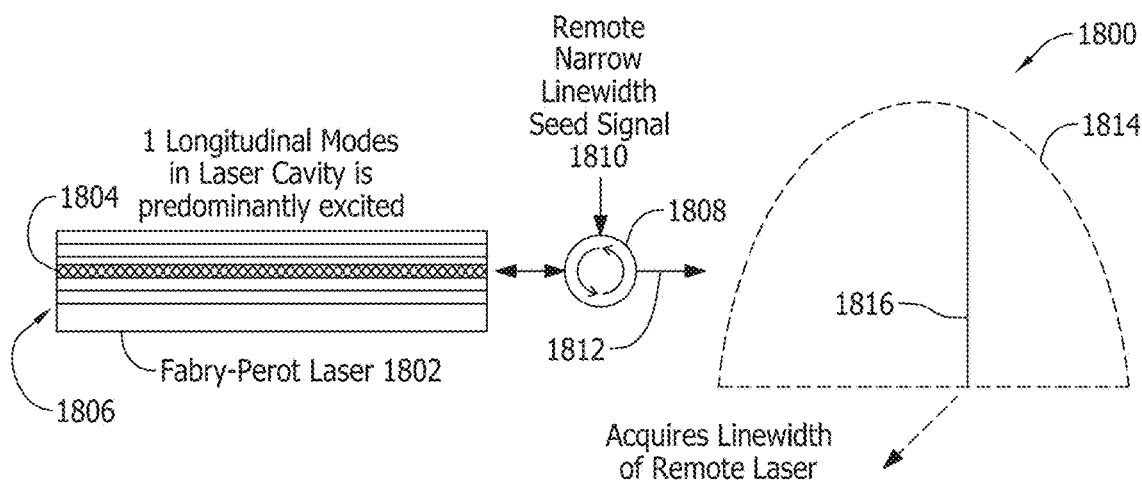
FIG. 18 depicts an exemplary linewidth acquisition effect for a low-cost laser.

FIG. 18 depicts an exemplary linewidth acquisition effect 1800 for low-cost laser 1802 (e.g., FP laser 1210, FIG. 12C). In an exemplary embodiment, laser 1802 is configured to operate as one or more of the slave lasers described among the several embodiments, above. In exemplary operation, a longitudinal mode 1804 in a laser cavity 1806 of laser 1802 is predominately excited by reception, from an optical circulator 1808, of a remote narrow linewidth seed signal 1810 from a downstream master/parent laser source (e.g., ECL laser 1202, FIG. 12C, not shown in FIG. 18). Because only the single longitudinal mode 1804 of laser cavity 806 is excited, a separate port of optical circulator 1808 outputs an upstream (modulated, in the examples above) signal 1812. Thus, despite the fact that the general quality of low-cost laser 1802 is such that an output signal thereof would be expected to conform to frequency distribution curve 1814, according to the advantageous injection looking techniques described herein, output upstream signal 1812 will instead conform to the narrow, high-quality frequency distribution mode 1816 that substantially corresponds to the linewidth acquired from the remote (e.g., at the hub) master/parent laser source.

The advantageous properties of these techniques are described above with respect to homodyne detection configurations. As described further below, these innovative systems and methods are also advantageously applicable to WDM-PON architectures, as well as heterodyne configurations of PON systems.

Figure 19:
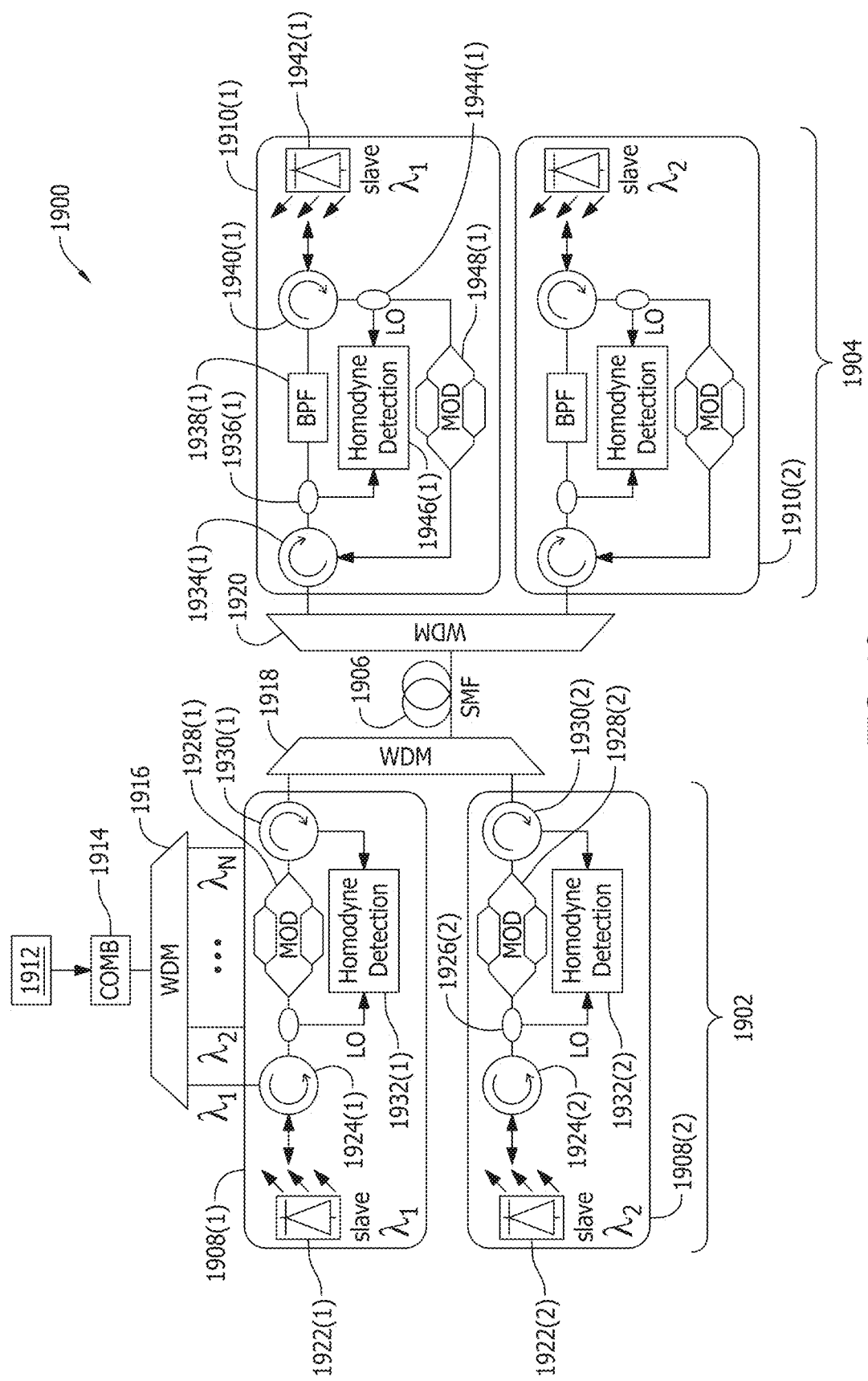
FIG. 19 is a schematic illustration of an exemplary passive optical network system implementing wavelength division multiplexing.

FIG. 19 is a schematic illustration of an exemplary PON architecture 1900 implementing WDM. In an exemplary embodiment, architecture 1900 includes a hub portion 1902 and an end user portion 1904 communicatively coupled over a transport medium 1906 (e.g., a single mode fiber, or SMF). A portion 1902 includes a plurality (e.g., 1-N) of hub transceivers 1908, and end user portion 1904 includes a plurality (e.g., also 1-N) of end user transceivers 1910. In an embodiment, hub portion 1902 of architecture 1900 is configured to receive a master input laser source 1912 (e.g., a high-quality ECL laser source) at an optical comb generator 1914, which together effectively create an optical comb source having an intrinsic property of generating a plurality of simultaneous low-linewidth channels of wavelengths $\lambda_{1-N}$ having easily controlled spacing for master laser source 1912.

In an exemplary embodiment, the particular configuration of optical comb generator 1914 may be according to one or more of a mode-locked laser, an electro-optic modulation scheme, or a gain-switched laser, in accordance with the specific technical parameters of architecture 1900. In an embodiment, optical comb generator 1914 may further include, as an integral or separate component, an EDFA (not separately shown) for amplifying and enhancing the optical power of frequency tones (e.g., 32 tones, 64 tones) generated from optical comb generator 1914.

The generated wavelengths $\lambda_{1-N}$ may then be demultiplexed by a first demultiplexer/demultiplexer 1916 for individual transport to, and processing by, each of hub transceivers 1908. The demultiplexed wavelengths may represent multiple individual CW channels (e.g., 1-N), or may represent a plurality of individual CW source pairs of phase synchronized coherent tones (e.g., multiple separate individual phased synchronized coherent tone source pairs 166, FIG. 1). The respective outputs of hub transceivers 1908 are then combined at a second demultiplexer/demultiplexer 1918 for simultaneous transport over fiber 1906, after which the combined wavelengths may be separated by a third demultiplexer/demultiplexer 1920 for individual reception by respective end user transceivers 1910. In this example, master laser source 1912 is separate from optical comb generator 1914. In other embodiments, master laser source 1912 an optical comb generator 1914 may be integrated as a single unit or apparatus.

Further to the exemplary embodiment, and similar to the several architectures described above, each hub transceiver 1908 may include one or more of an injection locked hub slave laser 1922, a first hub optical circulator 1924, a hub splitter 1926, a hub modulator 1928, a second hub optical circulator 1930, and a hub homodyne detection unit 1932 (e.g., a homodyne receiver). First hub optical circulator 1924 is, for example, configured to receive the respective narrow CW or tone $\lambda$, and inject the linewidth properties thereof into hub slave laser 1922. Second hub optical circulator 1930 couples hub transceiver 1908 with fiber 1906 by way of multiplexer/demultiplexer 1918.

In a similar manner, each end user transceiver 1910 may include one or more of a first end user optical circulator 1934, a first end user splitter 1936, an optical filter 1938 (e.g., a bandpass filter, or BPF), a second end user optical circulator 1940, an injection locked end user slave laser 1942, a second end user splitter 1944, an end user homodyne detection unit 1946, and an end user modulator 1948. Operation of each end user transceiver 1910 may then be performed according to one or more of the principles and techniques described above for the respective transceivers depicted in FIGS. 14-17 (e.g., ONUs 1404, 1504, 1604, 1708, respectively). Further to the embodiments described above, architecture 1900 demonstrates how the injection looking techniques of the present systems and methods may be further extended to individual transceivers (e.g., hub transceivers 1908) at the hub location, such as in the case of a PON implementing a separate laser source for each individual channel received from the master seed comb source.

Figure 20:
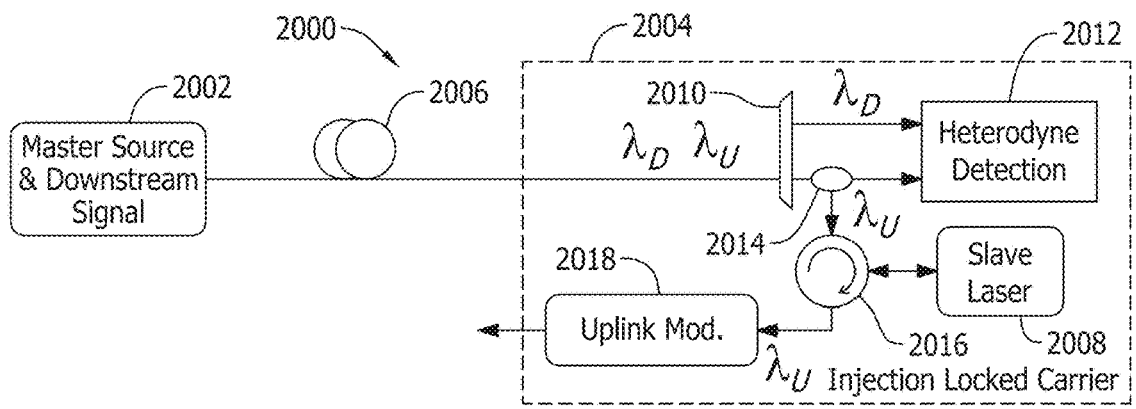
FIG. 20 is a schematic illustration of an exemplary passive optical network system implementing heterodyne detection.

FIG. 20 is a schematic illustration of an exemplary PON system 2000 implementing heterodyne detection. System 2000 is similar, in many aspects, to system 1400, FIG. 14, but system 2000 alternatively configured for heterodyne detection, in contrast to the homodyne detection configuration system 1400. In an exemplary embodiment, system 2000 and also represents a CPON (i.e., primarily the downlink portion thereof) configured to implement COIL-based heterodyne detection, and includes a downstream transmission 2002 from a high quality parent/master laser source, which is transmitted to an ONU 2004 as a downstream coherent wavelength $\lambda$ (containing both $\lambda_D$ and $\lambda_U$) over an optical fiber 2006.

In an embodiment, ONU 2004 includes a slave laser 2008 and one or more of an optical filter 2010, a heterodyne detection unit 2012 (e.g., a downlink heterodyne coherent receiver), a splitter 2014, an optical circulator 2016, and an uplink modulator 2018 configured to output a modulated signal of wavelength $\lambda_U$. In the exemplary embodiment, system 2000 may be similarly implemented at the end user location of one or more of the respective systems described above (i.e., where heterodyne detection is desired). Downstream transmission 2002 may, for example, include both a master CW laser source and a plurality of downstream signals $\lambda$ on two separate wavelengths generated at central office or hub location. Downstream transmission 2002 therefore serves to provide both remote LO and master source delivery to ONU 2004.

In exemplary operation of system 2000, for the downlink, the received transmission 2002 is separated by optical filter 2010 with the signal from one arm thereof (i.e., $\lambda_D$) fed directly to downlink heterodyne detection unit 2012, and the signal from the other arm (i.e., $\lambda_U$) split by splitter 2014 (e.g., a 3-dB splitter), with one split returned heterodyne detection unit/coherent receiver 2012 as the LO, and the other split injected into the low-cost laser source of slave laser 2008 by way of optical circulator 2016. After injection locking with slave laser 2008, the newly injected signal (i.e., modulated $\lambda_U$) is sent to uplink modulator 2018 to provide the uplink optical source, which may be communicated upstream by way of a full duplex coherent optical connection schemes using an optical circulator (e.g., FIGS. 21-23, below), or realized by a dedicated separate, second fiber (e.g., FIG. 24, below).

Similar to system 1400, FIG. 14, in the case of asymmetrical modulation, the upstream optical source of system 2000 may employ an intensity modulation scheme, such as NRZ-OOK. In an alternative embodiment, injection locking may be performed prior to splitting by splitter 2014 (e.g., described further below with respect to FIG. 22), with one arm therefrom used for the downlink LO, and the other arm used for the uplink CW source (i.e., modulated $\lambda_U$).

According to the advantageous configuration of system 2000, a centralized comb light source at the OLT (e.g., laser source 1912 and optical home generator 1914, FIG. 19, not shown in FIG. 20) serves to provide both master seeding sources and LO signals for both of the downstream and upstream directions in a heterodyne detection configuration. This advantageous configuration enables a PON system to reuse optical sources, in contrast to intradyne detection techniques conventionally implemented in long-haul systems. Thus, and similar to the homodyne detection configurations described above, only one relatively low-cost slave laser (e.g., an FP laser source) need be employed at each ONU 2004 to realize the effective performance of the high-cost master laser (e.g., an ECL laser source).

Figure 21:
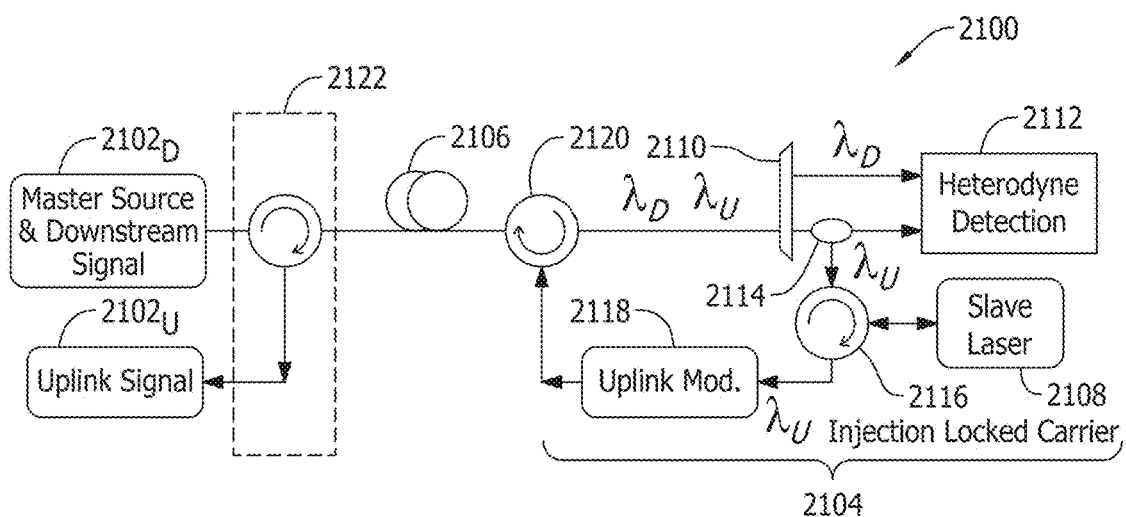
FIG. 21 is a schematic illustration of an exemplary passive optical network system implementing heterodyne detection in a full duplex operation.

FIG. 21 is a schematic illustration of an exemplary PON system 2100 implementing heterodyne detection in a full duplex operation. In an exemplary embodiment, system 2100 represents a CPON configured to implement COIL-based heterodyne detection, in a substantially similar manner to system 2000, FIG. 20, and includes a downstream transmission $2102_D$ from a high quality parent/master laser source, which is transmitted to an ONU 2104 as a downstream coherent wavelength λ (containing both $λ_D$ and $λ_U$) over an optical fiber 2106. ONU 2104 similarly includes a slave laser 2108, an optical filter 2110, a heterodyne detection unit 2112 (e.g., a downlink heterodyne coherent receiver), a splitter 2114, an optical circulator 2116, and an uplink modulator 2118 configured to output a modulated, injection locked uplink signal $2102_U$.

In exemplary operation, system 2100 performs similarly to system 2000 with respect to the reception and processing of downstream transmission $2102_D$ by ONU 2104. Different though, from the embodiment depicted in FIG. 20, system 2100 further includes an end user optical circulator 2120 disposed at the end of fiber 2106 that couples with ONU 2104, and a hub optical circulator 2122 disposed at the end of fiber 2106 that couples with the headend/hub (not shown in FIG. 20). Apart from the implementation of heterodyne detection (as opposed to homodyne detection) end user optical circulator 2120 and hub optical circulator 2122 are substantially similar in structure and function to end user optical circulator 1526 and hub optical circulator 1524, FIG. 15, respectively.

Figure 22:
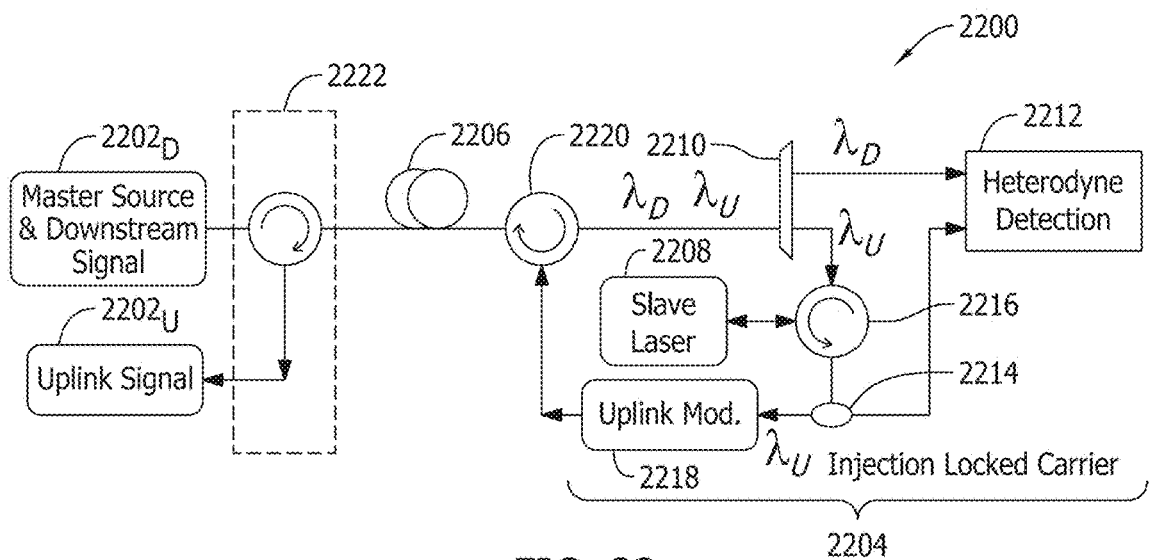
FIG. 22 is a schematic illustration of an alternative passive optical network system implementing heterodyne detection in a full duplex operation.

FIG. 22 is a schematic illustration of an alternative PON system 2200 implementing heterodyne detection in a full duplex operation. In an exemplary embodiment, system 2200 represents a CPON configured to implement COIL-based heterodyne detection, in a substantially similar manner to system 2100, FIG. 21, and includes a downstream transmission $2202_D$ from a high quality parent/master laser source, which is transmitted to an ONU 2204 as a downstream coherent wavelength λ (containing both $λ_D$ and $λ_U$) over an optical fiber 2206. ONU 2204 similarly includes a slave laser 2208, an optical filter 2210, a heterodyne detection unit 2212, a splitter 2214, an optical circulator 2216, an uplink modulator 2218 configured to output a modulated, injection locked uplink signal $2202_U$, an end user optical circulator 2220, and a hub optical circulator 2222.

System 2200 differs from system 2100 in regard to the structural configuration of ONU 2204. Specifically, and as described above with respect to FIG. 20, in ONU 2204, injection locking to slave laser 2208 is performed directly from the $λ_U$ arm from filter 2210 (i.e., by way of optical circulator 2216), and prior to reaching splitter 2214, which then provides one modulated $λ_U$ split to heterodyne detection unit 2212 to be used for the downlink LO, and the other modulated $λ_U$ split to uplink modulator 2218 to be used for the uplink CW source of uplink signal $2202_U$.

Figure 23:
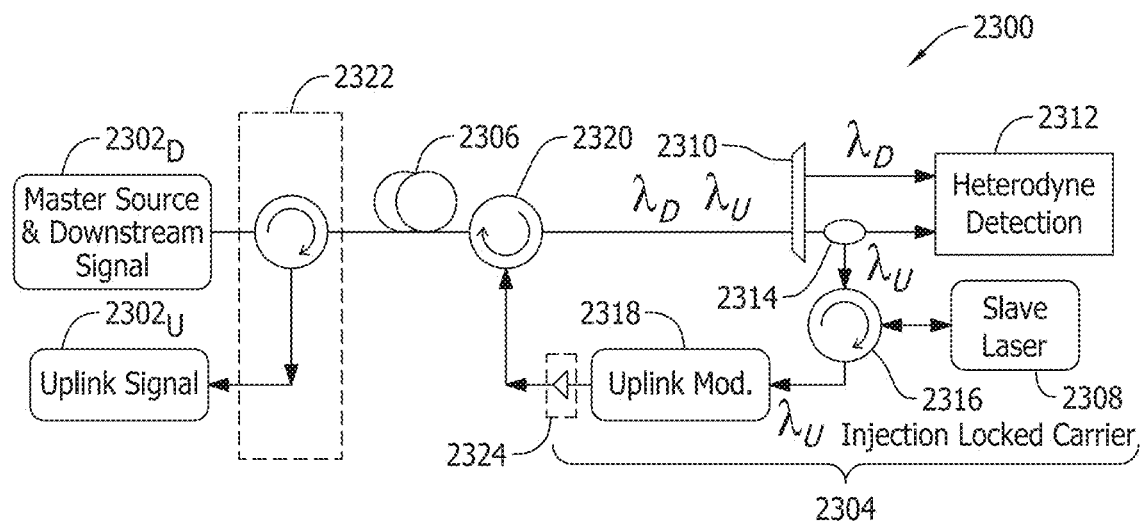
FIG. 23 is a schematic illustration of an exemplary passive optical network system implementing heterodyne detection in a full duplex operation.

FIG. 23 is a schematic illustration of an exemplary PON system 2300 implementing heterodyne detection in a full duplex operation. In an exemplary embodiment, system 2300 represents a CPON configured to implement COIL-based homodyne detection, in a substantially similar manner to system 2100, FIG. 21, and similarly includes a downstream transmission $2302_D$ from a high quality parent/master laser source, which is transmitted to an ONU 2304 as a downstream coherent wavelength λ (containing both $λ_D$ and $λ_U$) over an optical fiber 2306. ONU 2304 similarly includes a slave laser 2308, an optical filter 2310, a heterodyne detection unit 2312, a splitter 2314, an optical circulator 2316, an uplink modulator 2318 configured to output a modulated, injection locked uplink signal $2302_U$, an end user optical circulator 2320, and a hub optical circulator 2322.

Different from system 2100 though, system 2300 further includes an SOA 2324 disposed along the path of uplink signal $2302_U$ between uplink modulator 2318 and end user optical circulator 2320. Although not illustrated in FIG. 23, SOA may be similarly disposed in the alternative full duplex heterodyne configuration depicted in FIG. 22, for example, between uplink modulator 2218 and end user optical circulator 2220.

Figure 24:
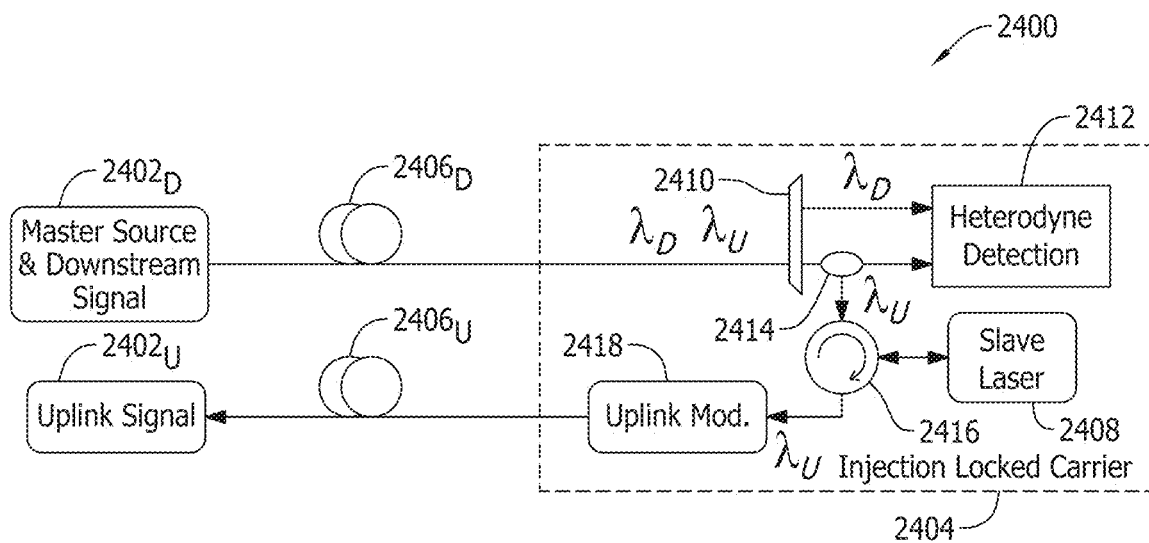
FIG. 24 is a schematic illustration of an exemplary dual-fiber passive optical network system implementing heterodyne detection.

FIG. 24 is a schematic illustration of an exemplary dual-fiber PON system 2400 implementing heterodyne detection. In an exemplary embodiment, system 2400 represents a CPON configured to implement COIL-based homodyne detection, in a substantially similar manner to system 2000, FIG. 20, and includes a downlink transmission $2402_D$ from a high quality parent/master laser source, which is transmitted to an ONU 2404 over a dedicated downstream optical fiber $2406_D$. ONU 2404 includes a slave laser 2408, an optical filter 2410, a heterodyne detection unit 2412, a splitter 2414, an optical circulator 2416, and an uplink modulator 2418 configured to output a modulated, injection locked uplink signal $2402_U$.

In exemplary operation, system 2400 performs similarly to system 2000 with respect to the reception and processing of downlink transmission $2402_D$ by ONU 2404. In this example though, and different from the embodiment depicted in FIG. 20, system 2400 further includes a dedicated upstream optical fiber $2406_U$ for optical transport of modulated, injection locked uplink signal $2402_U$ (e.g., in a non-full duplex operation).

According to the innovative systems and methods described herein, the problems experienced with conventional direct detection PONs (i.e., poor receiver sensitivity, power fading due to chromatic dispersion at high symbol rates and long transmission distances, bandwidth- and power-inefficient modulation, etc.) are overcome. The CPONs of the present systems and methods are capable of fully realizing the benefits of coherent optical technology (i.e., frequency selectivity, linear detection, superior receiver sensitivity, etc.) but in a significantly more cost-effective solution than has been previously available for coherent systems. That is, the present COIL-based architectural configurations for a P2MP network effectively extend the reach and split ratio to multiple end-users, and residential home subscribers in particular, at approximately the present cost of conventional direct detection systems, but also at performance levels comparable to present coherent P2P links.

Optical Injected Laser for Coherent Communication

At present, data demand is rapidly increasing at an exponential pace, driven by bandwidth-intensive applications such as "big data," Cloud technology, the Internet of Things (IoT0, video, and augmented reality/virtual reality (AR/VR). For these reasons, access bandwidth requirements for delivering such high-speed data and video services is expected to grow as described above. PON access technologies have thus become dominant architectures for meeting end user high capacity demand. Future PONs seek to provide higher per-subscriber data rates and wider coverage of services and applications, and service providers seek minimization of CAPEX and OPEX while increasing reconfigurable capability for scalable solutions.

As described above, DSPs are often fabricated using CMOS technology and, with recent advancements to sub-10 nm CMOS technology, future DSPs are expected to support the higher data rates under growing demand, but with a reduced footprint and power dissipation. The overall cost of conventional systems is dominated by optical and electrical components such as low-linewidth tunable lasers source for transmitter and local oscillator, as well as high speed balanced detectors. For mass adoption of coherent access network technology in the P2MP paradigm, further innovations to coherent optical components are needed to significantly reduce the cost, and thus increase the affordability, to an end user's home.

The embodiments above describe COIL technology and applications that enable low-quality lasers/slave lasers to perform as high-quality lasers by injection locking from a high-quality laser/master laser. The injection locked slave laser thus performs like the high-quality laser in a coherent transmission systems. The embodiments above describe how COIL may be achieved by injecting a single frequency laser source from the master laser into the laser resonator of the slave laser, such as with multi-longitudinal modes. Through the implementation of COIL in a coherent fiber communication system (e.g., CPON), a single high-quality laser may be utilized to drive many slave lasers, and these slave lasers will behave like the single high-quality master laser upon locking to the master laser. By these COIL techniques, the spectral quality of the master laser will be effectively cloned into many low-quality, low-cost slave lasers, thereby dramatically reducing the overall system cost by avoiding the deployment of high-quality, high-cost master lasers in each coherent transceiver (e.g., P2P systems).

However, conventional injection locking techniques are known to experience degradation of the injection efficiency of the laser due to detuning, and thus also penalties to the side mode suppression ratio (SMSR). A high maximum SMSR (e.g., for fine tuning) may be significantly reduced by detuning. Conventional frequency locking ranges of a coherent light source are often less than half of the FP mode spacing, and therefore, the injected input wavelength of such conventional systems are only able to tolerate a small variation gap before locking is lost. One significant factor impacting the SMSR of an injection-locked FP laser is frequency misalignment about the master wavelength. The frequency misalignment is due to the asymmetry of the locking range, resulting in an injection locking detuning range that is not equal on both sides of the frequency spectrum about the master wavelength. Accordingly, improved techniques are desirable for controlling the injection locking capability with respect to the detuning range.

The present systems and methods therefore provide innovative structures and processes for COIL-based, low-cost transmitters that may be implemented with one or more of the embodiments described above. In an exemplary embodiment, the COIL-based transmitter described herein includes a master seed laser source with a single longitudinal lasing mode, an input data stream, and a laser injected modulator including at least one slave laser having a resonator frequency that is injection locked to the single longitudinal modal frequency of the master seed laser source. For example, as described above with respect to FIG. 1, laser injected modulator 138 of downstream transmitter 126 is configured to receive high quality source signal 116 from an master seed laser source 118 and an input data stream, and output laser modulated data stream 172. The present COIL transmitter is therefore particularly useful for implementation in such coherent-DWDM-PON architectures.

The COIL transmitter embodiments described further herein thus further improve upon the innovative architectures described above by providing innovative structures and implementation methods that may be employed as, or in place of, either or both of downstream transmitter 126 and upstream transmitter 160. In an exemplary embodiment, both of transmitters 126 and 160 have similar internal architectures and operations. Accordingly, for ease of explanation and not in a limiting sense, the following description refers generally to a COIL-based transmitter, or COIL transmitter, that may be employed as either an upstream or downstream transmitter in one or more of the embodiments above. The architecture of a COIL transmitter for a fiber communication network is described further below with respect to FIG. 25.

Figure 25:
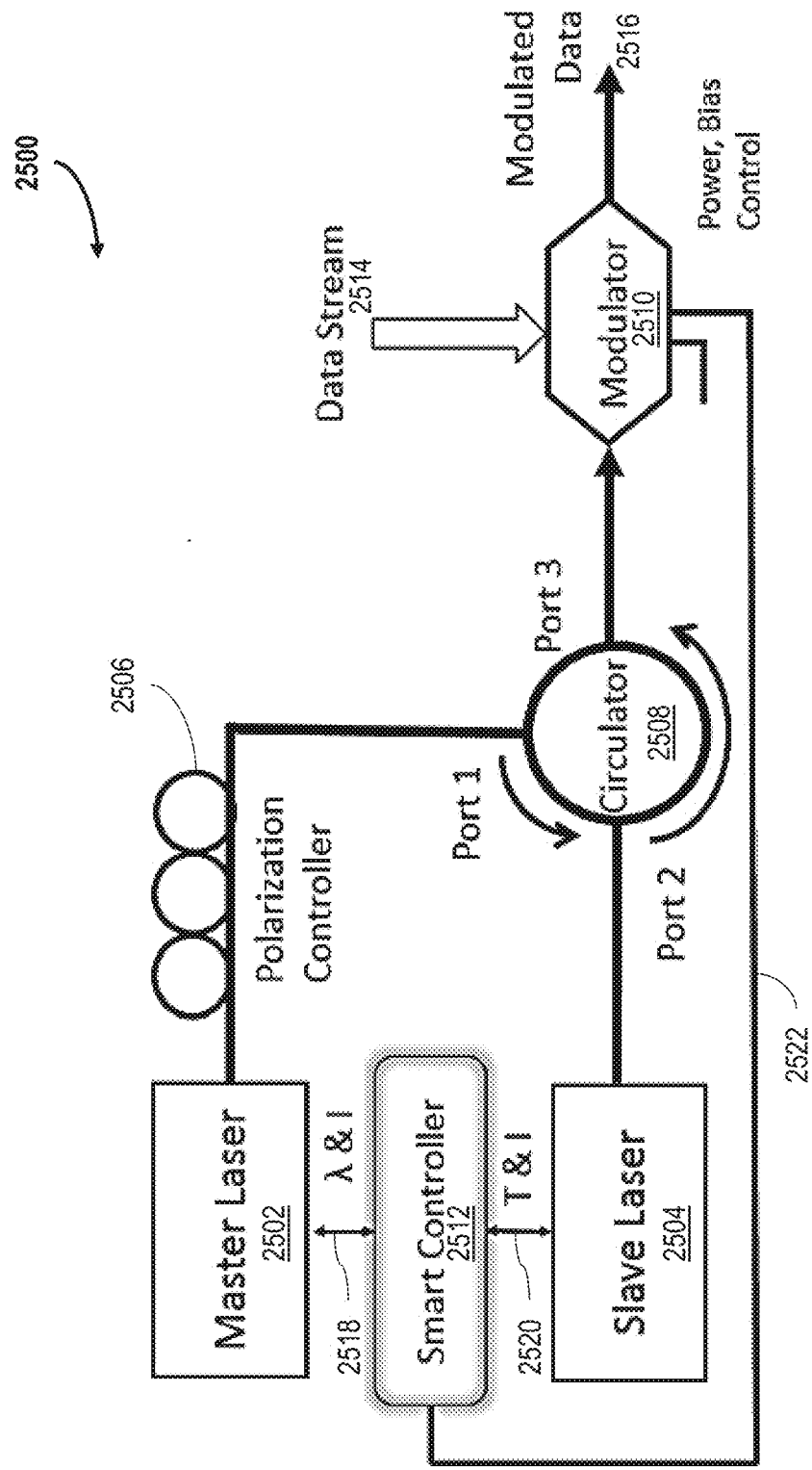
FIG. 25 is a schematic illustration of an exemplary coherent optical injection locking transmitter system.

FIG. 25 is a schematic illustration of an exemplary COIL transmitter system 2500. In an embodiment, COIL transmitter system 2500 includes a master laser source 2502, a slave laser 2504, a polarization controller 2506, an optical circulator 2508 (e.g., a three-port circulator), a modulator 2510, and a smart controller 2512 configured to manage and optimize performance of COIL transmitter system 2500. In an exemplary embodiment, system 2500 represents a block architecture for COIL transmission, and master laser source 2502 may, for example, be located at the OLT, optical hub, or central office (CO) as the optical coherent source operating throughout system 2500 (e.g., master seed laser source 118, FIGS. 1-7).

Slave laser 2504, optical circulator 2508, and modulator 2510, on the other hand, may be separately located from master laser source 2502 in a discrete, compact transmission device that is still otherwise disposed in or proximate to the OLT/hub/CO (e.g., downstream transmitters 126, 200, 300, 400, 500, FIGS. 1, 2, 3, 4, 5, respectively). Alternatively, or additionally, slave laser 2504, optical circulator 2508, and modulator 2510, may be remotely located from master laser source 2502 in a discrete, compact transmission device (e.g., upstream transmitters 160, 600, FIGS. 1, 6, respectively) at the opposite end of an optical transport medium (e.g., fibers 108, 110) within an ONU of an end user 106, FIGS. 1, 6.

In exemplary operation of system 2500, the ONU thus is enabled to act as the device that functions as the service provider endpoint of a PON (e.g., end user 106). In an embodiment, polarization controller 2506 may be utilized to align the polarization of master laser source 2502 with slave laser 2504 for maximum internal injection coupling efficiency. In further operation of transmission system 2500, optical circulator 2508 is used to route master laser source 2502 into the resonance cavity of the slave laser 2504 (e.g., through Port 1). Thus, the same optical circulator 2508 may further serve to route the optical output power of the injection locked slave laser (e.g., Port 2) into the input port (e.g., Port 3), and thus to optical modulator 2510. The subsequent coherent locked laser light may then be modulated using modulator 2510 (e.g., which may be an external modulator) to convert a data stream 2514 from electrical signals to optical signals for fiber optical transmission as modulated data 2516.

In the exemplary embodiment, the architecture of COIL transmitter system 2500 may be fully integrated within the greater architecture of fiber communication system 100, FIGS. 1-7. Master laser source 2502 may, for example, include a frequency laser comb source (e.g., optical frequency comb generator 114), configured to generate multiple coherent tones, and/or phase-synchronized coherent tone pairs, at a defined frequency spacing. In some embodiments, master laser source 2502 includes one or more of a tunable ECL, a WDM laser array(s), mode locked lasers, or gain-switched lasers. In this embodiment, master laser source 2502 represents a high spectral quality, single frequency, or WDM laser source. However, these types of master laser sources are known to be very complex and expensive in comparison with other laser types.

In the exemplary embodiment, an ideal master laser source 2502 has low spectral linewidth, low phase noise, well defined frequency spacing, high E/O quantum efficiency, high operation stability, and high output power. The channel spacing of master laser source 2502 may include, without limitation, one or more of 100 GHz, 50 GHz, 25 GHz, or 12.5 GHz, based on the signal bandwidth occupancy. The generated frequency tones/phase synchronized coherent tone pairs (e.g., 32 tones, 64 tones) may then be amplified by an EDFA (e.g., EDFA 122) to enhance optical power, and then further demultiplexed into multiple separate individual coherent sources used as LO signals, and/or for coherent injection locking.

In further operation of system 2500, placement of the optical frequency comb source (e.g., comb generator 114) at the OLT, optical hub, or CO, provides a remote source for generating multiple coherent tones as the LO and seed signal sources for both downstream and upstream directions. This centralized master laser source thus enables the overall system to employ relatively compact physical devices for the transmission subsystem arrangement of system 2500, to provide multi-wavelength emission capability for each individual COIL transmitter system 2500 in a significantly simplified, elegant, lower cost design that demonstrates significantly increased reliability. Furthermore, the implementation of a central comb source provides further advantages that are not readily provided by discrete lasers, such as simultaneous control of multiple sources.

As shown in FIGS. 1-7, a single master laser source 118 provides a single "pure" high quality source signal 116 capable of generating multiple separate individual phased synchronized coherent tone source pairs 166, where each tone source pair for a single channel is processed by its own pair of respective transmitter devices (e.g., transmitters 126, 160). Accordingly, a single fiber access network system may include a single master laser source 2502 for multiple COIL transmitter systems 2500. Each such COIL transmitter system 2500 may have its own unique slave laser 2504 and modulator 2510, but all of the multiple COIL transmitter systems 2500 may share the single master laser source 2502, but be configured specifically for a single channel/channel pair generated therefrom. In the example illustrated in FIG. 1, Ch 1 and Ch 1' are a representative example of a source pair 166 of phase synchronized coherent tone wavelengths, with Ch 1 used as a downstream seed and upstream LO, while Ch 1' is used as a downstream LO and upstream seed.

Conventional transmitters used in long-haul transport utilize high-quality lasers and optical modulators to convert electrical data into optical signals. In comparison with the present COIL transmitter architecture, the conventional long-haul transmitter may be considered to have a relatively simple design. Nevertheless, despite this relative simplicity, the conventional transmitters are considerably more expensive to implement, due to the high cost of the using a dedicated master laser source for each modulator. In the access network paradigm, to be economically viable, the cost of optical components should be considerably lower than components used in the long-haul network, and particularly within the realm of coherent WDM PON. The present COIL transmitter embodiments thus enable significant reductions to the transmitter cost, and without sacrificing quality of the modulator laser source. By sharing a high-quality master laser source among many transmitters using COIL, the present low-cost local slave lasers inherit phase characteristics from the master laser, including frequency and linewidth. According to the COIL transmission techniques described herein, a fiber communication network is able to operate a single (or very few) high-quality master laser sources to drive many times more low-cost coherent transmitters for each single master laser source with negligible performance penalty, where the multiple driven transmitters are respectively distributed throughout the network at end user's homes, and/or include multiple compact upstream transmitters at the OLT/hub/CO.

Many laser sources have been used as slave laser sources for injection locking across a wide spectral range, including multi-longitudinal mode FP lasers and reflective semiconductor optical amplifiers (RSOAs). However, DFB, DBR, and VCSEL lasers are also known to be capable of being injection locked with improved bandwidth and spectral width. For the WDM-PON based access network described herein, multimode FP lasers are described for use as the exemplary slave laser, since the gain spectrum occupied by the FP modes is considered wide enough to cover any WDM-PON channel on a fiber transmission window, and therefore the innovative concepts of the present embodiments may be illustrated for all of these known laser structures by the description of the FP laser as an exemplary embodiment. The person of ordinary skill in the art will understand that this example is thus used for illustrative purposes, and is not intended to be limiting. An injection locked FP laser additionally demonstrates good phase noise and linewidth properties. Therefore, by optimizing the FP laser resonance cavity length, a single (or a few) types of FP laser are adequate to illustrate the entire operational spectral range of a WDM-PON network, thereby further allowing for a significant reduction in the number of inventory parts and implementation costs.

Exemplary operation of smart controller 2512 within COIL transmission system 2500 is described further below with respect to the following figures. In an exemplary embodiment, smart controller 2512 further includes one or more of a master interface 2518 to master laser source 2502, a slave interface 2520 to slave laser 2504, and a modulation interface 2522 to modulator 2510.

Figure 26:
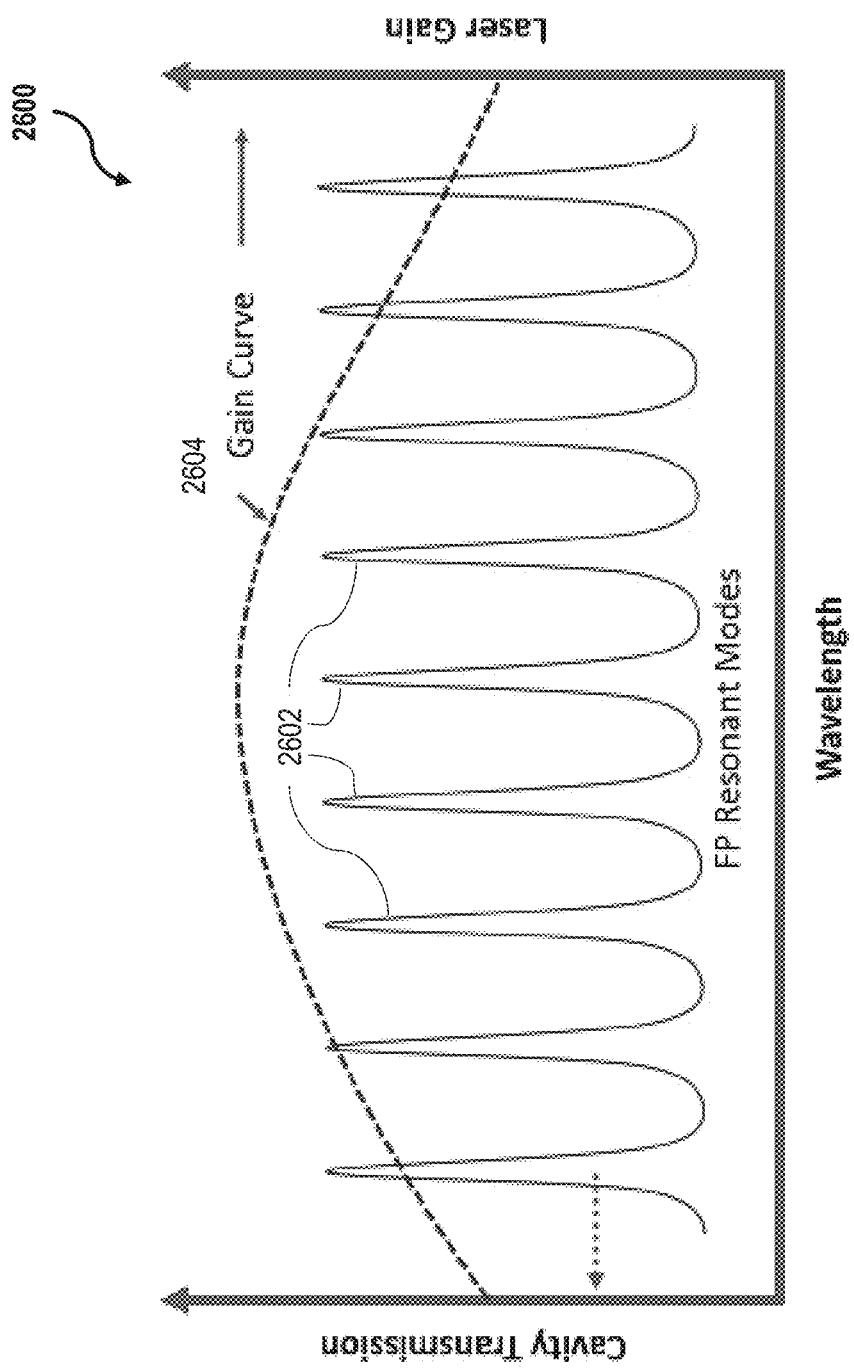
FIG. 26 is a graphical illustration depicting a spectral plot of an operational multimode Fabry Perot laser.

FIG. 26 is a graphical illustration depicting a spectral plot 2600 of an operational multimode FP laser. In an exemplary embodiment, plot 2600 illustrates an operational principle of a multimode FP laser including a plurality of resonant modes 2602, and a resonance cavity with gain media exhibiting a gain curve 2604. The resonance cavity may, for example, be formed between a front reflection mirror surface and a rear reflection mirror surface (not shown in FIG. 26). For optimized output power efficiency, the rear reflection mirror surface typically is provided with a higher reflectivity than the front reflection mirror surface. A stable resonant mode 2602 is formed in the FP laser when: (i) the integer of the wavelength is equal to the round trip optical path of the laser cavity, and (ii) the particular resonant mode 2602 is within spectral range of the gain media, as represented by gain curve 2604. Mathematically, the laser modal wavelength λ relates to the laser resonance cavity length L according to the equation N*λ=2*L, where N is a positive integer greater than one.

Figure 27:
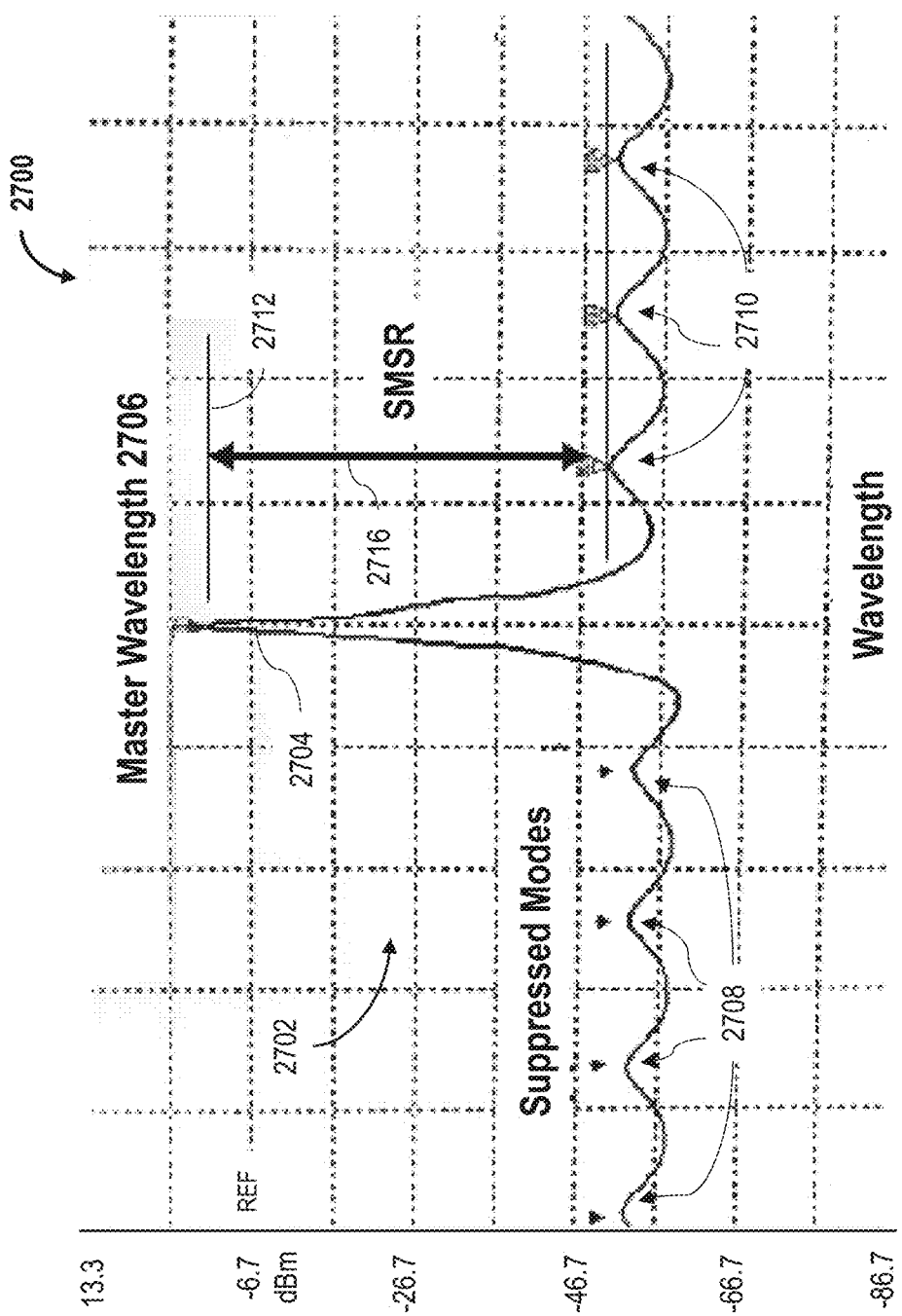
FIG. 27 is a graphical illustration depicting a spectral plot of a coherent optical injection locked Fabry Perot laser.

FIG. 27 is a graphical illustration depicting a spectral plot 2700 of a COIL FP laser. In an exemplary embodiment, plot 2700 illustrates a power curve 2702 of a COIL FP laser spectrum including a peak frequency 2704 locked to a master laser wavelength 2706, that is, locked by the FP laser under test. Plot 2700 further illustrates a first plurality of side modes 2708 to the "left" of peak frequency 2704 (i.e., at frequencies lower than that of peak frequency 2704) and a second plurality of side modes 2710 to the "right" of peak frequency 2704 (i.e., at frequencies greater than peak frequency 2704). Plot 2700 and thus illustrates an important characteristic of FP laser injection locking, described above, namely, that a peak power level 2712 of locked peak frequency 2704 is significantly greater than relative power levels 2714 of the respective side modes 2708, 2710 of the FP laser. A difference 2716 between peak power level 2712 and side mode power level 2714 represents the SMSR of the FP laser, and side modes 2708, 2710 by thus also referred to as "suppressed modes." As a rule of thumb, an SMSR value of 30 dB or higher is regarded as good optical injection locking, in this example (which exhibits an SMSR greater than 40 dB from plot 2700). Higher SMSR values enable better transmission distances, and with reduced phase and amplitude noise over the transmission. In practice, the SMSR may be dependent on specific link budget requirements.

Figure 28:
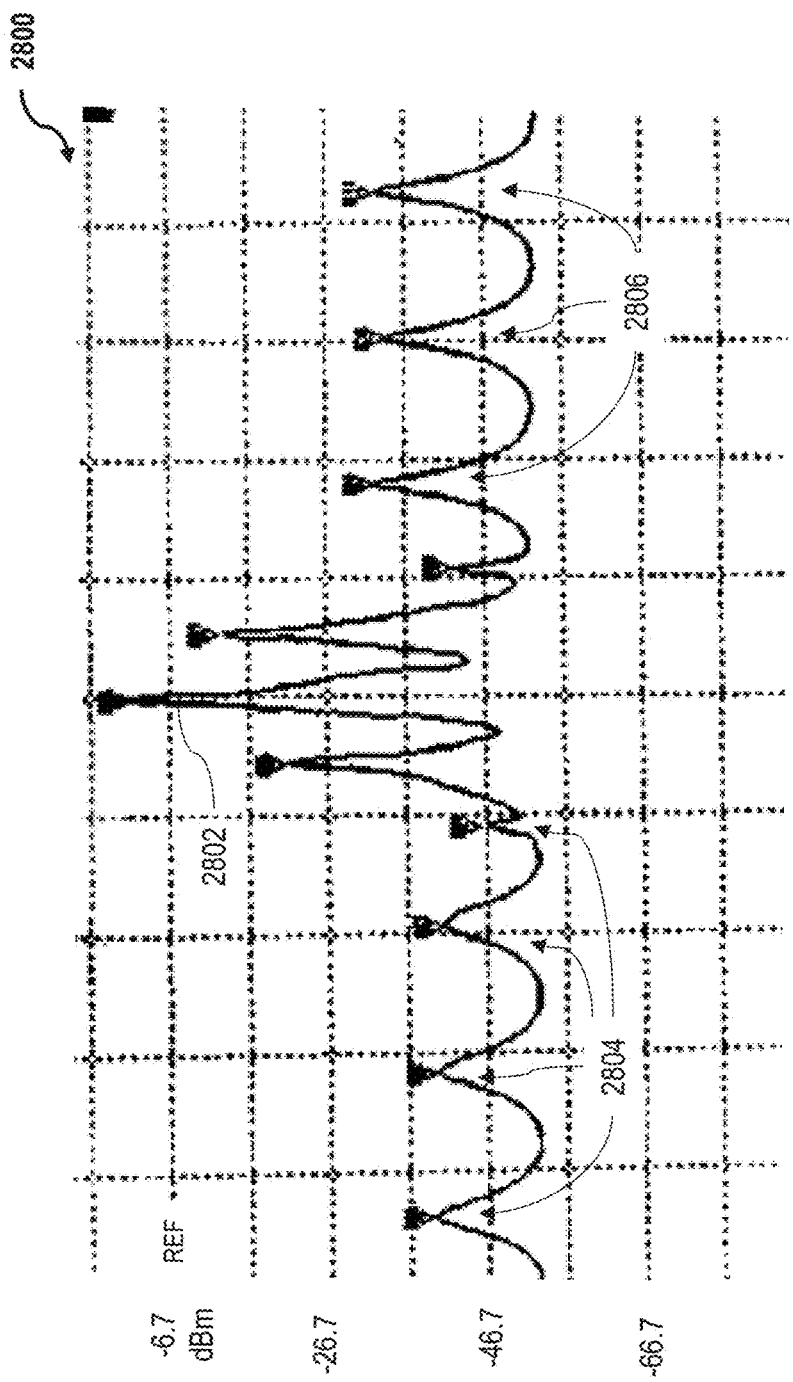
FIG. 28 is a graphical illustration depicting a spectral plot of a partially coherent optical injection locked Fabry Perot laser.

FIG. 28 is a graphical illustration depicting a spectral plot 2800 of a partially locked COIL FP laser. Plot 2800 is similar to plot 2700, FIG. 27, in several respects, and similarly includes a peak frequency 2802 that is the master frequency, but in this example, peak frequency 2802 is only partially locked by the FP laser. Plot 2800 further illustrates a first plurality of left side modes 2804, and a second plurality of right side modes 2806. Accordingly, the SMSR from plot 2800 may be seen to not generally exceed approximately 15 dB, and is therefore not considered usable for coherent optical communication.

Therefore, a simple comparison of plot 2800 with plot 2700 demonstrates how a slave FP laser is considered to be sufficiently coherently locked to the master laser only under certain conditions. If not properly controlled, the slave laser side modes might be unlocked (e.g., plot 2600), or only partially locked (e.g., plot 2700), rendering the particular slave laser unusable for the COIL techniques described herein. Accordingly, the present COIL transmitter systems and methods advantageously enable coherent optical fiber communication techniques to work more reliably in the field by locking the optical injection laser source with operational certainty and managing the ongoing operation with significantly greater stability.

In an exemplary embodiment, a smart controller (e.g., smart controller 2512, FIG. 25) is implemented within the COIL transmitter architecture (e.g., COIL transmitter system 2500, FIG. 25) to improve both the initial COIL locking for the coherent optical communications, as well as the ongoing stability of the COIL locking under continuous operation of the slave laser with respect to be master laser source. In some embodiments, the smart controller operates according to guidelines for optimizing the optical injection locking process to achieve highest optical output power and highest SMSR for the system, and also to expedite a fast and stable locking condition. In an exemplary embodiment, the smart controller further includes advanced sensing and control interfaces to both the master laser (e.g., master interface 2518, FIG. 25) and the slave laser (e.g., slave interface 2520, FIG. 25), as well as an interface with the coherent optical modulator (e.g., modulation interface 2522, FIG. 25) configured to provide optimized power and bias control. In the exemplary embodiment illustrated in FIG. 25, smart controller 2512 is configured to manage and receive output optical power and wavelength information (e.g., λ & I) through master interface 2518 from master laser 2502, and the received power and wavelength information (e.g., T & I) may then be used to control slave laser 2504, through slave interface 2520, to be injection locked to the master wavelength.

Figure 29:
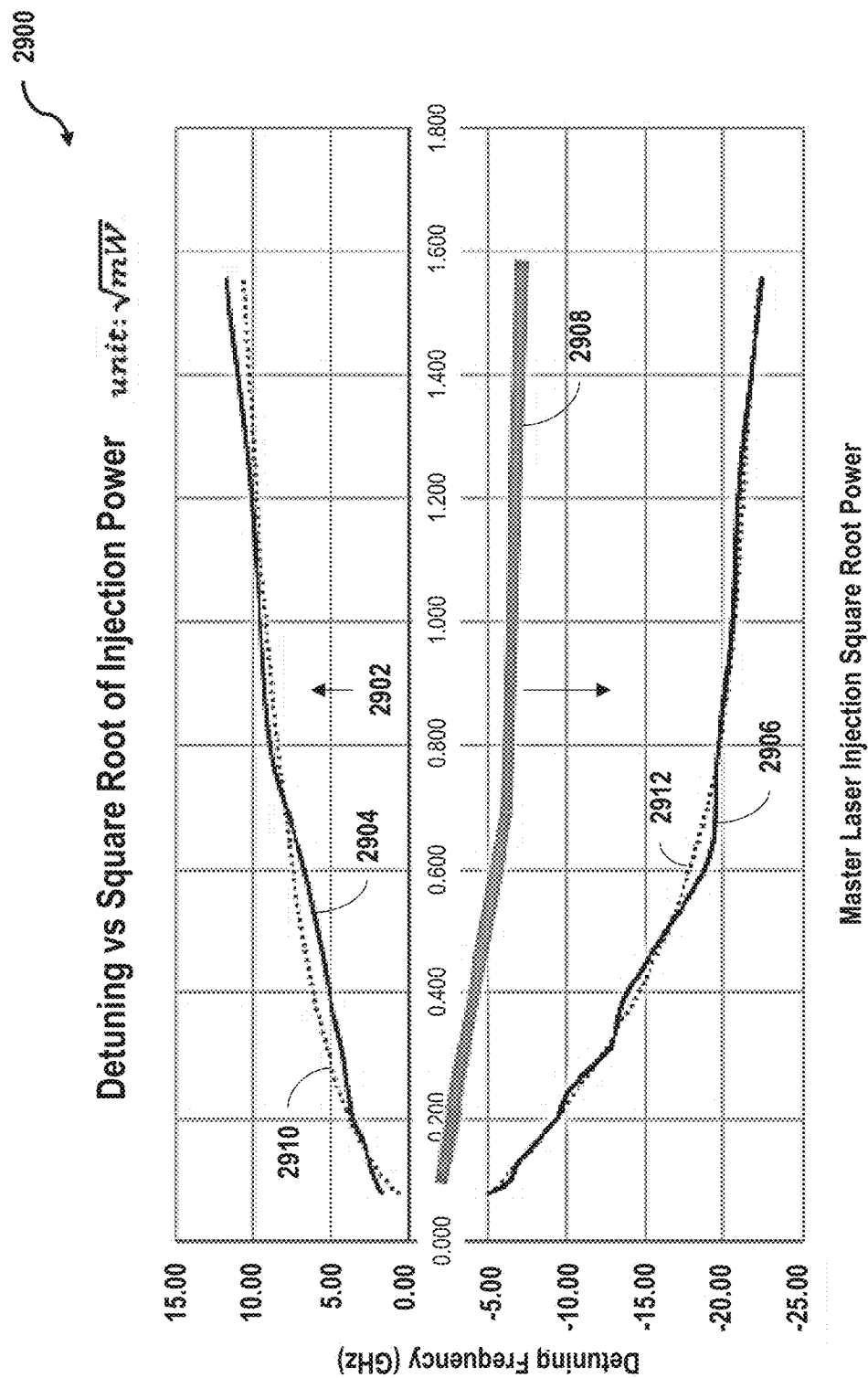
FIG. 29 is a graphical illustration depicting a comparative plot of slave laser frequency against master laser power.

FIG. 29 is a graphical illustration depicting a comparative plot 2900 of slave laser frequency against master laser power. In the exemplary embodiment depicted in FIG. 29, comparative plot 2900 illustrates the injection locking frequency range of the slave laser (e.g., slave laser 2504, FIG. 25) against the root squared input power of the master laser (e.g., master laser source 2502, FIG. 25). More particularly, the vertical axis of plot 2900 represents a detuning range 2902 of the slave laser injection locking frequency of an FP laser at room temperature, and the horizontal axis plot 2900 represents square root of the master laser input optical power.

In the embodiment illustrated in FIG. 29, frequency detuning range 2902 is defined by first locking a side mode of the FP slave laser with the master laser frequency, and then the FP side mode is detuned in frequency with respect to the master frequency until the particular FP side mode out of injection locking, or has an SMSR less than 30 dB. As described above, a key attribute of injection locking is that the detuning frequency range is asymmetrical with respect to the center frequency of the FP side mode. If the master laser frequency is set at a center of the FP side mode, injection locking may be achieved (described further below with respect to FIG. 30). However, if the master laser frequency is set slightly on the longer wavelength (i.e., lower frequency) side (e.g., first side modes 2708, FIG. 27, 2804, FIG. 28), it will have more tolerance to detuning.

As further illustrated in FIG. 29, a first subplot 2904 represents red-shift measured data, a second subplot 2906 represents measured blue-shift data, and a third subplot 2908 represents the optimized center locking frequency over the square root of injection power. A fourth subplot 2910 and a fifth subplot 2912 represent curve fitted data of first subplot 2904 and second subplot 2906, respectively. As indicated by comparative plot 2900, the red-shift approach exhibits a greater tolerance to maintain the locking state in a larger frequency range in comparison with the blue-shift approach. This phenomenon is labeled "red-shift" in optical injection locking theory due to the linewidth enhancement factor of the master laser induced carrier variation which will induce the gain change of the slave laser to longer wavelengths.

Therefore, by considering the COIL information against the input power information, very valuable additional information is provided that enables the enhanced slave laser injection locking control described herein. For example, in the case where the master laser frequency is placed right in the middle of a corresponding FP side mode center, locking may be effectively realized, but the stability of this locking will not be optimized, since this locking frequency will not be centered/in the middle of detuning range 2902 (e.g., along optimized third subplot 2908). Therefore, as illustrated in plot 2900, when the master laser output power is increased (horizontal axis), detuning range 2902 of the slave laser locking also increases. Accordingly, plot 2900 demonstrates that the locking range and stability of the COIL slave laser may be improved by increasing the master laser power.

Figure 30:
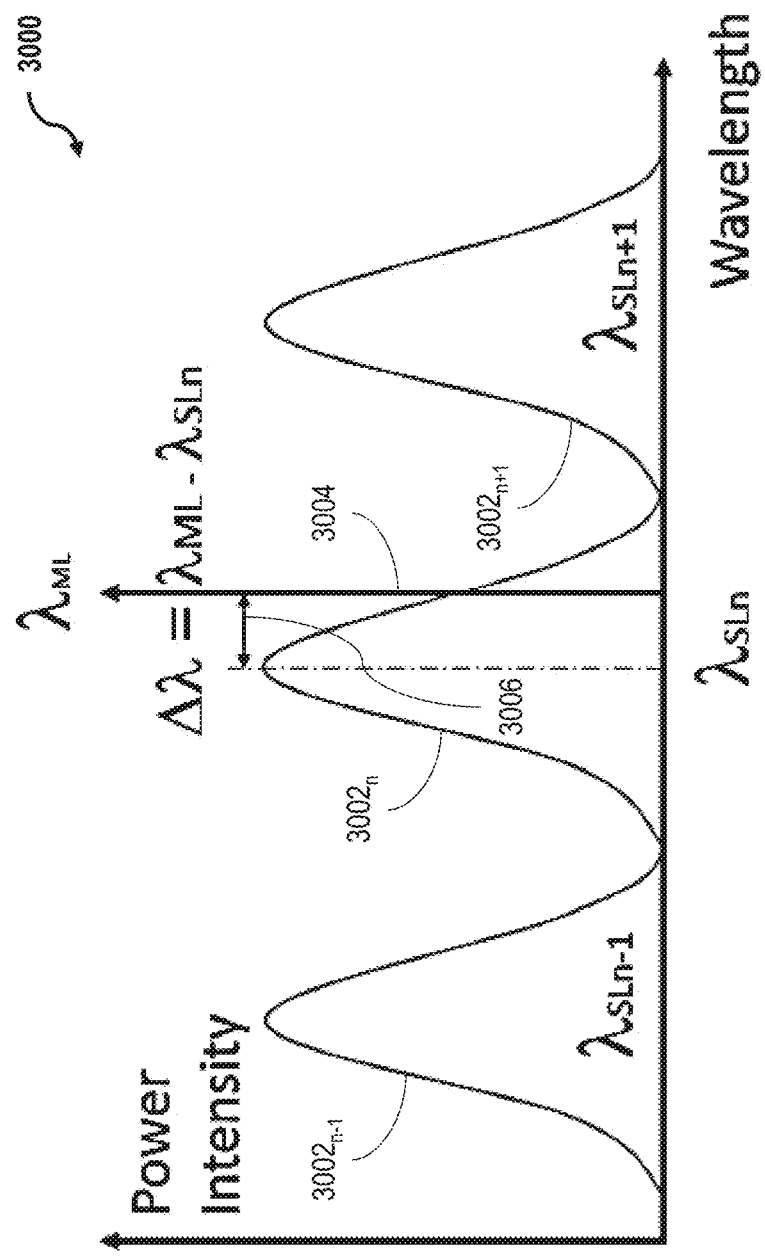
FIG. 30 is a graphical illustration depicting an optimization scheme for injection locking control.

FIG. 30 is a graphical illustration depicting an optimization scheme 3000 for injection locking control. In an exemplary embodiment, optimization scheme 3000 represents an injection locking control illustration diagram useful for optimized control injection locking of FP slave laser modes 3002 with respect to a master wavelength 3004. As illustrated in FIG. 30, the center wavelength of master wavelength 3004 is denoted as $\lambda_{ML}$, and $\lambda_{SLn}$ denotes the center wavelength of the $n^{th}$ side mode of FP slave laser modes 3002. Accordingly, a difference 3006 between the respective center wavelengths of master wavelength 3004 and the $n^{th}$ side mode $3002_n$ may be represented according to $\Delta\lambda=\lambda_{ML}-\lambda_{SLn}$, where $\Delta\lambda$ represents the wavelength offset between the center wavelength $\lambda_{ML}$ of the master laser/master wavelength 3004 and the center wavelength $\lambda_{SLn}$ of the $n^{th}$ side mode $3002_n$ of the slave laser.

Referring back to FIG. 25, in an exemplary embodiment, smart controller 2512 includes a memory capable of storing information and algorithms relevant to the injection locking physics and characteristics. Configured with such additional capability, smart controller effectively becomes a "brain" of COIL transmitter system 2500. In some embodiments, smart controller 2512 is further configured to be capable of sensing or measuring the laser current in real-time, and also the temperature and output power, through one or more control data acquisition interfaces (e.g., interfaces 2518, 2520, 2522). In at least one embodiment, smart controller 2512 is configured to control master laser source 2502 by initially setting, and later real-time adjustment in some cases, the optical power and optical frequency.

Similarly, smart controller 2512 may be further configured to also control slave laser 2504 by setting the bias current and the output power thereof. In an exemplary embodiment, smart controller 2512 is configured to control slave laser 2504 by managing the slave laser junction temperature, such as by setting the temperature controller (not shown) of slave laser 2504. In at least some embodiments, optical modulator 2510 may also be managed by smart controller 2512, such that modulator 2510 is provided with optimized power and bias for the incoming coherently locked FP slave laser output.

Figure 31:
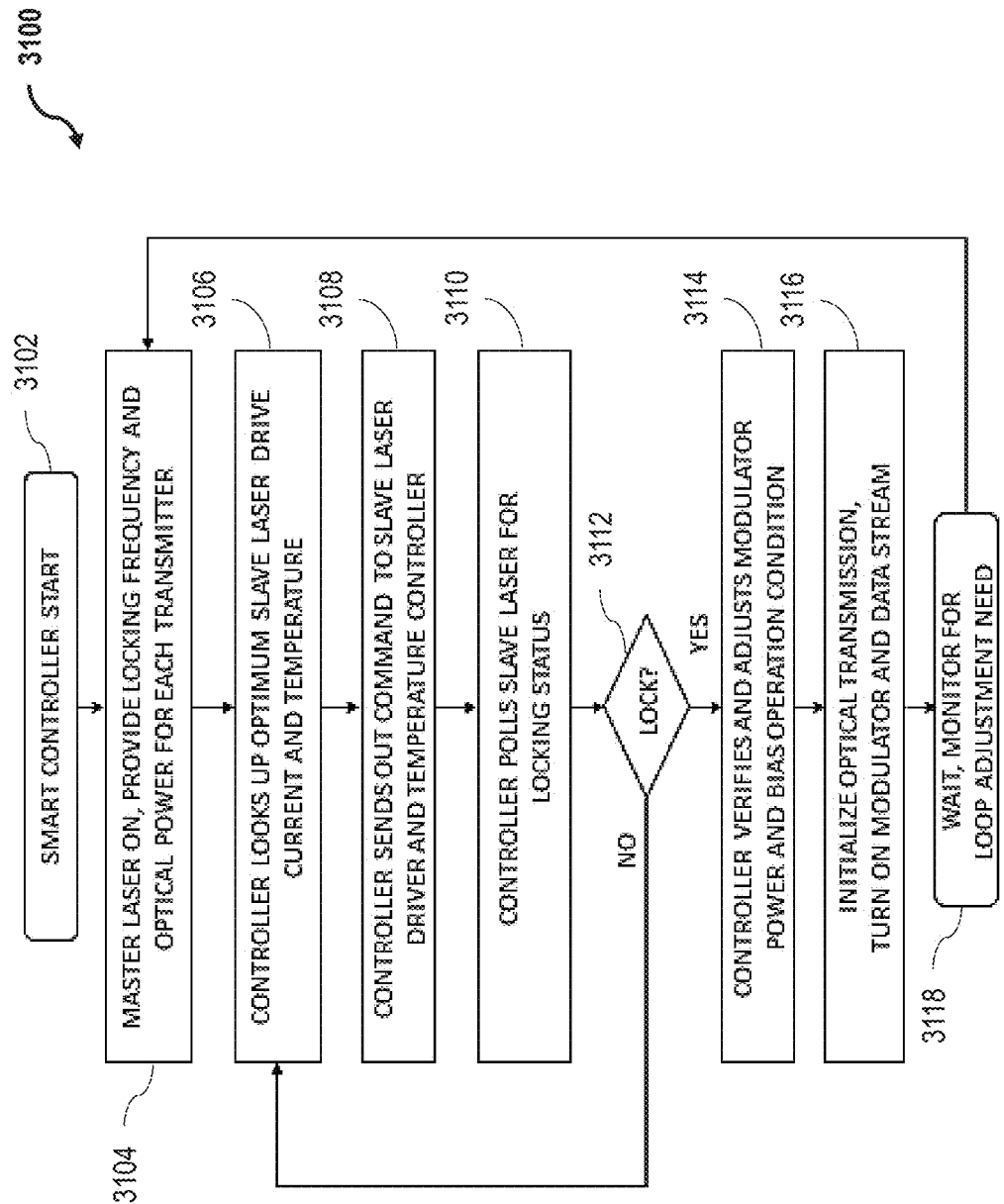
FIG. 31 is a flow chart diagram of an exemplary control process for the smart controller depicted in FIG. 25.

FIG. 31 is a flow chart diagram of an exemplary control process 3100 for smart controller 2512, FIG. 25. In an exemplary embodiment, process 3100 represents a smart controller process flow for initiating, configuring, and operating COIL transmitter system 2500, FIG. 25. In some embodiments, process 3100 may be further optionally implemented with respect to one or more embodiments of fiber communication system 100, FIGS. 1-7, including execution in a complementary, non-exclusionary fashion with respect to either or both of process 800, FIG. 8, and process 900, FIG. 9. Except where described to the contrary, individual steps of process 3100 may be performed in the order described, a different order, and/or two or more of several steps may be performed simultaneously.

In the exemplary embodiment, process 3100 begins at step 3102, in which operation of smart controller 2512 begins. In step 3104, the master laser (e.g., master laser source 2502) is powered on. In an exemplary embodiment of step 3104, smart controller 2512 turns on master laser source 2502 by setting a predefined wavelength and optical power level. In step 3106, smart controller 2512 is configured to calculate the drive current and temperature needed for slave laser 2504 to be successfully injection locked to the known master laser source 2502. In an exemplary embodiment of step 3106, smart controller 2512 obtains the drive current by a lookup operation in memory, or may obtain the drive current from a precision current source and the temperature by direct or indirect sensing capability.

In step 3108, smart controller 2512 transmits operational commands to a driver of slave laser 2504, as well as a temperature controller thereof (not shown). In an exemplary embodiment of step 3108, temperature control may be provided using a thermal electrical ceramic (TEC) module, or using a simplified thermal resistive heater element may be implemented for temperature control. In at least one embodiment of step 3108, temperature control is provided by smart controller 2512 using a thermistor (not shown) co-packaged near the FP laser chip of slave laser 2504 to accurately control the FP chip junction temperature within one percent of a Celsius degree or better.

In the exemplary embodiment, smart controller 2512 is configured to maintain in memory a detailed knowledge of the FP laser detuning range, as well as optimized locking temperatures and currents for the particular FP slave laser sought to be controlled. In an exemplary embodiment, such detailed information and/or algorithms may be stored in a lookup table, in the smart controller memory, in an EEPROM, etc. In an exemplary embodiment, smart controller is, or includes, a server, a micro-processor, or an ASIC.

In step 3110, smart controller 2512 polls slave laser 2504 for the locking status of slave laser 2504. Step 3112 is a decision step. If, in step 3112, smart controller 2512 determines that slave laser 2504 has not achieved locking to master laser source 2502, process 3100 returns to step 3106. If, however, process 3100 determines in step 3112 that slave laser 2504 has achieved injection locking, process 3100 proceeds to step 3114. In step 3114, smart controller 2512 configured to verify the power and bias operation condition of modulator 2510 (e.g., using modulation interface 2522). In an exemplary embodiment of step 3114, smart controller 2512 is further configured to adjust, in real time, the modulator power and bias operation condition as desired or needed.

In step 3116, smart controller 2512 is configured to initialize the optical transmission, turn on modulator 2510, and enable communication of data stream 2514, which is then output from modulator 2510 as modulated data 2516. In step 3118, process 3100 is configured to wait, or hold, for a predetermined period of time (e.g., 0-n seconds), before returning to step 3104, thereby creating a continuous monitoring loop that is capable of adjusting and controlling in real-time the several laser parameters relevant to successfully initiating and maintaining injection locking of slave laser 2504 to master laser source 2502. In an exemplary embodiment, the continuous loop of process 3100 will run as long as smart controller 2512 is powered on.

According to the exemplary systems and methods described herein, an innovative optical injection locking-based coherent optical transmitter is provided for coherent fiber optical network communications. The present transmitter includes a master laser capable of providing single channel or multi-channel low-linewidth frequency channel(s) as the central laser source for the communication system. The transmitter may further include a slave laser having multi-longitudinal modes which may be coherent optical injection locked (COIL) to the master laser frequency of the master laser.

In some embodiments, a COIL-based transmitter system includes a polarization controller between the master laser and the slave laser to maximize the injection locking efficiency, and an optical circular may be employed to inject the master laser into the cavity of the slave laser. The output power from the locked slave laser may be transmitted along the same fiber from which the master laser is injected to the slave laser cavity, but alternatively routed to an optical modulator. In the exemplary embodiment, operation of the COIL-based transmitter system is managed by a smart controller having a memory, and/or programmed with smart algorithm, such that the master laser and the slave laser may be reliably placed, and then maintained, in a locking state.

In some embodiments, the smart controller represents an advanced control device having improved communication, sensing, and control capabilities. The smart controller may, for example, include or be a server, a microprocessor, or an ASIC. The smart controller may further include a memory or EEPROM capable of storing detailed tables of slave laser or FP locking conditions with respect to the injected master laser optical power, and which may further include detailed information regarding relevant slave laser drive currents and junction temperatures.

In exemplary embodiments of the systems and methods described herein, the master laser communicates with the smart controller such that optical frequency and optical power is known to the controller. The smart controller may further include one or more interfaces capable of communication with one or more respective components of the COIL transmitter system. The master laser may, for example, include or be a frequency comb, a tunable laser, a WDM array, and/or other types of lasers capable of providing low-linewidth, and low phase noise optical tone or tones. The master laser may thus advantageously communicate with the smart controller, and in some cases, may be controlled by the smart controller.

Similarly the slave laser may also communicate with the smart controller and be controlled by the smart controller. The slave laser may therefore include or be a multi-longitudinal FP laser, a VCSEL, a DFB, or another type of laser capable of being injection locked to provide a single tone COIL source. The slave laser may optimally be driven by high precision current source of the master laser to provide injection locking by aligning an FP side mode with the master laser frequency. Alternatively, or supplementally, the slave laser may be driven by high resolution temperature controller such that injection locking is provided by aligning the FP side mode with the master laser frequency. The temperature controller may be or include one or more of a TEC component close to the FP laser capable of heating or cooling the FP laser, a thermal resistor component close to the FP laser capable of heating the FP laser, and a thermistor or temperature sensor placed near the FP laser to monitor the FP laser junction temperature.

In the exemplary embodiments described herein, the COIL transmitter system includes optical modulator capable of converting an electrical data stream into a modulated optical signal using the COIL transmitter system source. In some embodiments, the bias and power of the optical modulator may also be advantageously controlled by the smart controller. The optical modulator may include or be an intensity modulator, a phase modulator, an intensity-phase modulator, and/or one or more of the modulator embodiments described above.

The present techniques further provide an advantageous processing algorithm for operating the smart controller manage the transmitter perform, and thereby advantageously ensure that COIL is not only achieved, but also maintained in real-time throughout the operational duration of the smart controller. The smart controller may thus be configured to seamlessly integrate with the operation or one or more of the hardware component and system structures described above.

The present smart controller may therefore further include one or more software algorithms, or sets of executable computer programming steps, including without limitation instructions to: (i) initiate the master and slave lasers; (ii) calculate or determine optimal conditions to ensure locking of the slave laser; (iii) send drive current and/or temperature control commands to the slave laser; (iv) poll the temperature and current of the slave laser; (v) set the optical modulator power and bias for data conversion; (vi) start modulator operation once injection locking is stabilized; and (vi) instruct or authorize the optical modulator to convert electrical data to modulated optical signals for communication over an optical fiber transport medium. The present systems and methods are therefore of particular utility in the paradigm of coherent communications systems, including without limitation P2P coherent transmission systems, P2MP coherent PON systems, and/or single wavelength or WDM systems.

Injection-Locking Full-Field Transmitter

As described above, data-driven applications, such as HD video streaming, mobile Internet, and cloud computing, have led to a significant growth in the recent overall traffic volume in optical communication networks. Furthermore, the demand for optical transmission at ultra-high data rates is also increasing for the optical transport, metro, and access network paradigms. These trends, along with a growing bit-per-Hz cost reduction requirement, have led to increasing needs in the industry for higher-speed optical transmission interfaces and higher spectrum efficiency technologies.

Recent developments in coherent optical technology have provided useful improvements for long-haul backbone transport systems. Advancements in digital signal processing (DSP) techniques, as well as signal formats (e.g., QPSK, 8QAM, 16QAM, etc.) utilizing polarization multiplexing, have enabled long-haul links, and metro networks more recently, to realize improve data rates and spectral efficiency. Coherent technologies are now being introduced to the access network, such as with the case of 100 G coherent optics in short distance P2P links of the HFC access network. Other wired networks (e.g., PON) are also moving towards 100 G coherent implementations for next generation (NG) access (e.g., NG-PON). However, the lower receiver sensitivity and limited power budget of PON systems present considerable challenges to high speed support using present PON direct detection schemes. The innovative coherent techniques presented herein though, address and solve these conventional challenges, rendering the implementation thereof significantly future-proof solutions for NG high-speed PON systems. The present systems and methods improve the link power budget, and with much greater sensitivity, while also enabling higher-order modulation formats to increase the data rate and network efficiency.

Cost is another significant obstacle to utilizing coherent optics in the access network. Conventionally, the overall system cost of the access network has been dominated by optical and optic-electronic components, such as low-linewidth tunable laser sources for the transmitter, as well as local oscillators and advanced modulators. Accordingly, there is a need in the industry for further innovations to the coherent optical components of the coherent access network to further reduce the cost thereof. Some such architectural innovations are described in greater detail above, and in U.S. Pat. No. 9,912,409, all of which are incorporated by reference herein in their entireties. These embodiments to the present inventors describe COIL techniques that enable the use of essentially "low-quality" and low-cost lasers (i.e., slave lasers) as high performing lasers by injection locking the low-cost laser by a high-quality injection laser (sometimes referred to herein as "master laser"). The injection locked slave laser thus behaves like a high-quality master laser which can be used in coherent transmission systems to greatly reduce the overall cost of the entire system.

Particular challenges with respect to injection locking up lasers are described in greater detail above. The present embodiments introduce new and advantageous implementation schemes for injection-locking full-field transmitters that incorporate newer technologies, such that these developing coherent technologies are able to meet the unique requirements of the access environment with cost-efficient approaches. For example, according to the present systems and methods, laser injection-locking and full-field signal modulation (e.g., as m-QAM or m-PSK) may both be achieved using the low-cost embodiments described herein. The present techniques are further enabled to achieve polarization multiplexing, such as for dual-polarization advanced signal modulations. The present embodiments thereby provide an injection-locked transmitter using a relatively low-cost configuration of optical components, but which achieves high spectrum efficiency for an optical coherent communication system. In comparison with conventional I/Q modulators that implement a parallel Mach-Zehnder Modulator (MZM) structure that suffers relatively high insertion and modulation losses, the present systems and methods represent significant reductions to not only the cost, but also to the modulation loss, while nevertheless increasing the output power.

The embodiments described further herein provide, for purposes of illustration, two exemplary system architectural scenarios for multiple injection-locked transmitters, namely: (i) single-wavelength source use cases; and (ii) multi-wavelength source use cases. The person of ordinary skill in the art though, when reading and comprehending the present disclosure, will understand that these exemplary embodiments are provided by way of example, and not in a limiting sense. Other architectural scenarios may be implemented with respect to the present embodiments without departing from the scope thereof. The present systems and methods are further of particular use in both P2P and P2MP networks, and in either network type, a single high-quality master laser may be cloned and modulated by one or more low-cost slave lasers which will exhibit the high-quality performance of the master laser, while also carrying the relevant advanced modulation formats. According to these innovative techniques, the overall network cost is greatly reduced by avoiding the deployment of high-quality, high-cost master lasers and modulators for each coherent transceiver.

Figure 32:
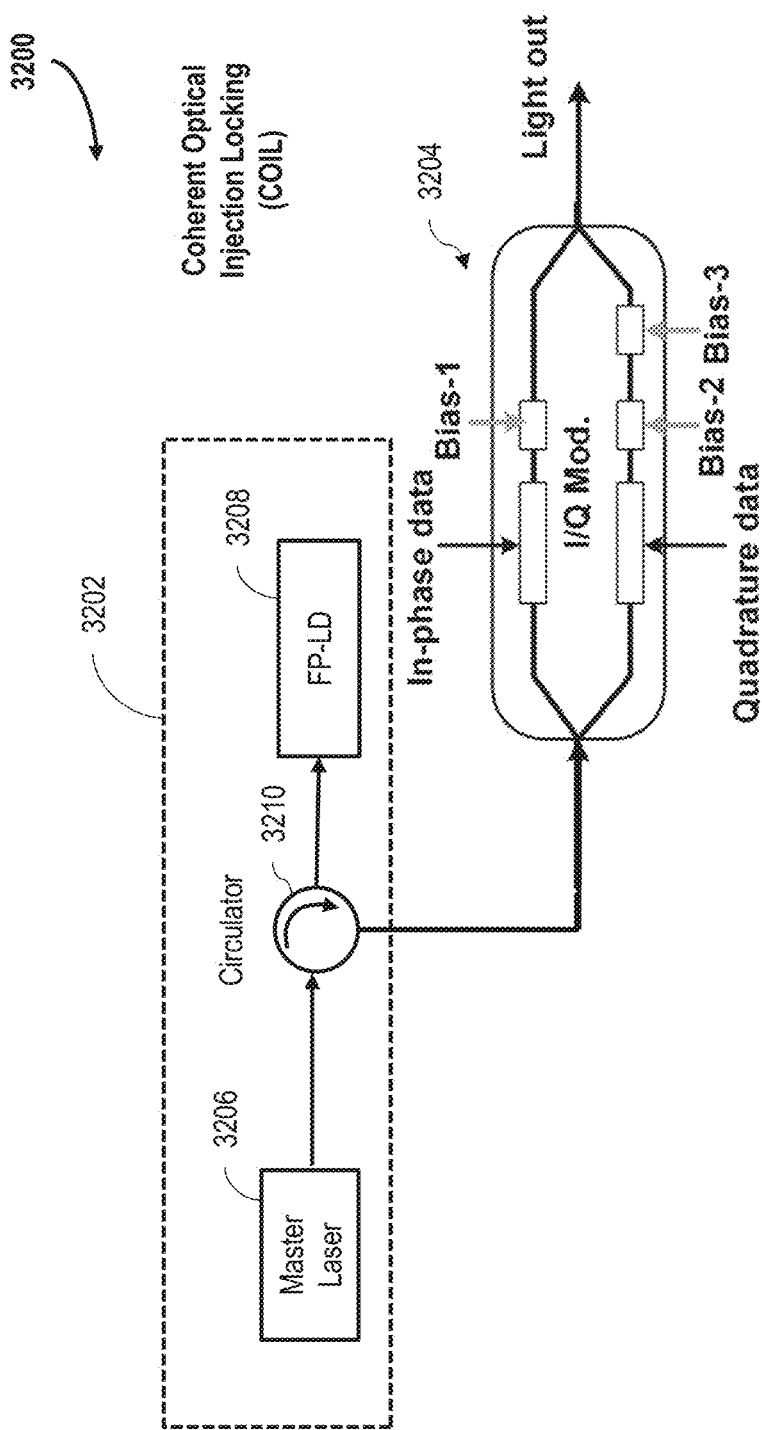
FIG. 32 is a schematic illustration of a coherent optical injection locked system.

FIG. 32 is a schematic illustration of a COIL system 3200. In an exemplary embodiment, system 3200 includes a COIL transmission subsystem 3202 and an external modulator 3204. COIL transmission subsystem 3202 includes a master laser 3206, at least one slave laser 3208, and an optical circulator 3210. In exemplary operation of system 3200, COIL transmission subsystem 3202 functions similarly to the systems and methods described in the embodiments above, i.e., low-cost injection-locked lasers. Nevertheless, for at least some of the embodiments described above, use of external modulator 3204 may be desirable to generate higher-order modulation formats, such as QPSK or QAM.

In the embodiment depicted in FIG. 32, external modulator 3204 is depicted as an MZM external I/Q modulator, which is considered relatively expensive in this particular field, and which also is known to have a high insertion/modulation loss (i.e., greater than 25 dB). The present embodiments though, avoid the need for such expensive external modulators by injection locking lasers using full-field transmitters, that is, full-field optical signal modulation. The following techniques describe full-field optical signal modulation using (1) orthogonal modulation in the Cartesian coordinate plane (e.g., In-phase (I) and Quadrature (Q) modulation), and (2) amplitude and phase modulations in the Polar coordinate plane (i.e., amplitude and phase being naturally orthogonal to one another). Accordingly, for the examples described herein, optical full-field modulation is described with respect to optical carriers from each modulation dimension being fully coherent, and at the same-frequency, polarization, and locked phase.

Figure 33:
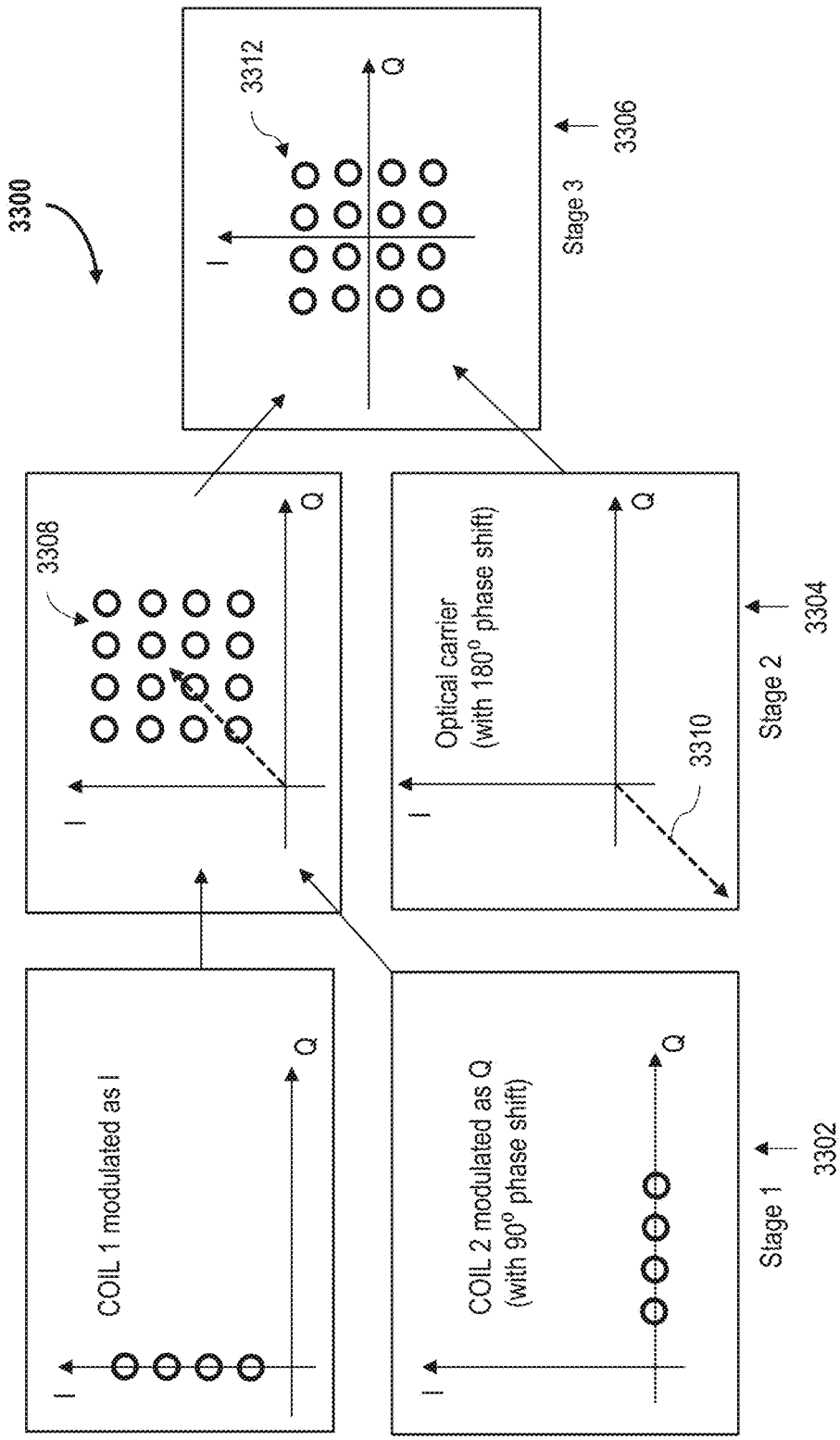
FIG. 33 is a graphical illustration depicting an operational principle of a coherent optical injection locked transmitter implementing I/Q modulation.

FIG. 33 is a graphical illustration depicting an operational principle 3300 of a COIL transmitter (e.g., similar to COIL transmission subsystem 3202, FIG. 32) implementing I/Q modulation. In an exemplary embodiment, operational principle 3300 implements full-field optical transmitter injection locking, based on I/Q modulations, in three stages, i.e., a first stage 3302, a second stage 3304, and a third stage 3306, and without requiring any external modulator (e.g., external modulator 3204, FIG. 32).

In first stage 3302, two direct-modulator COIL lasers (sometimes referred to herein as COILs) are directly modulated with data for I and Q signals. In the example illustrated in FIG. 33, the first COIL laser (COIL 1) is modulated as the I signal, and the second COIL laser (COIL 2) is modulated as the Q signal. In second stage 3304, two controlled phase shifters (PSs, not shown in FIG. 33, see FIG. 36, below) utilized to combine the resultant two optical signals from first stage 3302 (i.e., after injection locking and modulation, with 90° phase difference between them) to realize a higher-order modulation (16 QAM, in this example). However, at second stage 3304, after combining the I/Q signals, a DC offset exists in combined signal 3308, due to the direct modulation from the respective COIL lasers. Accordingly, in at least one embodiment of operational principle 3300, at second stage 3304, the phase shifters may be further utilized to obtain an optical carrier 3310 having a 180-degree phase shift. Therefore, at third stage 3306, modulated signal 3308 is combined with shifted optical carrier 3310 to achieve a full-field modulation constellation 3312 that is fully centered about the I/Q axes.

According to this advantageous embodiment, the need or desire for an external modulator is eliminated, thus rendering optical system according to operational principle 3300 "external modulator-free." As described above, in this exemplary embodiment, to direct-modulator COIL lasers are utilized along with two controlled phase shifters keep orthogonality (i.e., first and second stages 3302, 3304, respectively), with the at least one additional stage (i.e., third stage 3306) to cancel the DC offset resulting from the direct modulation of the COIL lasers.

Figure 34B:
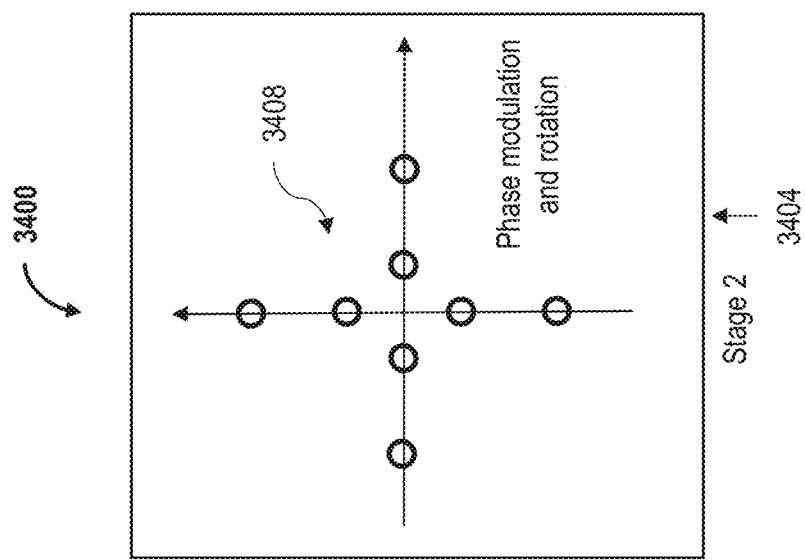
FIGS. 34A-B are graphical illustrations depicting operational principles of coherent optical injection locked transmitters implementing amplitude modulation and phase modulation.
Figure 34A:
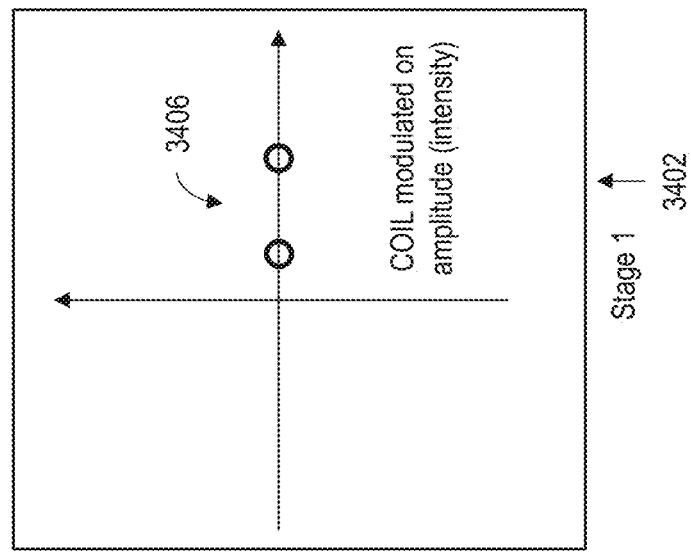

FIGS. 34A-B are graphical illustrations depicting an operational principle 3400 of COIL transmitters implementing amplitude modulation and phase modulation, respectively. More particularly, different from operational principle 3300, FIG. 33, operational principle 3400 achieves full-field transmitter injection locking based on amplitude and phase modulations implemented in the polar coordinate plane over a first stage 3402 and a second stage 3404. At first stage 3402, injection locking and amplitude modulation are realized to obtain and amplitude-modulated COIL signal 3406. At second stage 3404, phase modulation is applied to achieve full-field optical modulation of full-field signal

3408. Since, according to this technique, the amplitude and phase modulation remain naturally orthogonal to each other, and additional (i.e., third) stage for bias control is unnecessary.

In comparison with conventional modulators based on MZM or Mach-Zehnder Interferometers, which experience generally large insertion and modulation losses, the present injection-locking laser-based embodiments demonstrate still further advantages over these conventional systems, in that the present systems and methods are capable of providing a significantly higher output power due to the gain components present in the lasers. In comparison with operational principle 3300, FIG. 33, operational principle 3400 may be more simply implemented using only one COIL, with no bias or phase shift control needed. In some embodiments of operational principle 3400 though, an external phase modulator may be desired.

Figure 35:
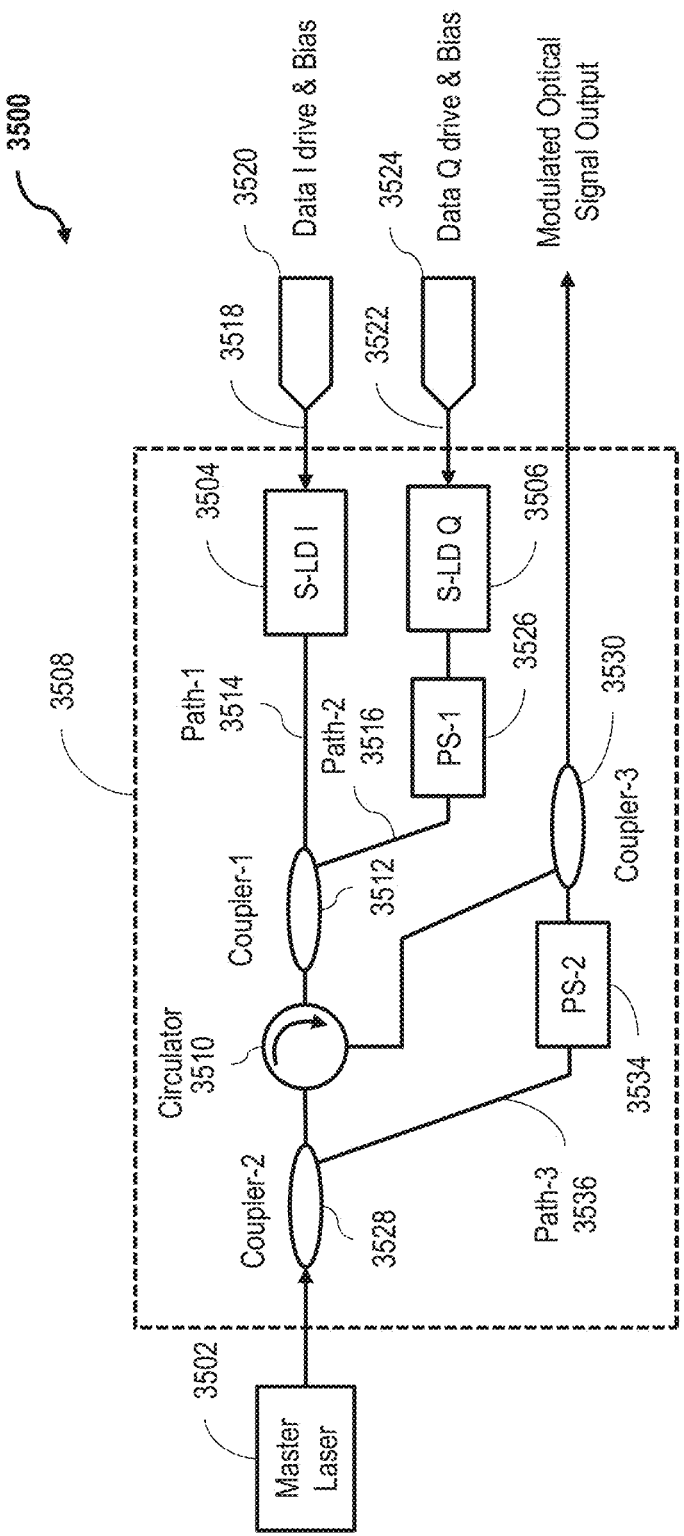
FIG. 35 is a schematic illustration of an exemplary single-polarization coherent optical injection locked transmitter implementing full-field modulation based on I/Q modulation.

FIG. 35 is a schematic illustration of an exemplary single-polarization COIL transmitter 3500 implementing full-field modulation based on I/Q modulation. In an exemplary embodiment, FIG. 35 depicts an implementation process flow of transmitter 3500 implementing single-polarization injection locking with full-field modulation based on I/Q modulation (e.g., according to operational principle 3300, FIG. 33). In the exemplary embodiment, transmitter 3500 is an injection-locked full-field optical transmitter that further includes a high-quality master laser 3502, which may be used to injection-lock first and second low-cost slave lasers 3504, 3506, respectively, (e.g., multi-longitudinal mode FP lasers or VCSELs). In an exemplary embodiment, master laser 3502 and slave lasers 3504, 3506 are in operable communication over a COIL subsystem 3508.

In the exemplary embodiment, COIL subsystem 3508 includes an optical circulator 3510 for routing master laser 3502 into the respective resonance cavities (not shown) of slave lasers 3504, 3506. COIL subsystem 3508 further includes a first coupler 3512 (Coupler-1) disposed opposite master laser 3502 with respect to optical circulator 3510, for splitting the power from the signal of master laser 3502 into a first path 3514 (Path-1), and a second 3516 (Path-2). In the embodiment depicted in FIG. 35, first slave laser 3504 (S-LD I) is injection locked to master laser 3502, and further directly-modulated to convert a first electrical data stream 3518 of electric signals, received from a first electrical data signal source 3520 (electrical I-data, in this example), into a synthesized optical (I) signal. In a similar manner, second slave laser 3506 (S-LD Q) is also injection locked to master laser 3502, and directly-modulated to convert a second electrical data stream 3522 of electric signals received from a second electrical data signal source 3524 (electrical Q-data, in this example), into a synthesized optical (Q) signal.

The injection-locked modulated optical (I) signal from first slave laser 3504 connects with first path 3514, and the injection-locked modulated optical (Q) signal from second slave laser 3506 connects with second math 3516 through a first phase shifter 3526. In this manner, first phase shifter 3526 functions to control the phase shift between first path 3514 and second path 3516. Accordingly, after modulation, the two injection-locked optical laser signals are combined at first coupler 3512. Through this advantageous configuration, implementation of first phase shifter 3526 enables control of the signals to achieve a round-trip of 90-degree phase difference between the two respective outputs of injection-locked slave lasers 3504, 3506, thereby achieving full I/Q modulation between the slave lasers. In this example, a phase shift of 90-degrees is provided by way of illustration, but not in a limiting sense. The person of ordinary skill in the art understand that different phase shift values may be employed with respect to the present embodiments to achieve a synthesized full-field optical signal with different phase and amplitude distributions.

According to the exemplary configuration of transmitter 3500, optical circulator 3510 advantageously provides additional functionality to route the modulated, synthesized full-field optical signal (i.e., the combination of first and second paths 3514, 3516) out of the transmitter. A final stage includes a second coupler 3528 (Coupler-2) disposed between master laser 3502 and first coupler 3512, and a third coupler 3530 (Coupler-3) disposed between optical circulator 3510 and a transmitter output 3532. In the exemplary embodiment, a second phase shifter 3534 (PS-2) is disposed along a third path 3530 (Path-3) between second coupler 3528 and a third coupler 3530, which effectively renders third path 3530 into a bypass route around optical circulator 3510 between master laser 3502 and transmitter output 3532. This advantageous configuration of second phase shifter 3534 thus serves as a shifted control, taken directly from master laser 3502 (i.e., at second coupler 3528), and then combined with the synthesized full-field optical signal from optical circulator 3510 (i.e., at third coupler 3530), to effectively cancel the direct-current (DC) component of the full-field signal. In an exemplary embodiment, second phase shifter 3534 is configured for a 180-degree phase shift, which enables (e.g., assuming an appropriate power level from second coupler 3528) the DC component of the synthesized full-field optical signal to be fully canceled at/after third coupler 3530.

In an exemplary embodiment, first and second phase shifters 3526, 3534 are further configured to operate with a fixed phase shift to achieve orthogonal I/Q modulation. For example, first phase shifter 3526 may be configured to have a 45-degree one-way phase shift (e.g., along second path 3516), and second phase shifter 3534 may be configured to have a 180-degree one-way phase shift (e.g., along third path 3536). In some embodiments, one or both of first and second phase shifters 3526, 3534 are tunable, and may utilize a bias voltage to achieve arbitrary or desired phase and amplitude modulations. Transmitter 3500 therefore represents a three-stage signal generation unit. In at least one embodiment, in a case where the injected power of master laser 3502 is considered relatively low, a gain component may be desirable to amplify the power along third path 3536, before or after second phase shifter 3534, for carrier cancellation (e.g., using a semiconductor optical amplifier (SOA), not shown in FIG. 35).

Figure 36:
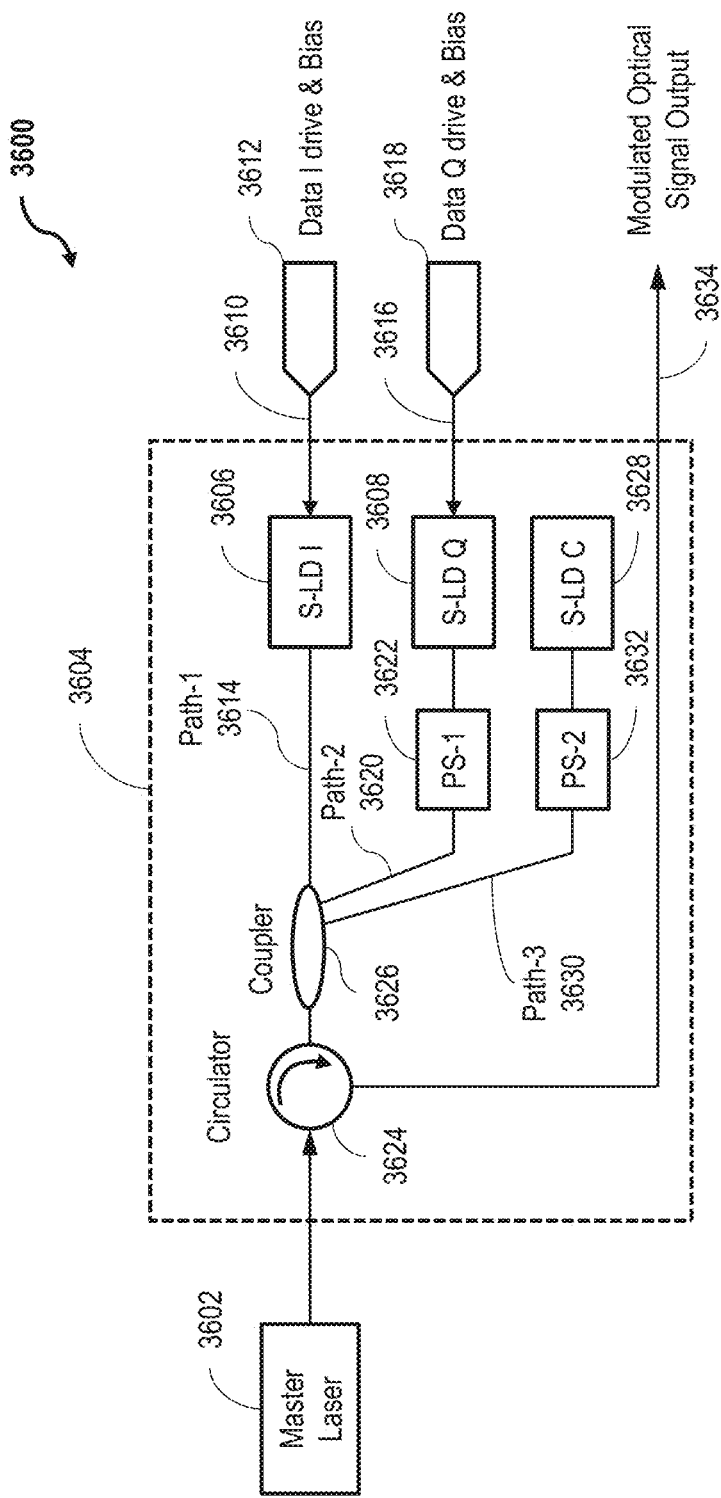
FIG. 36 is a schematic illustration of an alternative single-polarization coherent optical injection locked transmitter implementing full-field modulation based on I/Q modulation.

FIG. 36 is a schematic illustration of an alternative single-polarization COIL transmitter 3600 implementing full-field modulation based on I/Q modulation. Transmitter 3600 is similar to transmitter 3500, FIG. 35, in several structural and functional respects, and also represents an injection-locked full-field optical transmitter setup for a high-quality master laser 3602 in communication with a COIL subsystem 3604 including a first slave laser 3606 (S-LD I) and a second slave laser 3608 (S-LD Q) injection-locked to master laser 3602. Similar to the operation of transmitter 3500, first slave laser 3606 is modulated to convert a first electrical data stream 3610 (e.g., I-data) from a first electrical data signal source 3612 into an optical (I) signal along a first path 3614, and second slave laser 3608 is modulated to convert a second electrical data stream 3616 (e.g., Q-data) from a second electrical data signal source 3618 into an optical (Q) signal along a second path 3620, along which is disposed a first phase shifter 3622. In the exemplary embodiment, COIL subsystem 3604 further includes an optical circulator 3624 for routing master laser 3602 into the respective resonance cavities (not separately shown) of slave lasers 3606, 3608.

Transmitter 3600 differs from transmitter 3500 though, in that COIL subsystem 3604 utilizes a single optical coupler 3626 between optical circulator 3624 and slave lasers 3606 and 3608 for combining the synthesized optical signals of first and second paths 3614, 3620. Transmitter 3600 further differs from transmitter 3500 in that transmitter 3600 includes an injection-locking third slave laser 3628 (S-LD C) in operable communication with optical coupler 3626 over a third path 3630. In an exemplary embodiment, a second phase shifter 3632 is disposed along third path 3630 between optical coupler 3626 and second phase shifter 3632. According to this alternative configuration, only one coupler (e.g., optical coupler 3626) is needed to split the input master laser power from master laser 3602 into the three separate lanes of first, second, and third paths 3614, 3620, 3630, respectively.

More particularly, in this example, transmitter 3600 applies first path 3614 for laser injection-locking and I-data modulation, and second path 3620 for laser injection locking and Q-data modulation, with a round-trip 90-degree phase shift provided by first phase shifter 3622. According to this configuration, transmitter 3600 is further enabled to apply third path 3630 for not only laser injection locking, but also for DC offset cancellation through utilization of second phase shifter 3622, which may achieve a 180-degree phase shift round-trip, in this example. Thus, a single optical circulator (e.g., optical circulator 3624) may still be utilized in this alternative configuration to both route the master laser signal into the respective resonance cavities of slave lasers 3606, 3608, 3628, and also to route the modulated, synthesized full-field, combined optical signal therefrom to a transmitter output 3634. In some embodiments, implementation of third slave laser 3628 may be optional according to the input power of master laser 3602, namely, in the case where the input power is above or below a predetermined threshold.

Transmitters 3500 and 3600 are described above with respect to single-polarization COIL configurations by way of illustration, and not in a limiting sense. For example, the principles described immediately above are fully applicable to dual-polarization transmitters through implementation of two sets of each of the single-polarization COIL full-field transmitters in combination with a polarization beam combiner (PBC) to combine the modulated signals on two polarizations to achieve polarization multiplexing, as described further below with respect to FIGS. 37 and 38.

Figure 37:
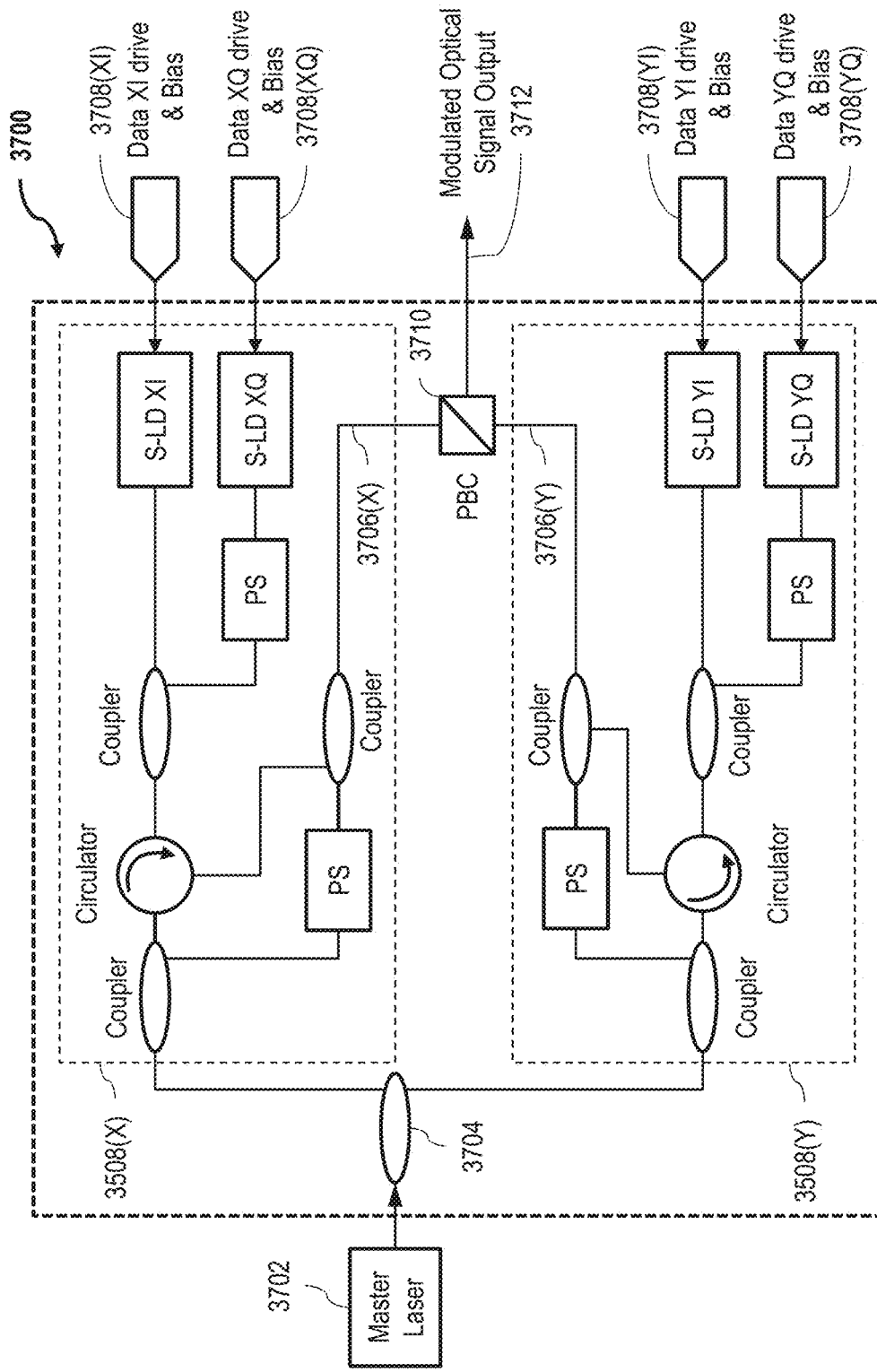
FIG. 37 is a schematic illustration of an exemplary polarization multiplexer transmitter implementing dual-polarization coherent optical injection locked full-field modulation.

FIG. 37 is a schematic illustration of an exemplary polarization multiplexer transmitter 3700 implementing two sets of single-polarization COIL full-field transmitters. More particularly, for a single master laser 3702, transmitter 3700 utilizes two COIL subsystems 3508, FIG. 35, to modulate the respective I/Q data streams for each of an X-polarization and a Y-polarization. In the example depicted in FIG. 37, the laser signal from master laser 3702 is distributed to a first COIL subsystem 3508(X) and a second COIL subsystem 3508(Y) by a preliminary coupler 3704. First COIL subsystem 3508(X) then synthesizes a single-polarization optical signal 3706(X) with respect to an X-polarization/I-data electrical source 3708(XI) and an X-polarization/Q-data electrical source 3708(XQ) according to the principles described above with respect to FIG. 35. Similarly, second COIL subsystem 3508(Y) synthesizes a single-polarization optical signal 3706(Y) with respect to a Y-polarization/I-data electrical source 3708(Y) and a Y-polarization/Q-data electrical source 3708(YQ). Single-polarization optical signals 3706(X), 3706(Y) are then combined by a PBC 3710 to produce a dual-polarization modulated optical output signal 3712. In the example depicted in FIG. 37, PBC 3710 is illustrated to be integrated within transmitter 3700. In some embodiments, PBC 3710 may be a separate and discrete component from transmitter 3700.

Figure 38:
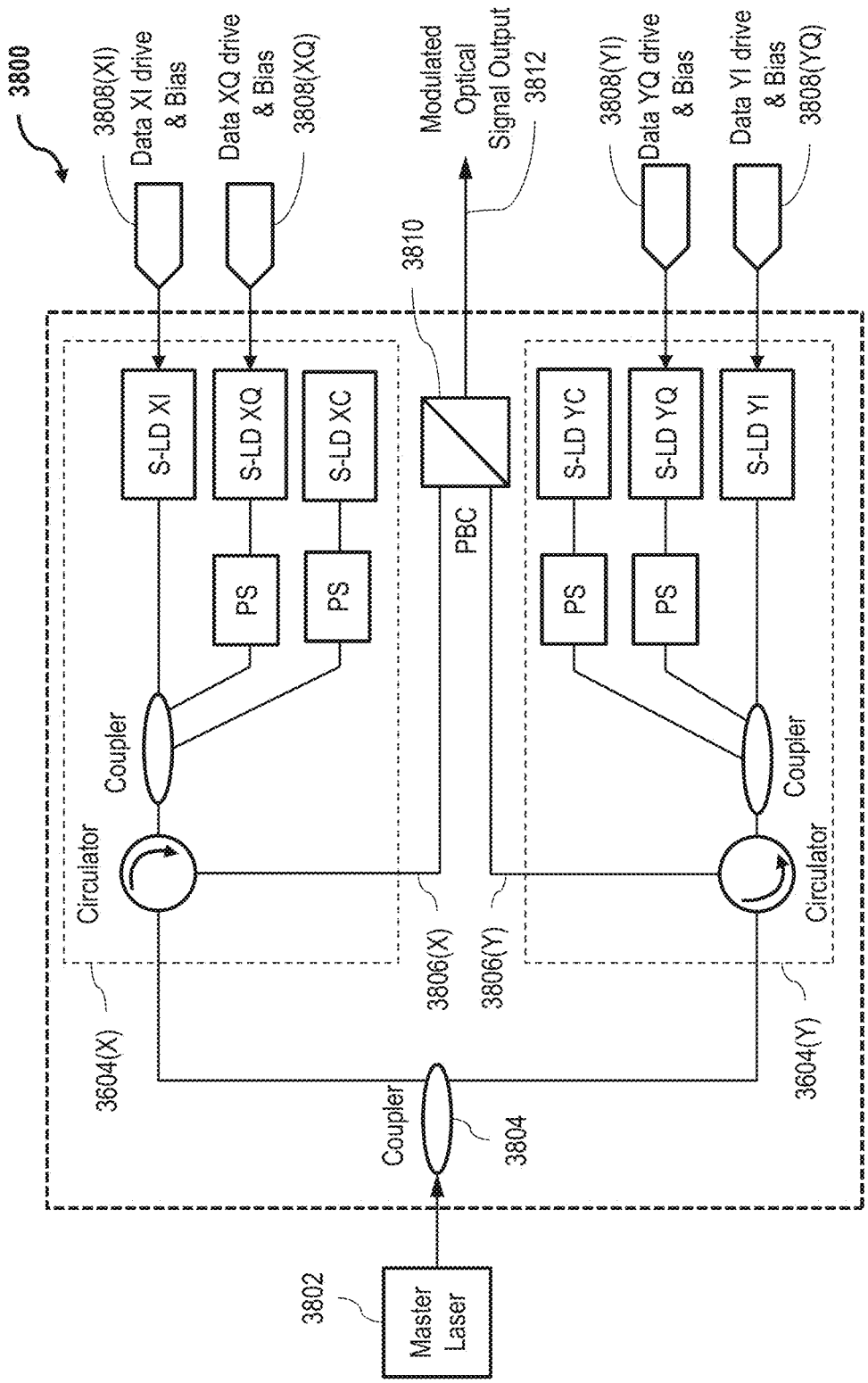
FIG. 38 is a schematic illustration of an alternative polarization multiplexer transmitter implementing dual-polarization coherent optical injection locked full-field modulation.

FIG. 38 is a schematic illustration of an alternative polarization multiplexer 3800 transmitter implementing two sets of single-polarization COIL full-field transmitters. More particularly, for a single master laser 3802, transmitter 3800 utilizes two COIL subsystems 3604, FIG. 36, to modulate the respective I/Q data streams for each X/Y polarization. In the example depicted in FIG. 38, the laser signal from master laser 3802 is distributed to a first COIL subsystem 3604(X) and a second COIL subsystem 3604(Y) by a preliminary coupler 3804. First COIL subsystem 3604(X) synthesizes a single-polarization optical signal 3806(X) with respect to an XI data source 3808(XI) and an XQ data source 3808(XQ), and second COIL subsystem 3604(Y) synthesizes a single-polarization optical signal 3806(Y) with respect to a YI data source 3808(YI) and a YQ data source 3808(YQ). Single-polarization optical signals 3806(X), 3806(Y) are then combined by a PBC 3810 to produce a dual-polarization modulated optical output signal 3812.

The full-field COIL transmitter techniques described above for I/Q modulation are also applicable to amplitude and phase modulation by implementing an external phase modulator, as described further below with respect to FIGS. 39 and 40.

Figure 39:
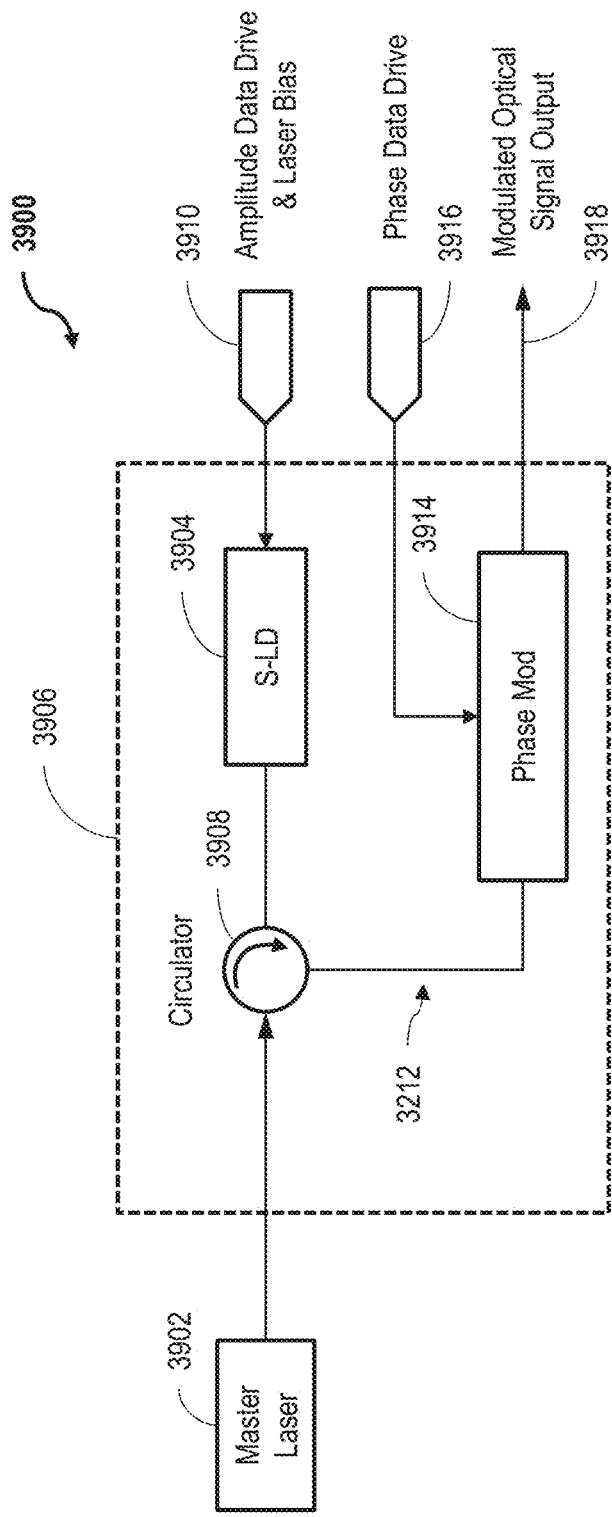
FIG. 39 is a schematic illustration of an exemplary single-polarization coherent optical injection locked transmitter implementing full-field modulation based on amplitude and phase modulations.

FIG. 39 is a schematic illustration of an exemplary single-polarization COIL transmitter 3900 implementing full-field modulation based on amplitude and phase modulation. In an exemplary embodiment, FIG. 39 depicts an implementation process flow of transmitter 3900 for single-polarization injection-locking, with full-field modulation, based on amplitude and phase, using a high-quality master laser 3902 to injection-lock a low-cost slave laser 3904 (e.g., FP, VCSEL, etc.) of a COIL subsystem 3906. Subsystem 3906 further includes an optical circulator 3908 for routing laser signal of the master laser 3902 into the resonance cavity of slave laser 3904, which may thus be injection-locked and directly-modulated to carry amplitude information from an amplitude data source 3910. Similar to the embodiments described above, optical circulator 3908 additionally functions to route a resultant amplitude-modulated optical signal 3912 from slave laser 3904 out of transmitter 3900.

Different though, from the above embodiments, amplitude-modulated optical signal 3912 is first modulated by a phase modulator 3914 in communication with a phase a data source 3916 (e.g., polar coordinates), and then output as a full-field modulated optical signal 3918. Accordingly, through utilization of amplitude modulation from slave laser 3904 and phase modulation from phase modulator 3914, transmitter 3900 advantageously achieves full-field optical transmission. The configuration of transmitter 3900 thus represents a trade-off with respect to the full-field optical transmission principles described above with respect to FIGS. 35 and 36, in that transmitter 3900 utilizes an external phase modulator (e.g., phase modulator 3914), but only requires one slave laser (e.g., slave laser 3904), and avoids the need for optical couplers and phase shifters. Additionally, transmitter 3900 is not require bias control for phase modulator 3914, and because the insertion loss of phase modulator 3914 is lower than the insertion loss using an MZM (e.g., external modulator 3204, FIG. 32), a higher output power may be achieved over that using a conventional external I/Q modulator.

Figure 40:
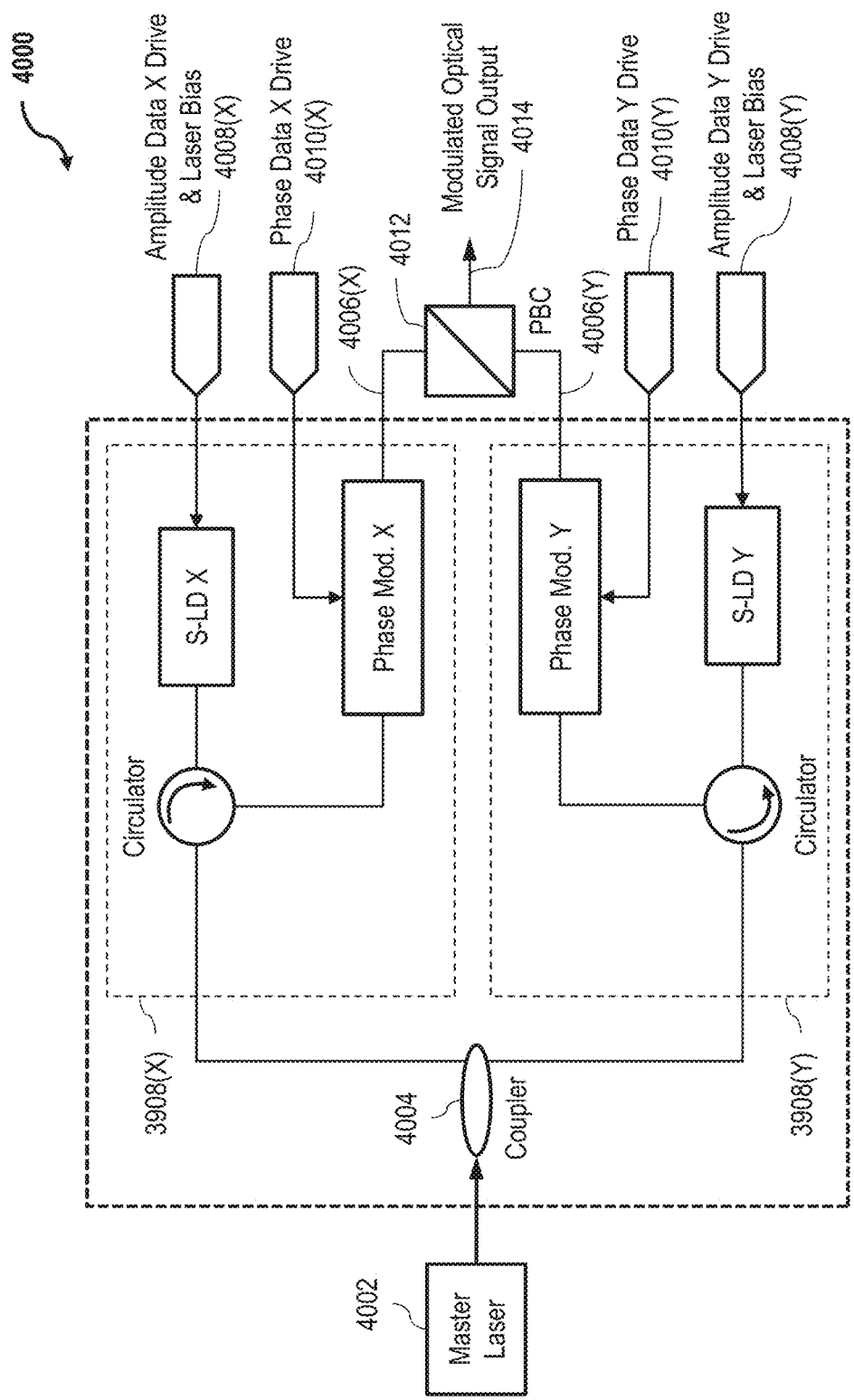
FIG. 40 is a schematic illustration of an exemplary dual-polarization coherent optical injection locked transmitter implementing full-field modulation based on amplitude and phase modulations.

FIG. 40 is a schematic illustration of an exemplary dual-polarization COIL transmitter 4000 implementing full-field modulation based on amplitude and phase modulations. More particularly, for a single master laser 4002, transmitter 4000 utilizes two amplitude/phase COIL subsystems 3906, FIG. 39, to modulate the respective amplitude and phase data streams for each of an X-polarization and a Y-polarization. In the example depicted in FIG. 40, the laser signal from master laser 1002 is distributed to a first COIL subsystem 3906(X) and a second COIL subsystem 3906(Y) by a preliminary coupler 4004. First COIL subsystem 3906(X) then synthesizes a single-polarization optical signal 4006(X) from a first amplitude-data source 4008(X) and a first phase-data source 4010(X) of the X-polarization, and second COIL subsystem 3906(Y) synthesizes a single-polarization optical signal 4006(Y) from a second amplitude-data source 4008(Y) and a second phase-data source 4010(Y) of the Y-polarization. Optical signals 4006(X), 4006(Y) are then combined by a PBC 4012 to produce a dual-polarization modulated optical output signal 4014.

In the embodiments described above, networking of multiple injection-locked transmitters is an important consideration. The embodiments described above with respect to FIGS. 35-40 represent still further advancements over conventional transmission techniques, in that these embodiments may be fully implemented with different network types, such as P2P or P2MP links. The present COIL techniques advantageously enable the multiple transmitters to operate either locally or remotely, and for both single-wavelength source and multi-wavelength source configurations, as described further below with respect to a FIGS. 41-43. For ease of explanation, references to full-field transmitters in the description of FIGS. 41-43 may include any one of the embodiments described above with respect to FIGS. 35-40, or a combination of more than one of the embodiments described therein.

Figure 41:
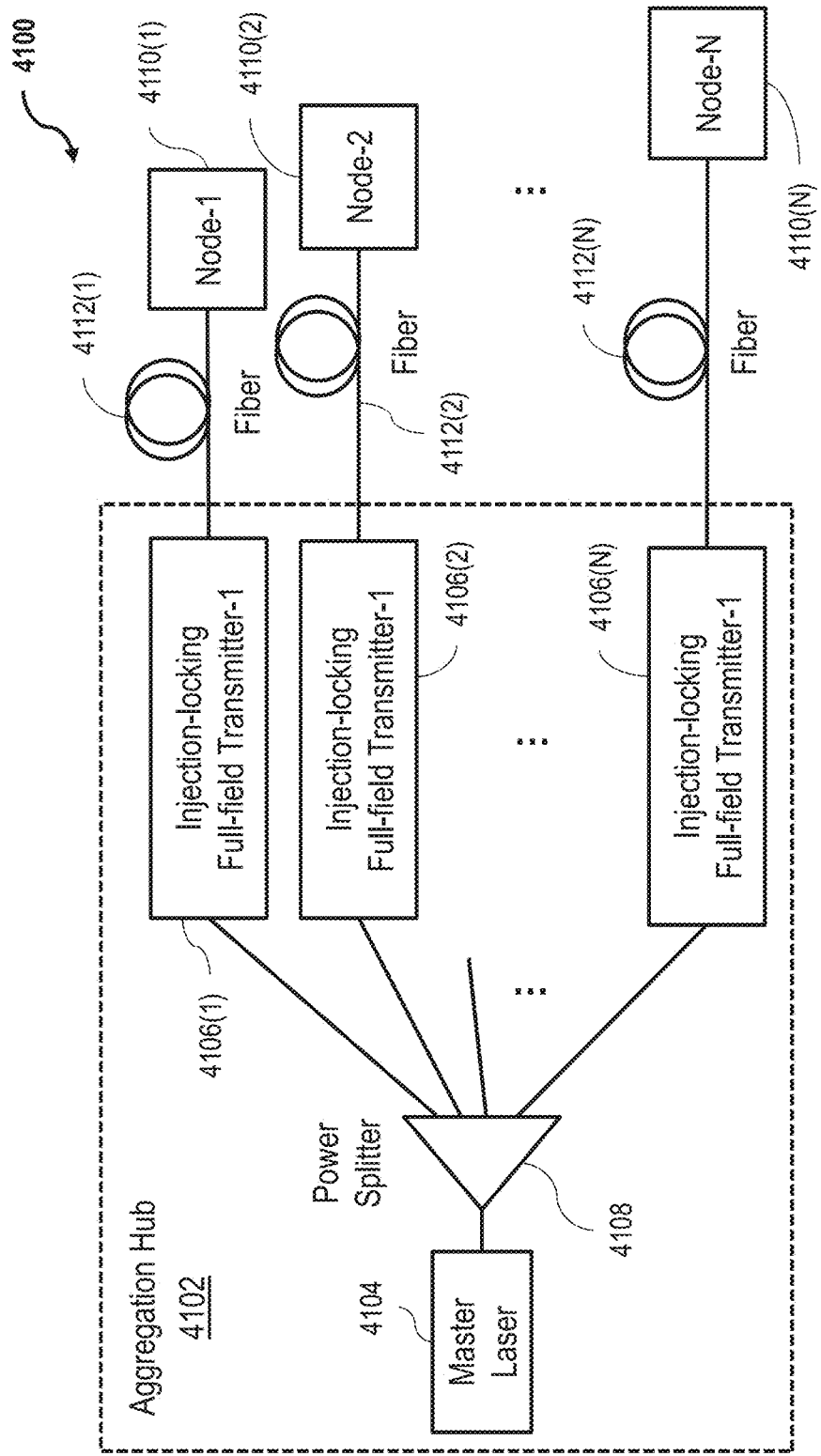
FIG. 41 is a schematic illustration of an exemplary optical network.

FIG. 41 is a schematic illustration of an exemplary optical network 4100. In an exemplary embodiment, network 4100 includes an aggregation hub 4102 having a single-wavelength master laser source 4104 that is distributed to a plurality (i.e., 1-N) of full-field COIL transmitters 4106 through a power splitter 4108 configured to split the high-quality signal from master laser source 4104 for injection into the slave lasers (not shown in FIG. 41) of the respective full-field transmitters 4106. In an embodiment, each of full-field transmitters 4106 may operably connect to at least one different remote node 4110 over its own respective fiber segment 4112. According to the exemplary configuration of network 4100, single-wavelength master laser source 4104 is enabled to injection-lock multiple full-field transmitters 4106, which significantly reduces the overall system cost.

Figure 42:
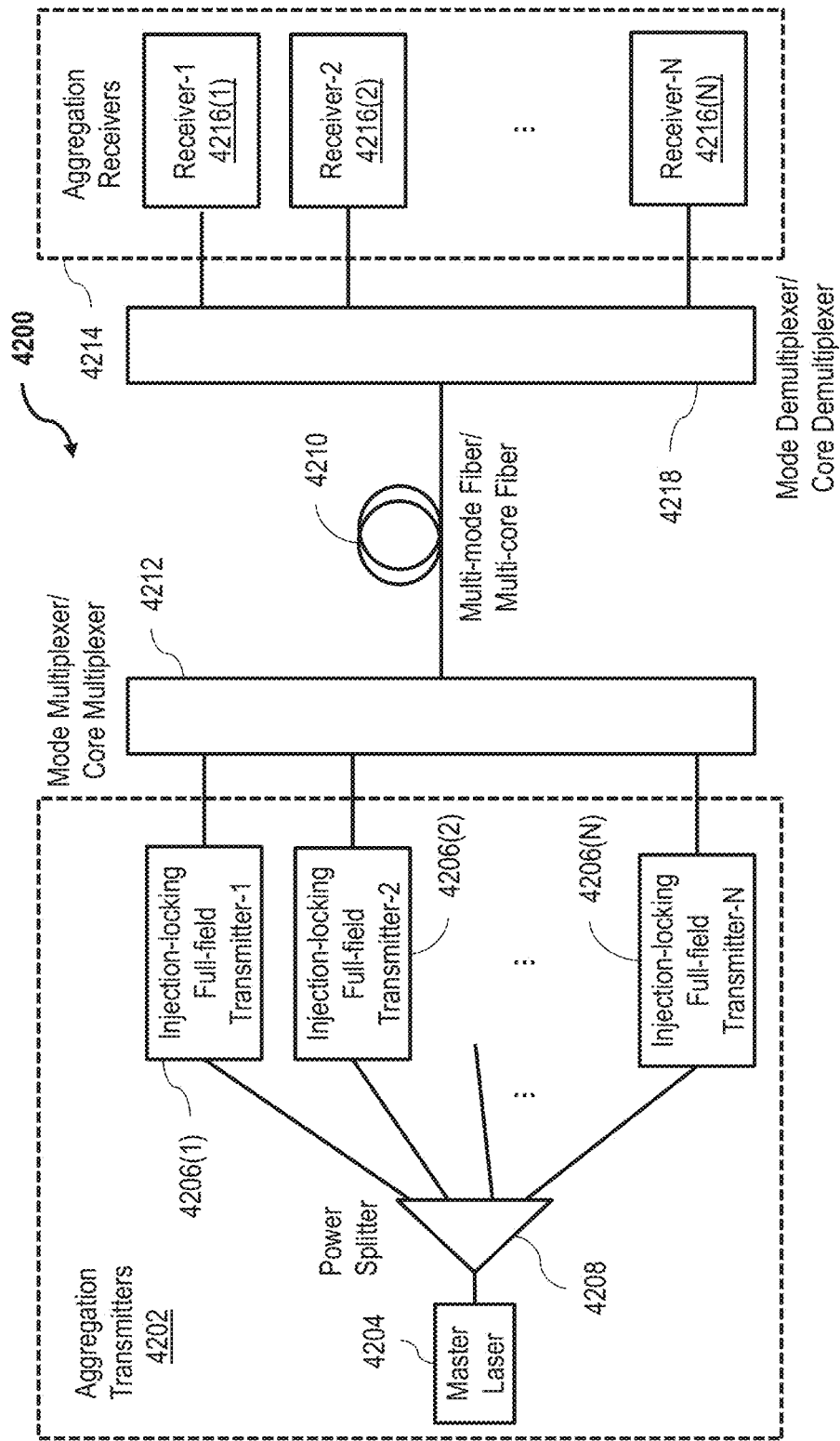
FIG. 42 is a schematic illustration of an exemplary optical network.

FIG. 42 is a schematic illustration of an exemplary optical network 4200. Network 4200 is similar to network 4100, FIG. 41, and includes an aggregation hub 4202 having a single-wavelength master laser source 4204 that is distributed to a plurality (i.e., 1-N) of full-field COIL transmitters 4206 through a power splitter 4208 that splits the high-quality signal from master laser source 4204 for injection into the respective slave lasers of full-field transmitters 4206. Different from network 4100 though, network 4200 is implemented for a single-fiber P2P link using a multi-core or multimode fiber 4210.

Accordingly, at the transmitter-side of fiber 4210, each of full-field transmitters 4206 (i.e., including respective slave lasers injection-locked by single-wavelength master laser 4204) is multiplexed onto fiber 4210 as a single aggregate optical signal by a multiplexer 4212 for delivery to a receiver aggregation 4214, which includes a plurality (i.e. 1-N) of optical receivers 4216, through a demultiplexer 4218. In some embodiments, multiplexer 4212 is a mode multiplexer, in which case fiber 4210 may be a multi-mode fiber, and demultiplexer 4218 may be a mode demultiplexer. In other embodiments, multiplexer 4212 is a core multiplexer, in which case fiber 4210 may be a multi-core fiber, and demultiplexer 4218 may be a core demultiplexer.

Figure 43:
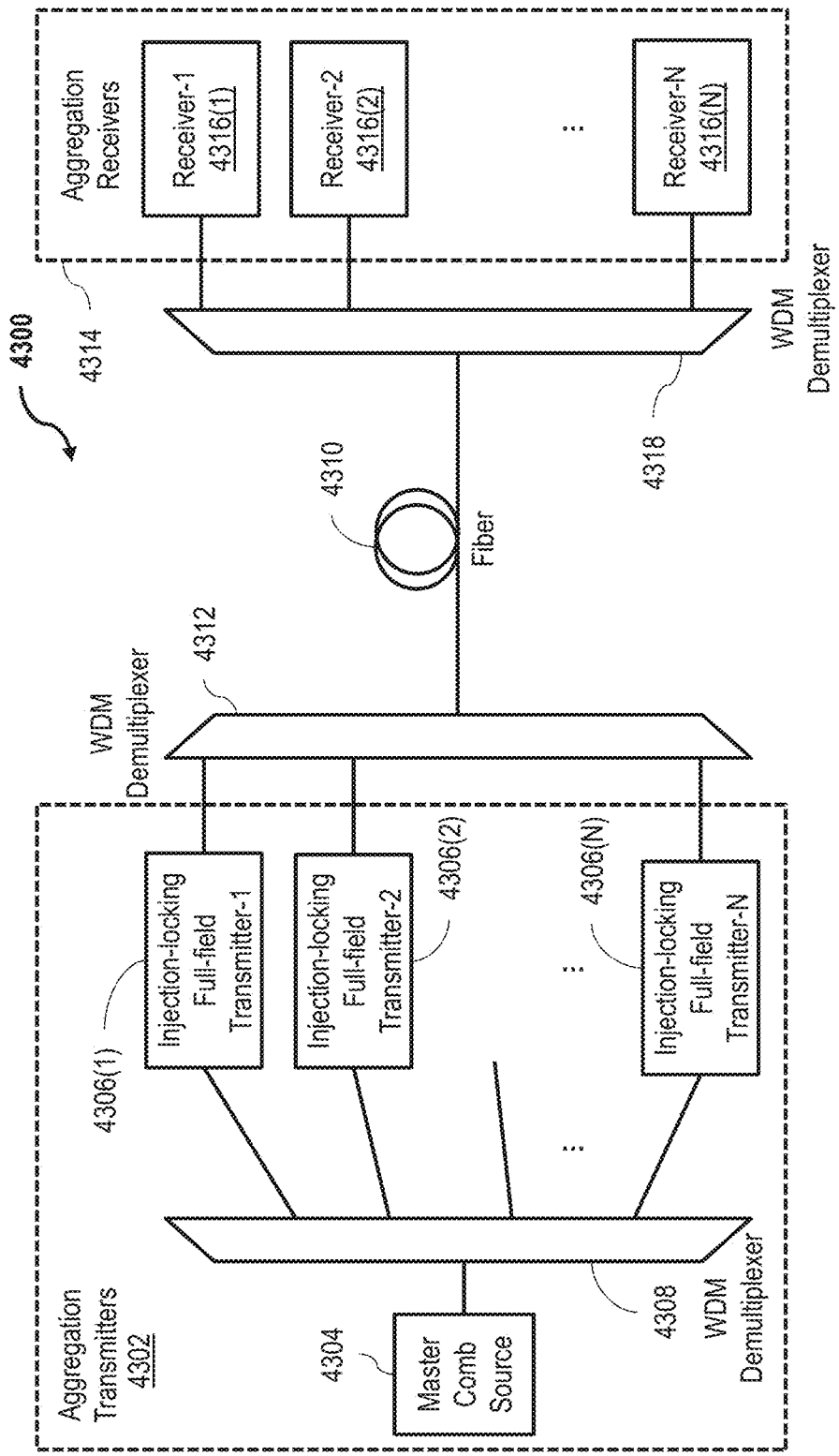
FIG. 43 is a schematic illustration of an alternative optical network.

FIG. 43 is a schematic illustration of an alternative optical network 4300. Network 4300 is similar to network 4200, FIG. 42, and includes an aggregation hub 4302. Network 4300 differs from network 4200 though, in that hub 4302 includes a multi-wavelength master laser source 4304 (e.g., comb source) distributed to 1-N full-field COIL transmitters 4306 through a WDM demultiplexer 4308 that separates the different wavelengths of master laser source 4304 for injection into the respective slave lasers of full-field transmitters 4306. Network 4300 is therefore also particularly useful as a P2P single-fiber WDM network configured to utilize a single optical transport medium 4310 (e.g., an optical fiber).

Accordingly, at the transmitter-side of fiber 4310, each of full-field transmitters 4306 are injection-locked to at least one wavelength of the multi-wavelength comb source of master laser source 4304, and then multiplexed onto fiber 4310 as an aggregate optical signal by a WDM multiplexer 4312 for delivery to a receiver aggregation 4314 of 1-N optical receivers 4316 through a WDM demultiplexer 4318. That is, according to the embodiment depicted in FIG. 43, each of full-field transmitters 4306 may transmit on different wavelengths, multiplex these different wavelengths using WDM multiplexer 4312, and transmit the resultant aggregated signal over single fiber 4310, where it may be demultiplexed by WDM demultiplexer 4318 prior to detection by the respective different receivers 4316.

According to the preceding embodiments, innovative systems and methods are provided for injection-locking full-field transmitters that are fully enabled to incorporate new technologies that meet the unique requirements of the access network environment, but through cost-efficient approaches. For example, using significantly low-cost lasers, the present embodiments are able to simultaneously achieve both laser injection-locking and full-field signal modulation, such as m-QAM or m-PSK. Furthermore, as described above, full-field signal modulation may be successfully achieved through either I/Q modulation or amplitude/phase modulation. Additionally, the present systems and methods are fully adaptable from single-polarization configurations to dual-polarization configurations without complex structural modifications to the transmitters or the networks in which they are deployed.

The present systems and methods are still further fully scalable for system architectures that utilize multiple injection-locked transmitters, whether for single-wavelength source use cases or for multi-wavelength source use cases, and for both P2P and P2MP networks. According to the techniques described above, a single high-quality master laser may be efficiently cloned and modulated by many low-cost slave lasers, whereby these slave lasers will realize the same high-quality performance, and carry the same advanced modulation formats, of the high-quality source. Accordingly, in comparison with conventional networks, the overall cost of the present network is greatly reduced by avoiding the need to deploy high-quality, high-cost master lasers and modulators in each coherent transmitter/transceiver.

Phase Domain Signal Modulation and Equalization

As described above, coherent technologies are being increasingly deployed for ultra-high-speed long-haul backbone transport systems/links and metro networks due to recent DSP advancements, advanced signal formats, polarization multiplexing, and data rate/spectrum efficiency improvements. There is a clear desire in the industry to further this trend in the access network environment, which is considered to be the most effective future-proof approach for optical access networks in brown and green field deployments. This need is felt particularly in the cable access environment, where coherent optics technologies enable operators to best leverage existing fiber infrastructures for the present exponential growth in capacity and services.

Introduction of digital coherent technologies into optical access networks has presented several engineering challenges, because the access network environment is a significantly different environment than the long-haul and metro environments, particularly with respect to the overall system cost that is dominated by optical and optic-electronic components, such as low-linewidth tunable lasers source and advanced modulators. The embodiments described above provide a number of innovative solutions for reducing the cost of lasers the access network, and also for simplifying the configuration of the various modulators. The embodiments described immediately above further provide novel phase modulation techniques using COIL technologies to realize both full-field optical transmitters, and which also further simplify the configuration and operation of the transmitters. These solutions are particularly advantageous over conventional MZM techniques for signal modulation, even with respect to some of the techniques described herein that implement I/Q signal modulation.

Such advantages include without limitation: (1) the total loss that is seen according to the present phase modulation techniques is significantly smaller than the loss experienced using a conventional MZM (i.e., >3 dB), or some I/Q modulation techniques (e.g., >6 dB), thereby greatly improving the present output power; (2) the cost of transmitter implementing the present phase modulator embodiments is expected to be significantly lower than the cost of implementing an MZM, since one MZM typically includes two phase modulators, and an also lower than the cost of implementing an I/Q modulator, since one I/Q modulator may include as many as phase modulators; (3) since the signal according to the present embodiments may be modulated in phase domain, the amplitude and intensity of the output signal, after phase modulation, will remain the same; and (4) the modulated signal, after passing through the present phase modulator, will achieve better performance under fiber nonlinearities.

Nevertheless, one particular challenge to implementation of phase domain signal modulation arises with respect to signal equalization. Conventional coherent DSP algorithms have not been able to successfully overcome phase domain inter-symbol-phase-interference in the phase-modulated signals. This interference problem though, is solved according to the following innovative systems, apparatuses, and methods for multi-level signal modulation and equalization in the phase domain for optical coherent communication systems. The present embodiments thus provide a complete end-to-end system configuration for signal modulation, coherent detection, and equalization for optically transmitted multi-level signals.

In an exemplary embodiment, a multi-level signal is mapped into the phase domain, and then modulated by a phase modulator on a particular polarization. Once modulated, the optical signal may then be coherently detected and processed by DSP to recovery. The following techniques for phase domain equalization to address inter-symbol-phase-interface may be advantageously implemented at either the transmitter-side or the receiver-side, whether as post-equalization and/or pre-equalization. More particularly, in some embodiments, post-equalization techniques are provided herein for receiver-side processing in the phase domain. In other embodiments, digital phase-domain pre-compensation techniques are provided for improving performance at the transmitter-side.

The following embodiments are therefore particularly useful to satisfy the unique requirements of the access environment, by providing architectural configurations of significantly lower complexity, and also by realizing a significantly reduced insertion loss and modulation loss for multi-level signals, in comparison with MZM- and I/Q modulator-based systems. As described further below, the sensitivity performance of multi-level signals modulated according to the present phase modulation embodiments is greatly enhanced in comparison with multi-level signals modulated in the amplitude or intensity domains.

Figure 44:
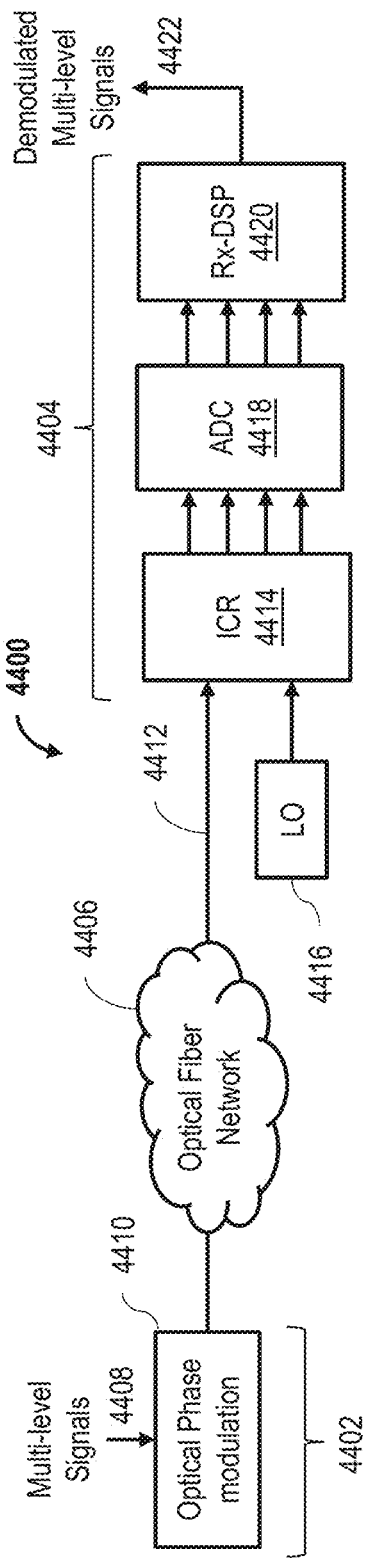
FIG. 44 is a schematic illustration of an exemplary optical coherent communication system for modulating, detecting, and equalizing coherent signals in the phase domain.

FIG. 44 is a schematic illustration of an exemplary optical coherent communication system 4400 for modulating, detecting, and equalizing coherent signals in the phase domain. In an embodiment, system 4400 includes a transmitter-side 4402 in operable communication with a receiver-side 4404 over an optical fiber network 4406. In an exemplary embodiment, transmitter-side 4402 is configured to modulate multi-level signals 4408 (e.g., PAM-N electrical signals) onto the phase of an optical carrier using an optical phase modulator 4410. A resulting optically modulated signal 4412, after transmission over optical fiber network 4406, may then be coherently detected by an integrated coherent receiver (ICR) 4414 in communication with an LO 4416 and receiver-side 4404. The coherently-detected signal from ICR 4414 is then subjected to conversion by an ADC 4418, and then equalized and demodulated by a receiver-side DSP 4420 into demodulated multi-level signals 4422. According to the present techniques, by modulating, detecting, and equalizing coherent optical signals in the phase domain, system 4400 provides a significant improvement over conventional multi-level optical communication systems that modulate multi-level signals in the amplitude or intensity domain.

Figure 45:
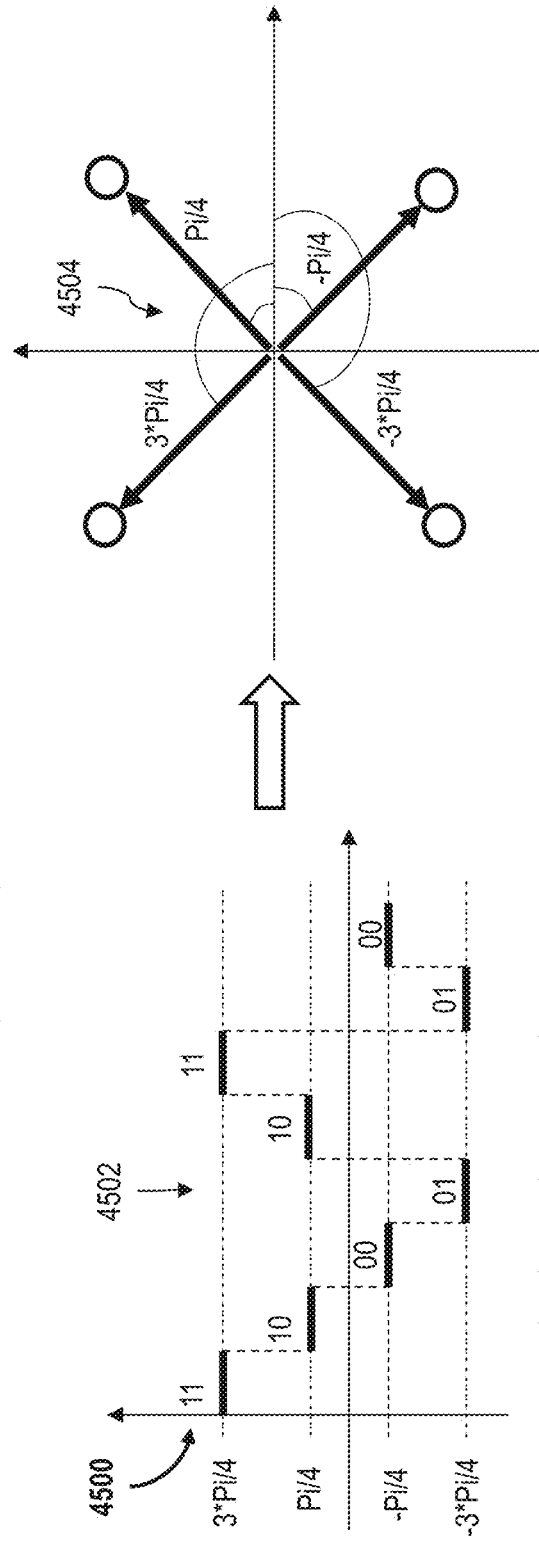
FIG. 45 is a graphical illustration depicting an operational principle a phase domain mapping module that may be implemented with one or more of the embodiments described herein to map a multi-level signal into a phase domain signal.

FIG. 45 is a graphical illustration depicting an operational principle a phase domain mapping module 4500 that may be implemented with one or more of the embodiments described herein to map a multi-level signal 4502 into a phase domain signal 4504. In some embodiments, module 4500 may represent a discrete hardware unit (e.g., having a processor and a memory). In other embodiments, module 4500 may be implemented through software programming or computer-executable instructions that may be executed by a processor of a relevant transmitter, receiver, transceiver, or other element of the particular communication network or system. In at least one embodiment, module 4500 is implemented through combination of dedicated hardware and software. For ease of illustration, and not in a limiting sense, the following examples are described with respect to multi-level signal 4502 being a 4-level PAM-4 signal. The person of ordinary skill in the art will understand, however, that other multi-level signals may be used with respect to the present embodiments, but without departing from the scope thereof.

In exemplary operation of phase domain mapping module 4500, input bit information (e.g., [1110000110 . . . ]) coded as PAM-4 symbols of multi-level signal 4502 by a symbol coding unit 4506. Once encoded, Then, the PAM-4 symbols of multi-level signal 4502 may be mapped to specific phase values of phase domain signal 4504 by a phase domain signal mapping unit 4508. In the exemplary embodiment depicted in FIG. 45, the PAM-4 symbols of signal 4502 are mapped as phases of [+3pi/4, +pi/4, −pi/4, −3pi/4]. Accordingly, the relevant optical carrier in this example will be modulated as a corresponding 4PSK (QPSK) signal. That is, the drive signal for phase modulation will have four levels, which is mapped as four phases of 4PSK optical signal 4504.

In a similar manner, the operational principle of module 4500 may be effectively applied for any N-level signal. For example, after PAM-N mapping or coding in the electrical domain of an N-level signal $4502_N$ by symbol coding unit 4506, the optical carrier may be modulated as an N-PSK signal $4504_N$ by phase domain signal mapping unit 4508. That is, the corresponding drive signal for phase modulation by phase domain signal mapping unit 4508 will have N levels, and therefore be mapped as N phases of N-PSK optical signal $4504_N$. Module 4500 may then be operable for a respective phase modulator on the transmitter-side (e.g., phase modulator 4410, FIG. 44) or demodulator on the receiver-side (e.g., DSP 4420, FIG. 44).

FIG. 46A is a schematic illustration of an exemplary single-polarization transmitter 4600 for multi-level signal modulation in the phase domain. More particularly, the embodiment depicted in FIG. 46A illustrates a process flow for transmitter 4600 implementing phase domain mapping module 4500, FIG. 45, with an external phase modulation subsystem 4602. In an embodiment, subsystem 4602 includes a laser 4604 and a phase modulator 4606 configured to emit a phase domain modulated light-wave optical signal 4608. In some embodiments, laser 4604 and phase modulator 4606 are separate and discrete components from one another. In other embodiments, laser 4604 and phase modulator 4606 are integrated together as unitary phase-modulated laser.

In exemplary operation of transmitter 4600, input data is first encoded into multi-level signals (e.g., PAM-N signals $4502_N$) by multi-level signal coding unit 4506, and then mapped to corresponding phase values of optical signals (e.g., signals $4504_N$) in the phase domain by phase domain signal mapping unit 4508. As described above, the drive signal for phase modulation will have N levels, which is mapped as N phases of the resulting N-PSK optical signal $4504_N$. In practical implementation, the drive voltage may be determined by the voltage Vπ of phase modulator 4606, where Vπ is the required voltage for a π phase change of phase modulator 4606. Accordingly, in some embodiments, transmitter 4600 may optionally further include at least one electrical amplifier 4610 to boost the drive voltage of N-level signal $4504_N$ to meet the voltage requirement of Vπ.

FIG. 46B is a schematic illustration of an alternative single-polarization COIL transmitter 4612. In the embodiment depicted in FIG. 46B, transmitter 4612 implements phase domain mapping module 4500, FIG. 45, with a COIL phase modulation subsystem 4614, and may further include an optional amplifier 4616. In an exemplary embodiment, subsystem 4612 is similar to COIL subsystem 3906, FIG. 39, and is configured to receive a laser signal from an external master laser source 4618, and also includes an optical circulator 4620, a phase modulator 4622, and a slave laser 4624. Similar to COIL subsystem 3906, optical circulator 4620 routes the laser signal from master laser 4618 into a resonance cavity of injection-locked slave laser 4624, and which then also routes the resulting optical signal from slave laser 4624, which is externally modulated by phase modulator 4622 with the generated multi-level optical signals from module 4500.

In some use cases of amplifier 4600 or amplifier 4612, it may be additionally desirable to implement further DSP processing at the receiver-side (e.g., DSP 4420, FIG. 44), to address phase-domain inter-symbol-phase-interference (ISPI) that may result from a non-ideal frequency response of the respective transmitter (e.g., from limited bandwidth, or frequency fading of the signal generator and phase modulator thereof). Conventional coherent optical system DSP techniques, however, are incapable of resolving such distortion effects. An innovative receiver-side DSP solution though, for resolving ISPI, is described further below with respect to FIG. 47.

Figure 47:
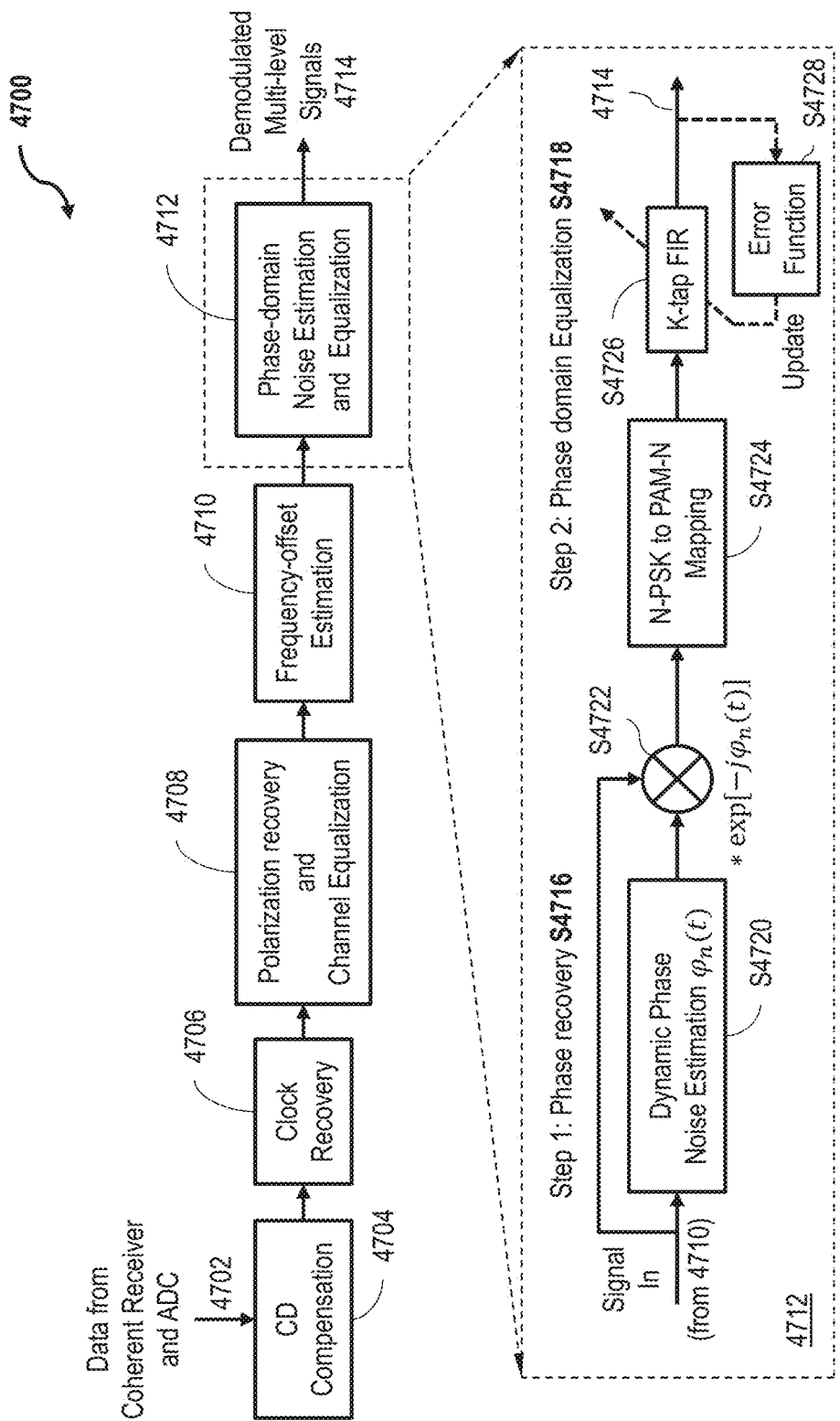
FIG. 47 is a schematic illustration of a phase domain equalization process performed at the receiver-side for post-equalization.

FIG. 47 is a schematic illustration of a phase domain equalization process 4700 performed at the receiver-side (e.g., receiver side 4404, FIG. 44) for post-equalization. In an exemplary embodiment, process 4700 is executed by a DSP (e.g., DSP 4420), which receives signal data 4702 from a coherent receiver and an ADC (e.g., ICR 4414 and ADC 4418, FIG. 44), and further processes signal data 4702 using one or more of a CD compensation unit 4704 a clock recovery unit 4706, a polarization recovery and channel equalization unit 4708, a frequency offset estimation unit 4710, and a phase domain noise estimation and equalization unit 4712, and then outputs modulated multi-level signals 4714.

In the exemplary embodiment, phase recovery is performed primarily at the end of processing, namely, by phase domain noise estimation and equalization unit 4712, after preliminary CD compensation, clock recovery, channel equalization, and/or frequency-offset estimation processing may have been performed. More specifically, unit 4712 implements process 4700 as into steps: (1) a phase recovery step S4716; and (2) a phase domain equalization step S4718.

In step S4716, phase recovery is performed to demodulate the multi-level signal. More particularly, phase recovery step S4716 includes a substep S4720, in which the dynamic phase noise caused by laser linewidth is estimated as $\varphi_n(t)$. In substep S4722 the estimated dynamic phase noise value is removed by multiplying (e.g., by a multiplication unit) by the inverse value as $\exp[-j\varphi_n(t)]$. In some embodiments of process 4700, the phase noise estimation of substep S4720 may be realized according through use of conventional phase noise estimation algorithms, such as training-based phase estimation algorithms, Viterbi-viterbi algorithms, and blind phase search (BPS) algorithms.

After the dynamic phase noise value is removed, phase domain equalization step S4718 of process 4700 is enabled to execute a mapping substep S4724, in which the signal optical phase may be mapped back to multi-level signals, and in substep S4726, a time-domain adaptive equalization is applied to the obtained PAM-N signal (in this example). Which is then equalized by a K-tap finite impulse response (FIR) digital filter to output the modulated multi-level signals 4714. In step S4728, a tap value may be updated by an error function after equalization. In some embodiments of step S4728, updating may be performed using such common adaptive equalization algorithms as least-mean-square (LMS), and recursive least squares (RLS) for filter tap value updating. In an alternative embodiment of step S4726, other adaptive equalization configurations be implemented, such as a Decision-Feedback Equalizer (DFE) for PAM-N signal equalization. In at least one embodiment, in order to hasten the convergence and tracking speed of the adaptive equalizer, a training sequence may be used for error function calculation.

In other cases, it may be desirable to perform pre-equalization at the transmitter-side (e.g., transmitter-side 4402, FIG. 44). An exemplary solution for such transmitter-based pre-equalization techniques is described below with respect to FIG. 48.

Figure 48:
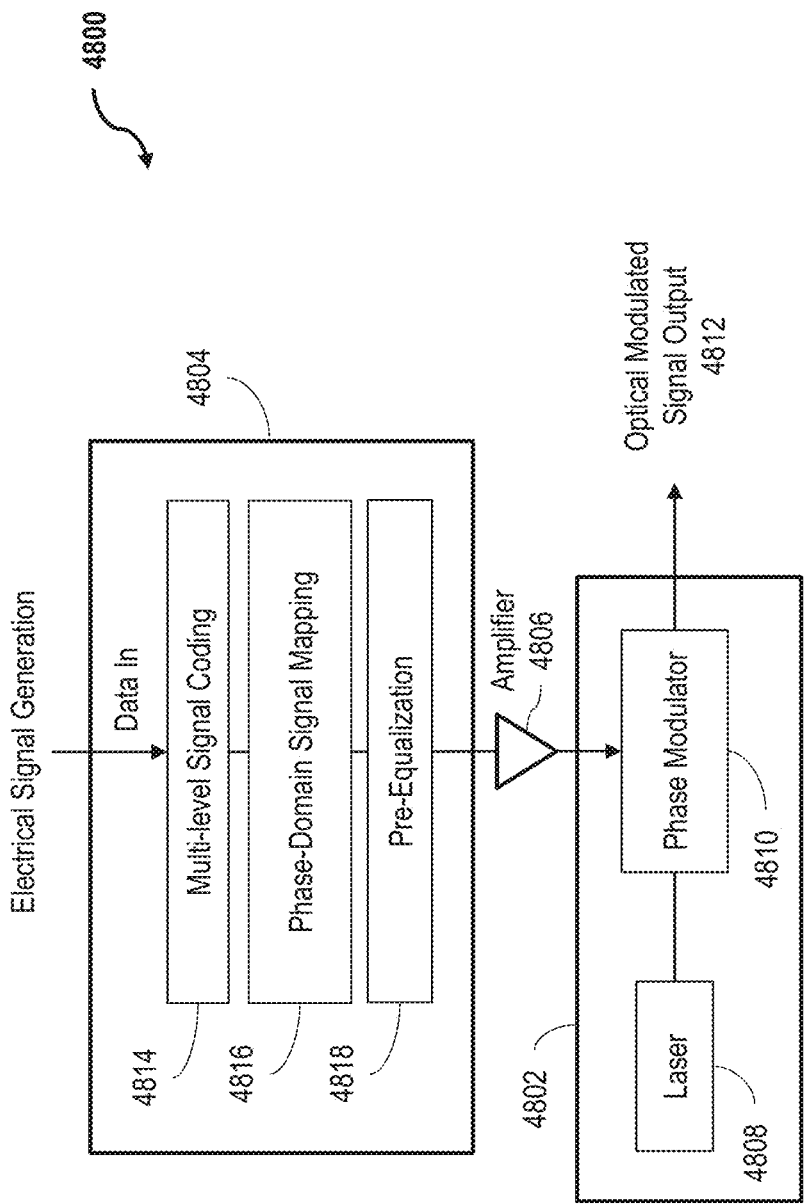
FIG. 48 is a schematic illustration of a phase domain equalization process performed at the transmitter-side for pre-equalization.

FIG. 48 is a schematic illustration of a phase domain modulated transmitter 4800 configured to implement pre-equalization at the transmitter-side (e.g., transmitter-side 4402, FIG. 44) for pre-equalization prior to phase modulation. That is, in an embodiment, transmitter 4800 is substantially similar to transmitter 4600, FIG. 46A, and similarly illustrates a process flow for transmitter 4800 having an external phase modulation subsystem 4802 implementing a phase domain mapping module 4804, and an external amplifier 4806 disposed therebetween. Similar to external phase modulation subsystem 4602, subsystem 4802 includes a laser 4808 and a separate or integral phase modulator 4810 configured to emit a phase domain modulated light-wave optical signal 4812.

Figure 46:
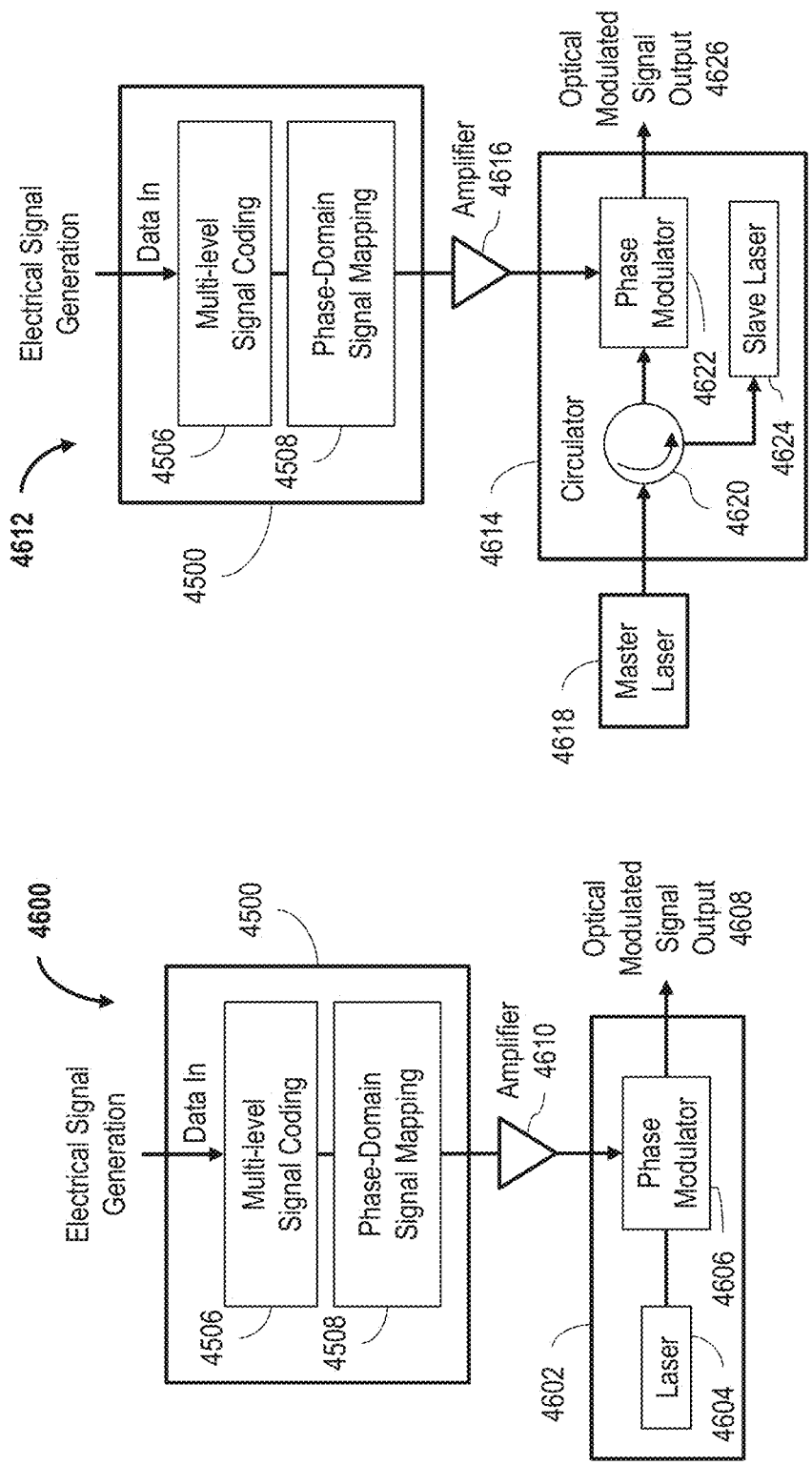
FIG. 46A is a schematic illustration of an exemplary single-polarization transmitter for multi-level signal modulation in the phase domain.
FIG. 46B is a schematic illustration of an alternative single-polarization coherent optical injection locking transmitter.

Exemplary operation of transmitter 4800, is therefore substantially performed in accordance with the operation of transmitter 4600, FIG. 46. However, phase domain mapping module 4804 is different from phase domain mapping module 4500, in that module 4804 includes an additional pre-equalization unit 4818 disposed between an output of phase domain signal mapping unit 4816, and before communication with phase modulator 4810. That is, in operation of transmitter 4800, the phase-domain channel response may be obtained at the receiver-side (e.g., receiver side 4404, FIG. 44), since the channel response is generally considered to be quasi-static for the relevant optical channel, it may also be applied at the transmitter-side (e.g., transmitter-side 4402, FIG. 44).

Transmitter 4800 therefore represents an exemplary implementation of transmitter 4600, FIG. 46A, but with enhanced capabilities for pre-equalization in phase domain mapping module 4804 through utilization of pre-equalization unit 4818. That is, pre-equalization unit 4818 functions to add a pre-equalization process after phase domain signal mapping by phase domain signal mapping unit 4816. Through this advantageous configuration, the relevant signal transmitter-side pre-equalization may be accomplished in either the time-domain or in the frequency-domain, and the relevant receiver-side response may then be obtained through the post-phase domain equalization techniques described above with respect to FIG. 47. For example, the K-tap filter of step S4726, FIG. 47, after convergence, may also be used for transmitter-side pre-equalization. Because the channel response may also be estimated by the K-tap filter, the frequency-domain pre-equalization may therefore also be applied based on the frequency response of the receiver-side K-tap filter.

Figure 49:
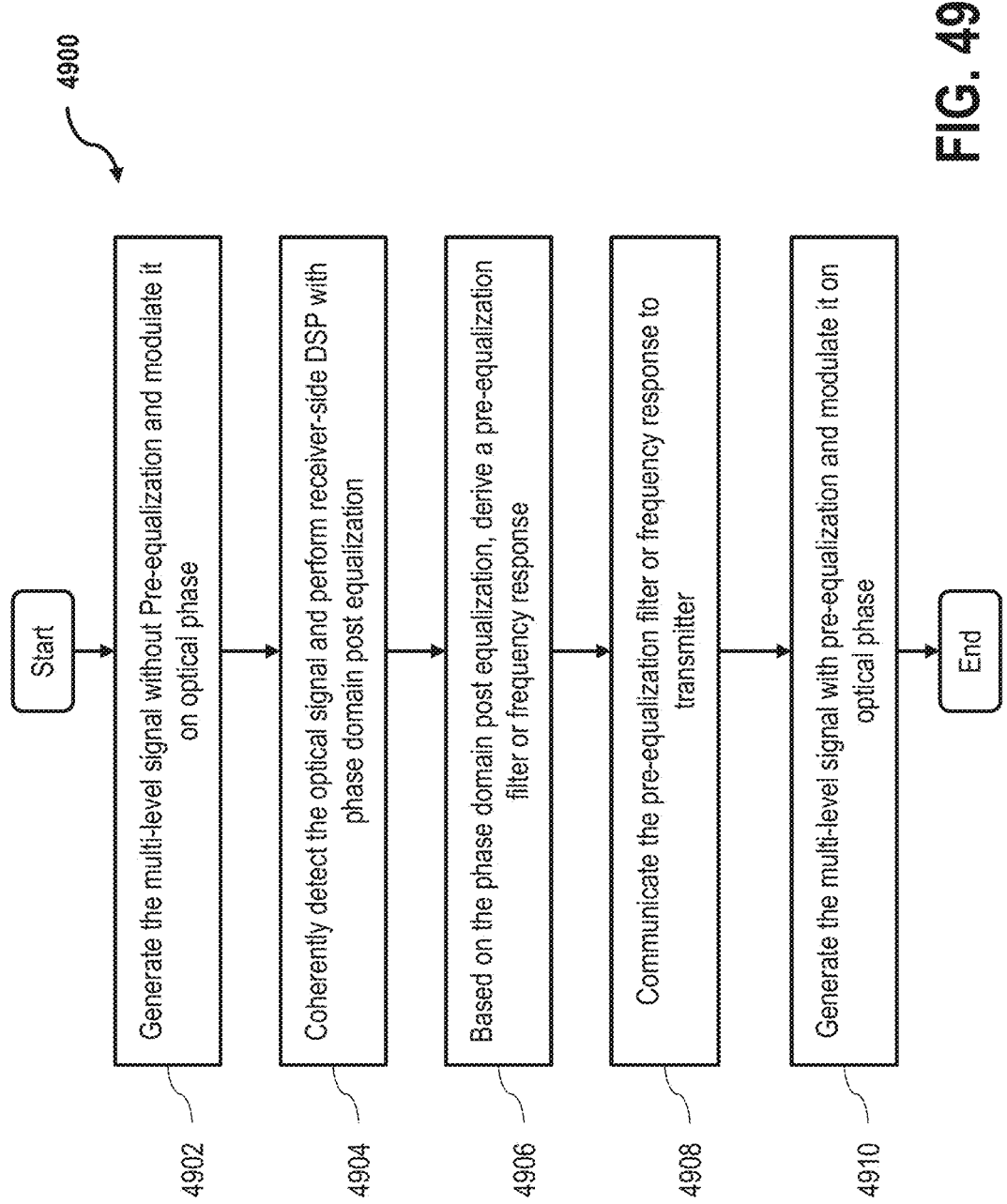
FIG. 49 is a flow chart diagram of an exemplary pre-equalization process based on receiver-side channel estimation.

FIG. 49 is a flow chart diagram of an exemplary pre-equalization process 4900 based on receiver-side channel estimation. In an exemplary embodiment, process 4900 represents an exemplary technique for implementing pre-equalization at the transmitter-side (e.g. transmitter side 4402, FIG. 44) using channel estimates on the receiver-side (e.g., receiver-side 4404, FIG. 44), and is fully adaptable to one or more of the embodiments described herein. Except where described to the contrary, individual steps of process 4900 may be performed in the order described, a different order, and/or two or more of the several steps may be performed simultaneously.

Process 4900 begins at step 4902, in which a multi-level signal is generated without pre-equalization, and then is modulated onto an optical phase. In an exemplary embodiment of step 4902, the generated multi-level signal is further mapped into the phase domain without pre-equalization and modulated onto the phase of optical carrier. In step 4904, the relevant receiver coherently detects the signal and performs DSP, including application of phase domain post-equalization. In step 4906, a pre-equalization filter or frequency response may be derived based on the K-tap adaptive filter of the phase-domain post equalization (e.g., in the receiver DSP). In step 4908, the receiver communicates the derived pre-equalization filter or frequency response back to the transmitter to perform pre-equalization. In step 4910, the transmitter generates the multi-level signal with pre-equalization according to the techniques described above, and modulates the pre-equalized multi-level signal onto the optical phase.

Process 4900 may thus be equally implemented with respect to the general transmitter configuration depicted in FIG. 46A, or for the particular COIL subsystem-based transmitter configuration depicted in FIGS. 46B and 48. It may be further noted here that even after the transmitter has performed phase-domain pre-equalization, residual ISPI may still be present in system. In such circumstances, the present phase domain post-equalization techniques may be performed together with pre-equalization, added as an extra step or an extra unit, to one or both of modules 4500, FIG. 45, and 4804, FIG. 48

Through various real-world testing simulations proof of the above-described concepts was verified by the present inventors. In one test example, the performance of a 12.5 GBaud polarization-multiplexed PAM-4 signal was evaluated, since the PAM-4 signal may be deemed equivalent to a 12.5 GBaud polarization multiplexed QPSK signal after phase domain modulation. Verification of these principles, including phase domain multilevel signal modulation and post-equalization with coherent detection, is described below with respect to FIGS. 50A-F.

FIGS. 50A-F are graphical illustrations depicting signal results 5000, 5002, 5004, 5006, 5008, 5010, respectively, of receiver-side DSP (e.g., receiver-side DSP 4420, FIG. 44). More particularly, FIGS. 50A-F depict results of a modulated optical signal at several different stages of receiver-side DSP processing. That is, FIG. 50A depicts a phase plot 5000 of the optical signal after frequency-offset estimation (e.g., by frequency offset estimation unit 4710, FIG. 47). FIG. 50B depicts a plot 5002 of the estimated optical signal phase noise $\varphi_n(t)$ (e.g., by phase domain noise estimation and equalization unit 4712). FIG. 50C depicts a QPSK signal constellation 5004 without phase domain equalization. FIG. 50D depicts a corresponding phase counterpart 5006 of QPSK signal constellation 5004, FIG. 50C, mapped back to PAM-4 signals (e.g., in step S4724 of unit 4712). FIG. 50E depicts equalized PAM-4 signals 5008 after phase domain post-equalization (e.g., by unit 4712). FIG. 50F depicts a QPSK signal constellation 5010 after phase domain equalization has been performed.

Accordingly, despite the overt existence of ISPI in the case of large phase fluctuations in four QPSK phases, considerable improvements may nevertheless be readily seen through a simple comparison of the respective constellations of FIGS. 50C and 50F, and also through a simple comparison of FIGS. 50D and 50E.

Figure 51:
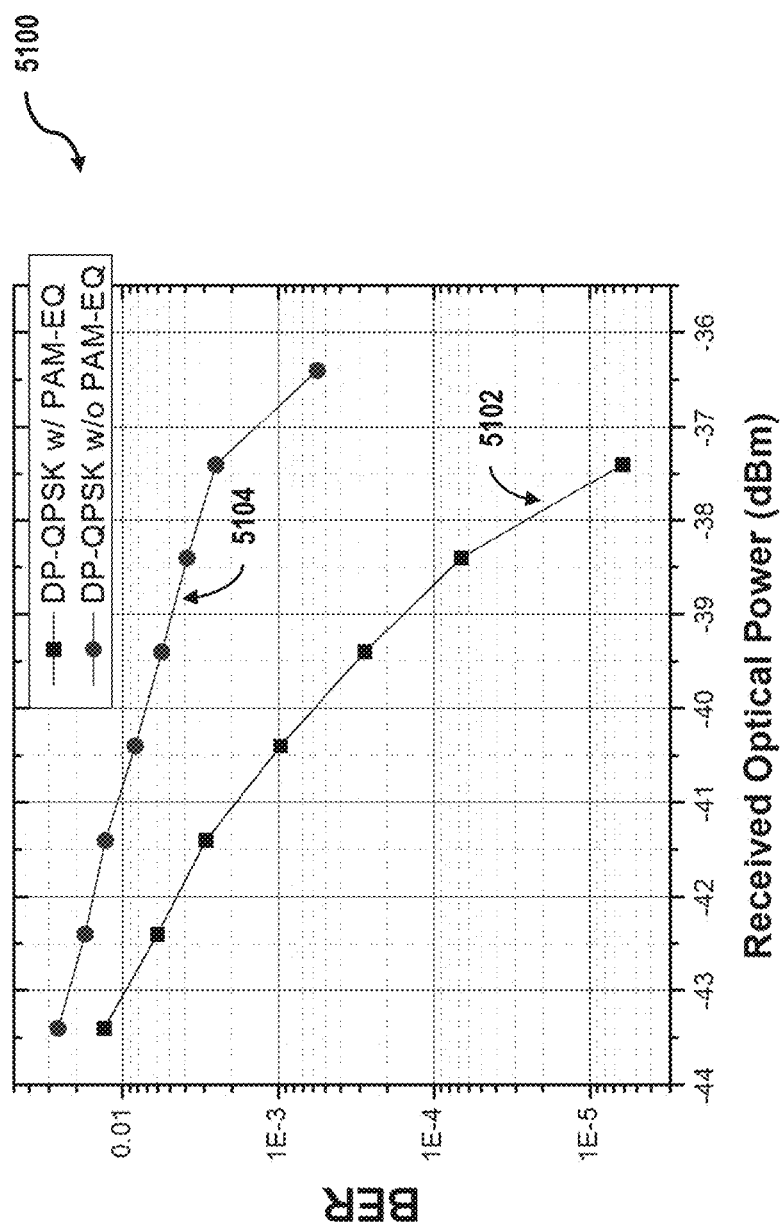
FIG. 51 is a graphical illustration depicting a comparative plot of bit error rate against received optical power.

FIG. 51 is a graphical illustration depicting a comparative plot 5100 of BER against received optical power. In an exemplary embodiment, plot 5100 represents a comparison of the BER against received power for a first sub-plot 5102 representing a PAM-4 (QPSK) signal after coherent detection, and with phase domain equalization, and for a second sub-plot 5104 representing a PAM-4 (QPSK) signal after coherent detection, but without phase domain equalization. As can be seen from the example depicted in FIG. 51, significant performance improvements are observable. For example, it may be seen that the required optical power may realize improvements of 3.5 dB at a BER value of 1E-3, greater than 3 dB at a BER value of 4.5E-3, and still greater than 2 dB at a BER threshold of 1E-2.

According to the innovative systems and methods provided herein, unique systems, apparatuses, and methods are provided for multi-level signal modulation and equalization in the phase domain for optical coherent communication networks, and particularly useful in the access network environment. The present embodiments further provide end-to-end system configurations for signal modulation, coherent detection, and equalization for multi-level signal transmissions. In exemplary embodiments, the multi-level signals are mapped into phase domain, and then modulated by phase modulator on a single polarization. The resulting optical signals may then be coherently detected, and then further processed by a DSP to recovery.

The present systems and methods further provide two individual types of phase-domain equalization methods for resolving the inter-symbol-phase-interface that plagues conventional phase modulation proposals for coherent optical access networks. The present techniques provide for both post-equalization at the receiver-side, and also pre-equalization at the transmitter-side. As further described above, these unique solutions provide yet a third, hybrid solution that uniquely implements a synergistic combination of both of the post-equalization and pre-equalization techniques described herein. That is, a unique post-equalization process is implemented in the receiver-side DSP to resolve ISPI problems downstream, and a digital phase-domain pre-compensation process may also be implemented to realize significant performance improvements at the transmitter-side.

Exemplary embodiments of optical communication systems and methods are described above in detail. The systems and methods of this disclosure though, are not limited to only the specific embodiments described herein, but rather, the components and/or steps of their implementation may be utilized independently and separately from other components and/or steps described herein. Additionally, the exemplary embodiments can be implemented and utilized in connection with other access networks utilizing fiber and coaxial transmission at the end user stage.

As described above, the DOCSIS protocol may be substituted with, or further include protocols such as EPON, RFoG, GPON, Satellite Internet Protocol, without departing from the scope of the embodiments herein. The present embodiments are therefore particularly useful for communication systems implementing a DOCSIS protocol, and may be advantageously configured for use in existing 4G and 5G networks, and also for new radio and future generation network implementations.

Although specific features of various embodiments of the disclosure may be shown in some drawings and not in others, such illustrative techniques are for convenience only. In accordance with the principles of the disclosure, a particular feature shown in a drawing may be referenced and/or claimed in combination with features of the other drawings.

Some embodiments involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a DSP device, and/or any other circuit or processor capable of executing the functions described herein. The processes described herein may be encoded as executable instructions embodied in a computer readable medium, including, without limitation, a storage device and/or a memory device. Such instructions, when executed by a processor, cause the processor to perform at least a portion of the methods described herein. The above examples are exemplary only, and thus are not intended to limit in any way the definition and/or meaning of the term "processor."

This written description uses examples to disclose the embodiments, including the best mode, and also enables a person skilled in the art to practice the embodiments, including the make and use of any devices or systems and the performance of any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A two-stage full-field optical transmitter for a coherent optical communications network, comprising:
  a transmitter input configured to receive an injected parent seed laser signal along a low linewidth frequency channel;
  a first child laser configured for coherent optical injection locking (COIL) with a center frequency of the parent laser signal; and
  a full-field modulator configured to generate a first modulated full-field optical signal based on a first output of the first child laser, and including (i) a first stage configured to implement amplitude modulation for the first child laser to obtain the first output as an amplitude-modulated COIL signal, and (ii) a second stage configured to apply phase modulation, orthogonal to the amplitude modulation, to generate the first modulated full-field optical signal from the first output.

2. The transmitter of claim 1, wherein the first child laser is configured to receive electrical in-phase data, and further comprising a second child laser configured to receive electrical quadrature data.

3. The transmitter of claim 2, further comprising:
  an optical circulator configured to inject the parent laser signal into a cavity of the first child laser; and
  a first optical coupler disposed between (i) the optical circulator and the first child laser, and (ii) the optical circulator and the second child laser.

4. The transmitter of claim 3, further comprising a first phase shifter disposed between the first optical coupler and the second child laser.

5. The transmitter of claim 4, wherein the first phase shifter is configured to implement a 45-degree one-way phase shift.

6. The transmitter of claim 4, further comprising a second phase shifter.

7. The transmitter of claim 6, further comprising (i) a second optical coupler disposed between the transmitter input and the optical circulator, and (ii) a third optical coupler disposed between the optical circulator and the first modulated optical signal, and wherein the second phase shifter is disposed between the second and third optical couplers.

8. The transmitter of claim 6, further comprising a third child laser configured for DC offset cancelation, and wherein the second phase shifter is disposed between the first optical coupler and the third child laser.

9. The transmitter of claim 1, wherein the full-field modulator comprises a phase modulator disposed between an optical circulator and the first modulated optical signal.

10. The transmitter of claim 9, wherein the first child laser is configured to receive electrical amplitude data, and wherein the phase modulator is configured to receive electrical phase data.

11. The transmitter of claim 1, further comprising a polarization beam combiner configured to combine the first modulated optical signal with a second modulated optical signal from a different child laser.

12. The transmitter of claim 11, wherein the first modulated optical signal is configured to carry X-polarization data, and wherein the second modulated optical signal is configured to carry Y-polarization data.

13. A full-field coherent optical transmitter for an optical communication network, comprising:
- a transmitter input configured to receive a parent laser signal from a parent laser source;
- a first child laser injection locked to a center frequency of the parent laser signal and in communication with an amplitude modulator;
- a phase modulator; and
- a transmitter output disposed between the phase modulator and a first end of an optical transport medium, wherein the transmitter output is configured to provide a downstream coherent optical signal to the optical transport medium, using the center frequency of the parent laser signal, for reception by at least one receiver disposed at a second end of the optical transport medium opposite the first end.

14. The transmitter of claim 13, wherein the transmitter input is further configured for communication with a power splitter disposed between the transmitter input and the parent laser source.

15. The transmitter of claim 14, wherein the transmitter output is further configured to provide the downstream coherent optical signal to at least one fiber node of the receiver.

16. The transmitter of claim 15, wherein the optical communication network is configured for point-to-multi-point operation.

17. The transmitter of claim 14, wherein the optical transport medium includes a multi-mode fiber, and wherein the transmitter output is configured to operably connect to a mode multiplexer disposed between the transmitter output and the multi-mode fiber.

18. The transmitter of claim 14, wherein the optical transport medium includes a multi-core fiber, and wherein the transmitter output is configured to operably connect to a core multiplexer disposed between the transmitter output and the multi-core fiber.

19. The transmitter of claim 13, wherein the parent laser source is a comb source, and wherein the transmitter input is configured to operably connect to a first wavelength-division-multiplexing (WDM) demultiplexer disposed between the transmitter input and the comb source.

20. The transmitter of claim 19, wherein the optical transport medium includes an optical fiber, and wherein the transmitter output is configured to operably connect to the optical fiber through a WDM multiplexer.

* * * * *